US012196127B1

(12) United States Patent
Artigues

(10) Patent No.: US 12,196,127 B1
(45) Date of Patent: Jan. 14, 2025

(54) EPICYCLIC ROTARY ENGINE

(71) Applicant: Paul Laurent Artigues, Auburn, GA (US)

(72) Inventor: Paul Laurent Artigues, Auburn, GA (US)

( * ) Notice: Subject to any disclaimer, the term of this patent is extended or adjusted under 35 U.S.C. 154(b) by 0 days.

(21) Appl. No.: 18/590,856

(22) Filed: Feb. 28, 2024

(51) Int. Cl.
*F02B 57/00* (2006.01)
*F02B 1/04* (2006.01)
*F02B 53/02* (2006.01)
*F02B 75/28* (2006.01)

(52) U.S. Cl.
CPC ................ *F02B 53/02* (2013.01); *F02B 1/04* (2013.01); *F02B 57/00* (2013.01); *F02B 75/28* (2013.01)

(58) Field of Classification Search
CPC .. F02B 53/02; F02B 1/04; F02B 75/28; F02B 57/00
See application file for complete search history.

(56) References Cited

U.S. PATENT DOCUMENTS 730,433 A 6/1903 Balzer
298,806 A 6/1961 Wankel
392,160 A 1/1975 Froumajou
3,921,601 A * 11/1975 Maoz .................... F01B 13/068 123/44 D
3,921,602 A * 11/1975 Froumajou ............. F02B 57/04 123/44 D
4,010,719 A * 3/1977 Lappa ..................... F02B 57/08 123/44 C
4,128,084 A 12/1978 Sutherland
4,249,487 A * 2/1981 Chambers ............... F02B 57/08 123/44 C
4,401,062 A * 8/1983 Dean ..................... F01B 13/068 123/44 D
4,421,073 A * 12/1983 Arregui ................. F01B 13/045 123/44 D
5,123,394 A * 6/1992 Ogren ................... F01B 13/068 123/44 D
10,590,845 B1 * 3/2020 Newstrom ................ F01B 9/06
10,606,898 B2 3/2020 Tellex
(Continued)

FOREIGN PATENT DOCUMENTS

GB 831814 A * 3/1960

OTHER PUBLICATIONS

Genchi, Giuseppe & Sorge, Francesco. (2012). The Rotary Aero Engine from 1908 to 1918. 10.1007/978-94-007-4132-4_24.

*Primary Examiner* — J. Todd Newton

(57) ABSTRACT

A rotary internal combustion engine includes a housing, a front cover, a rear cover, and a rotor. The rotor contains 2 or more pair of radially arranged, synchronously geared, crank shafts. The main journal of every other crankshaft has a timing gear at one end and a drive gear at the other. The timing gears mesh with a stationary sun gear fixed to the front cover. The rotor contains radial cylinder bores, each with a piston and connecting rod operably connected to each crankshaft. An output shaft with a sun gear pierces the center of the rotor and meshes with the drive gears. The rotor revolves around the output shaft within the housing which contains ports for intake, fuel delivery, spark, and exhaust. The crankshafts rotate at twice the rate of the rotor, thus producing four piston strokes per revolution of the rotor.

20 Claims, 63 Drawing Sheets

(56) References Cited

U.S. PATENT DOCUMENTS

| | | | | |
|---|---|---|---|---|
| 2003/0005894 | A1* | 1/2003 | Dougherty | F02B 75/222<br>123/54.2 |
| 2003/0127062 | A1* | 7/2003 | Ahn | F01B 9/042<br>123/43 R |
| 2004/0261731 | A1* | 12/2004 | Fathollahi | F01B 9/06<br>123/43 R |
| 2014/0144405 | A1* | 5/2014 | Sullivan, IV | F01L 7/02<br>123/197.4 |
| 2015/0144103 | A1* | 5/2015 | Vengen | F02B 57/08<br>123/43 R |
| 2017/0254320 | A1* | 9/2017 | Schulze | F04B 27/0409 |

* cited by examiner

EPICYCLIC ROTARY ENGINE

BACKGROUND OF THE INVENTION

I. Field of the Invention

The present invention relates generally to the conversion of fluid power to mechanical power. More particularly the present invention relates to internal combustion engines.

The internal combustion engine is well established in a diverse field of applications from transportation to tools. The vast majority of engine designs utilize a crankshaft driven by a piston by way of a connecting rod within a stationary engine block. The piston and cylinder are well understood and appreciated for simplicity and effectiveness in harnessing work from the expansion of a gas. A significant number of rotary engine designs have been proposed but only a limited number have been produced. Of these, there are two generally applicable types: radial piston rotary engines and eccentric rotor rotary engines.

Many radial piston rotary engines were conceived, developed, and constructed early in the 20th Century and were successfully used in aircraft, as well as seeing limited use in automobiles and motorcycles. However, they quickly fell from favor due to the complexity of fuel delivery, oiling, and valving. Fuel delivery schemes were often inefficient and wasteful. There was no provision for oil return and therefore oil was simply consumed. A direct consequence of the valving complexity was poor volumetric efficiency. These shortcomings were significant enough that development of the radial piston rotary engines all but ceased by the 1930's.

The modern concept of a rotary engine is generally associated with engines of the type invented by Felix Wankel. In these engines a rotor eccentrically gyrates inside a stationary housing to emulate the four strokes of a piston engine and drive a geared output shaft. They have been successfully deployed in multiple applications but suffer from oil consumption, poor thermal efficiency, poor fuel economy, and poor emissions quality. Despite any shortcomings they have some distinct advantages, such as light weight and simplicity. Development of this type of rotary continues to be the focus of several companies.

The engine of the present invention does not fall neatly into either of these rotary types but rather has elements of both. Like the Wankel the present invention has a stationary housing, has swept intake and exhaust porting, and the rotor assembly drives a geared output shaft. Unlike the Wankel, the present invention uses conventional pistons that are easy to seal and lend to better thermal efficiency. Like the radial piston rotary engines, the present invention has radially arranged cylinders that revolve around a central axis, benefits from cooling airflow about the cylinders, and has the power-to-weight advantage of not requiring a flywheel. Unlike the radial piston rotary engines, the present invention has short and direct intake and exhaust porting, closed loop oiling, and simple construction.

II. Description of the Related Art

The prior art related to the internal combustion engine is expansive. Engines with pistons and stationary blocks have dominated the market with very few rotaries making it past the conceptual phase. The rotary that has enjoyed success, the Wankel, is of a stationary block type.

Felix Theodore Millet may have been the first to conceive a functional rotary internal combustion engine with his 5 cylinder bicycle wheel. Many came after his invention, with vehicles from Adams-Farwell, Baily Automobile Company, Balzer, and Carey. Many successful aircraft engines were produced by Salmson, Gnome, Le Rhone, Clerget, Bristol, Pratt & Whitney, Martin, Douglas, Gruman, Kawasaki, Mitsubishi, BMW, Siemens and others.

Patent (U.S. Pat. No. 730,433) to Balzer teaches of a rotary piston engine with radially arranged cylinders about a common crank. Balzer further illustrates means of cooling, providing for intake, exhaust, and ignition. Balzer was a pioneer of the rotary concept and contributed significantly to patent art.

Patent to Wankel (U.S. Pat. No. 2,988,065) teaches of a rotary engine comprising an inner body generally in the shape of a Reuleaux triangle that turns about an axis eccentric and parallel to the axis of a stationary outer body having an oblong hollow cavity to produce four strokes as the volume trapped between the sides of the inner body and outer cavity vary.

Patent (U.S. Pat. No. 3,921,602) to Froumajou describes a four-stroke internal combustion engine with a cylindrical rotor equipped with cylinders rotating within a stationary housing having intake and exhaust ports. Configured as a 4 cylinder engine, a common cross slide connecting rod serves opposing pistons. The crankshaft is driven at 4 times the speed of the rotor but in counter rotation providing a 5th cycle for a pumping function cooperating with the cycle of other cylinders in the assembly.

Patent application (U.S. Ser. No. 10/606,898) to Fathollahi describes an internal combustion rotary engine having a rotor that revolves in stationary housing between two end plates. The rotor housing has peripheral ports for intake and exhaust and provision for oiling. The rotor employs hinged pistons that push linkages to drive planetary gears that interact with a stationary sun gear effecting rotation of the rotor.

Patent to Sutherland (U.S. Pat. No. 4,128,084) describes a rotary engine with a stationary housing and a central stator. A central cam shaft operates valves for intake and exhaust orientated towards the center of the stator. The pistons fire outwardly and are in communication with an orbiter interposed between stator and housing which translates its orbital motion to rotate a shaft via a ring and sun gear or cycloidal drive.

The engine of the present invention is not like any found in the prior art and, although it shares some design elements with the cited art, it is a very different machine. This will become increasingly evident in the forthcoming disclosure.

BRIEF SUMMARY OF THE INVENTION

In its preferred embodiments, the present invention comprises a rotor housing assembly, a front cover assembly, a rear cover assembly, and a rotor assembly. The rotor housing and cover assemblies are stationary. The rotor assembly takes a differential form with pistons driving planetary spur gears attached to the ends of every other shaft in a train of alternating synchronous crankshafts. The rotor and planetary carriers may be simply considered as a single unit and thus the input member of the differential. One set of planetary spur gears, herein referred to as timing gears, mesh with a stationary sun gear affixed to the front cover plate. This gear mesh establishes that the planetary crankshafts rotate at twice the speed of the carrier and together with the synchronous mesh of the crankshaft gears and the epicyclic path of the connecting rod journals ensures that each piston reciprocates in time with rotation of the rotor. The other set of planetary spur gears, herein referred to as driver gears and located at the rear of the crankshafts, mesh with a rotating sun gear integral to the central output shaft. Consequently, as the planetary carrier rotates, the output shaft is driven at a speed dictated by the ratio of driver gear teeth to rotating sun gear teeth. This accommodates a great range of output shaft speed choice within the practical constraints of the radial distance between the central axis and the axes of the crank shafts.

The rotor contains all moving parts and comprises; a rotor with cylinder bores, a front and a rear planetary carrier, crank shafts, spur gears, connecting rods, pistons, and seals. The crank shafts are constrained to rotational motion between the planetary carriers by plain bearings and synchronously engaged with each other via integral spur gears. Timing gears are coupled to every other crank shaft to engage a central stationary sun gear fixed to the front cover and related by a ratio of 2:1.

By the relation of the fixed sun gear to the crank shaft timing gears, the crankshafts rotate at twice the rate of the rotor thus producing four piston strokes per rotor revolution. This effectively divides the function of the rotor housing into four equal quadrants and allows for swept porting of intake and exhaust gases. In operation, the intake stroke occurs as the rotor rotates clockwise and a cylinder sweeps through quadrant IV, the compression stroke occurs in quadrant III, the power stroke in quadrant II, and finally the exhaust stroke occurs in quadrant I. Thus, for each revolution of the rotor, a full combustion cycle completes for every cylinder. Each piston, as it undergoes a combustion event, translates the force to its respective crank shaft journal by way of a connecting rod. The resultant torque on the crank shaft is transmitted to the timing gears. This torque on the timing gears translates to rotation of the rotor by virtue of the fixed sun gear.

The rotor of the rotor assembly constitutes the bulk of the rotational inertial mass and may be constructed according to the design objectives. A hollow core construction utilizing exotic materials may be selected for responsiveness in applications such as motor vehicles that utilize transmissions with discrete gearing. A denser construction may be employed for power smoothing in applications targeting a specific rotational frequency such as electrical power generation. The mass of the rotor assembly eliminates the requirement of an external flywheel to overcome the counter-torque applied during compression. This effectively reduces the overall weight of the engine.

Each crankshaft equipped with a timing gear also includes an output shaft driver gear at its other end. An output shaft is rotationally constrained by plain bearings and pierces the center of the planetary carriers. The output shaft sun gear is engaged by the output shaft driver gears in a ratio suited to the application and rotates at a speed relative to the rotor speed in the form of 2Q−1, with Q being the ratio of driver teeth to teeth on the output shaft gear. A driver gear to output shaft gear ratio of 2:1 may be chosen to drive an induction generator at 60 Hz with a rotor speed of 20 Hz. A driver gear to output shaft gear ratio of 1:1 along with a coaxial drive shaft fixed to the rotor may be employed to drive contrarotating propellers. Coaxial drive shafts may also be used to produce two different output speeds to drive discrete loads or, in combination with a clutching mechanism, provide two speed transmission. Alternatively, if it is desired to have the output shaft spin at the same speed and direction as the rotor, a fixed shaft rigidly constrained to the planetary carrier plates may serve as the output. The rotor is constrained to rotation within the housing by plain bearings about the output shaft in the front and rear planetary carriers and translationally constrained by thrust bearings installed in each of the cover plates.

The intake and exhaust ports may be simple slots or may be optimized for displacement and timing. They may be configured with overlap of intake and exhaust to encourage scavenging. The intake port may be extended or shortened to attenuate the compression stroke, effectively producing a compression ratio less than the expansion ratio as taught by James Atkinson and Ralph Miller. Valving arrangements in the trailing region of the intake stroke and the leading region of the compression stroke may also be employed to effect variable valving strategies. Pressure generated in each cylinder is contained by spring loaded cylinder seal rings about each cylinder sleeve. These seals are ideally self-lubricating to avoid oil consumption.

Oiling is accomplished with a conventional dry sump system by means of delivery by pump, distribution by oil gallery drilling, and scavenging by centrifugal effect, gravity, and a scavenging pump. Oil enters the oil gallery at the oil supply fitting in the rear cover plate and travels through the output shaft to the bearings in each carrier plate and the front cover output shaft bearing. It is distributed through radially arranged passages in the planetary carrier plates to each main journal bearing, then through each crankshaft to feed the connecting rod journals, timing gears, drive gears, and gudgeon pins via the connecting rods. Each planetary carrier plate incorporates an annular collection groove and tangential ports that match an annular collection groove and tangential ports in the rotor. The interior surface of the rotor is tapered directing oil to the collection grooves. Oil that is ejected from the rotor core is contained to the peripheral edges of the rotor by circumferential ring seals and the thrust bearing/seals. Rotary seals are incorporated in the timing gear gearcase cover and drive gear gearcase cover, and an output shaft seal is installed in the rear cover to contain oil in the rotor core. All other sealing mates are plain gasketed surfaces. By the nature of the oiling scheme, the rotor is revolving about a film of oil between the output shaft and the rotor planetary carrier plate plain bearings as well as within a film of oil between the periphery of the rotor and the rotor housing sleeve. Slotted reliefs in the lower portion of the housing provide passage of the oil back to the sump where it flows through a connecting passage and is drawn out the oil return fitting by a scavenging pump. It is then deposited in a reservoir to feed the pressure pump. The pressure pump returns the de-gassed and cooled oil to the entrance of the oil gallery at the supply fitting located on the rear cover. Oiling in a vertical output shaft configuration may include multiple slotted reliefs and passages from the upper to lower covers for drainage back into a sump.

Primary cooling of the interior of the rotor is accomplished by forced airflow drawn through cooling ports in the planetary carrier plates about the cylinders. A centrifugal fan, integral or mounted to the rear planetary carrier, provides the impetus. Cooling of the housing may be by air exchange or water jacket. Oil cooling also contributes to heat rejection.

A fuel injector provides direct injection to the cylinder at top dead center and a spark plug may be equipped to ignite the air/fuel mixture. If the duty cycle of a single injector is not sufficient, multiple injectors may be employed in an alternating fashion. A diesel cycle may also be utilized.

Engine balance is inherent in four-cylinder embodiments as rotational and reciprocating moments are cancelled by symmetry. Embodiments of six or more cylinders require counterweighted crankshafts to balance rotational mass.

Embodiments of two cylinders are also inherently balanced but have a slight variation of mass moment of inertia, with the greatest moment coinciding with peak cylinder pressures.

The engine may be configured to operate in vertical as well as horizontal output shaft orientations and is scalable to meet the power requirement. For high power applications, rotors may be stacked with stationary plates joining housing sections, and a common output shaft. Wider rotors incorporating side by side cylinder bores may also be used. With twice the displacement per revolution of a conventional 4-stroke engine, less parasitic loss to valving, and less mass, the engine of the present invention has a high power density. Construction and control are also simplified as functions are localized requiring fewer and less complex components.

It will become increasingly clear from the forthcoming detailed description that the present invention may be adapted to a broad scope of applications and is well suited to provide continuous power in applications such as hybrid electric vehicles, where its compact form, light weight, and simplicity are distinct advantages.

BRIEF DESCRIPTION OF THE DRAWINGS

The invention will be better understood when consideration is given to the following detailed description referencing the annexed drawings wherein. Like reference numerals have been assigned to relevant parts and are utilized throughout the drawings for clarity. The engine assembly of the present invention is indicated by the numerals 101, 106 and 111.

DESCRIPTION OF THE PREFERRED EMBODIMENTS

Figure 1:
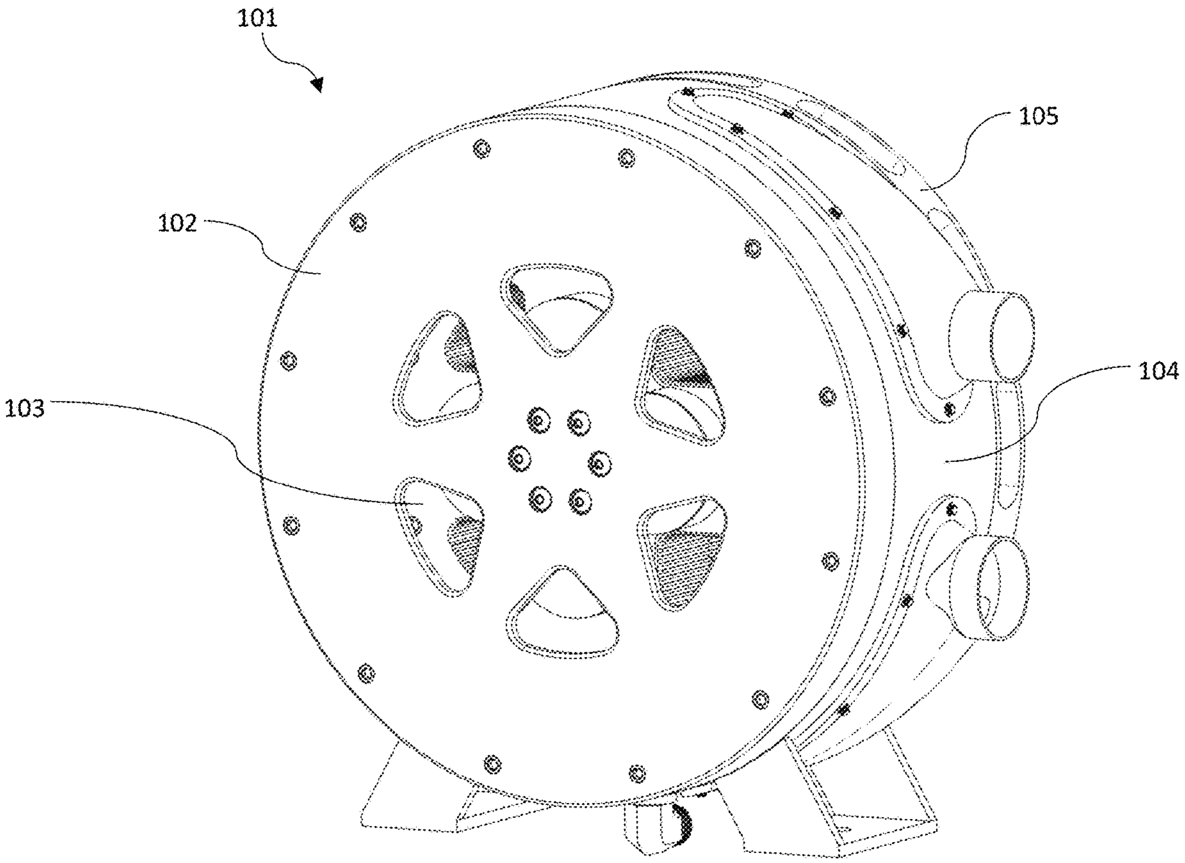
FIG. 1 is an anterior perspective view of a 4-cylinder engine and the first embodiment of the present invention.
Figure 2:
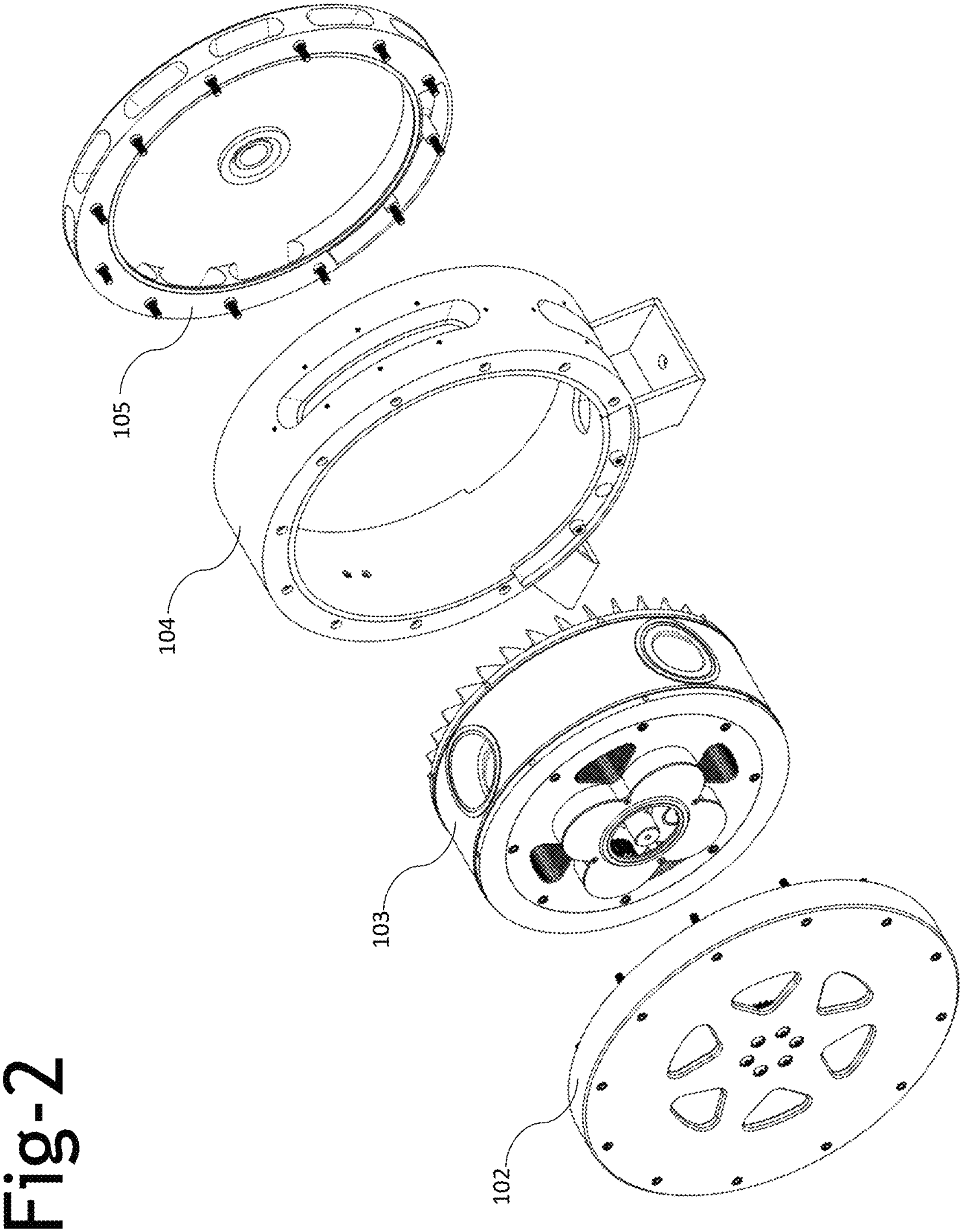
FIG. 2 is an isometric exploded view of the first of the preferred embodiments illustrating the major assemblies from an anterior vantage point.

For a fuller understanding of the nature, application and function of the present invention, reference should be directed to the following detailed description taken in context with the accompanying drawings. Referring first to FIGS. 1 and 2 for a better understanding of the general construction of the first preferred embodiment. An engine assembly 101 is illustrated in assembled form and in an exploded representation of its major components. A rotor assembly 103 is sandwiched between a front cover plate assembly 102 and a rear cover plate assembly 105 and axially constrained to rotation within a rotor housing assembly 104.

Figure 3:
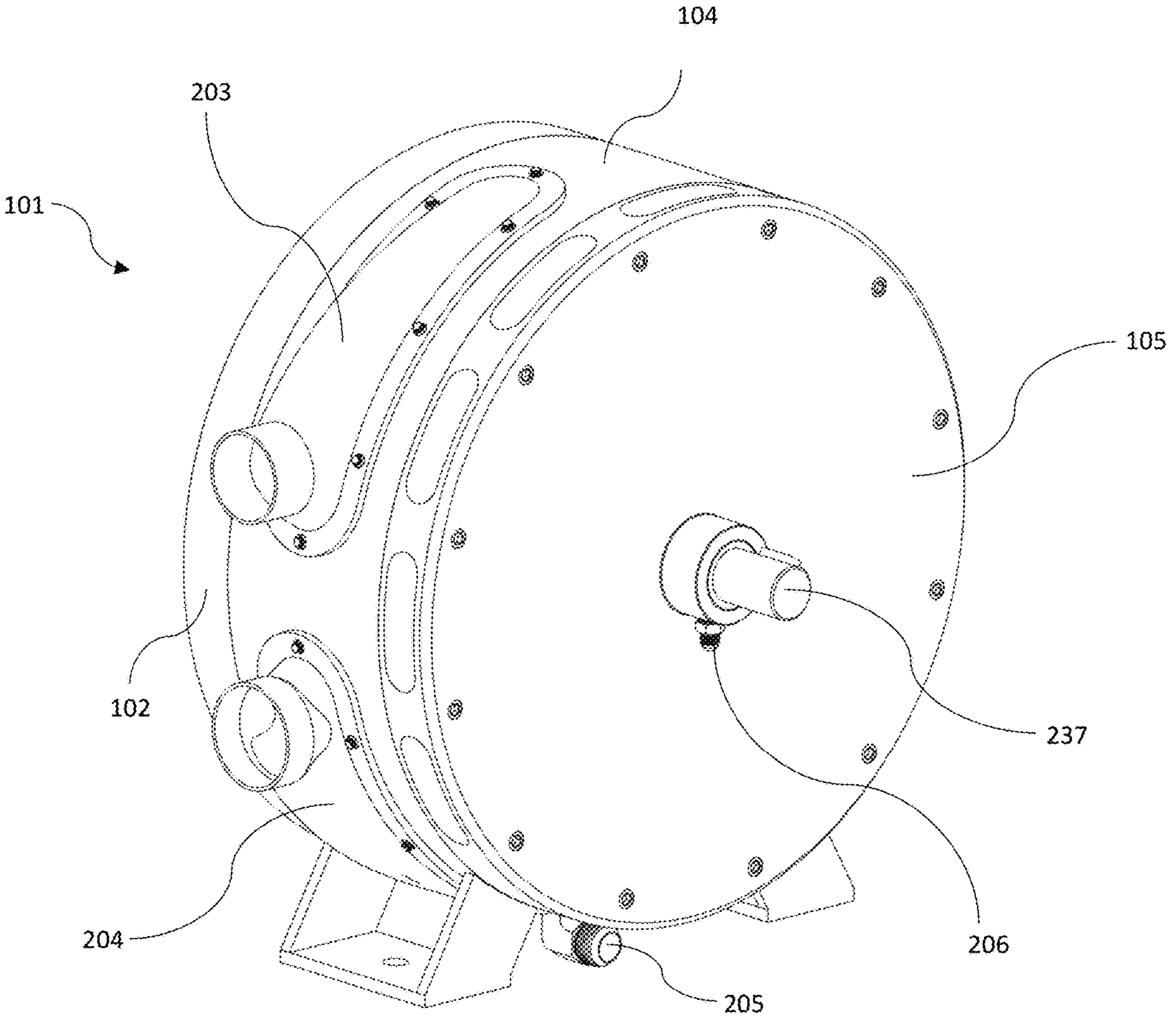
FIG. 3 is a posterior perspective view of a 4-cylinder engine and the first embodiment of the present invention.
Figure 4:
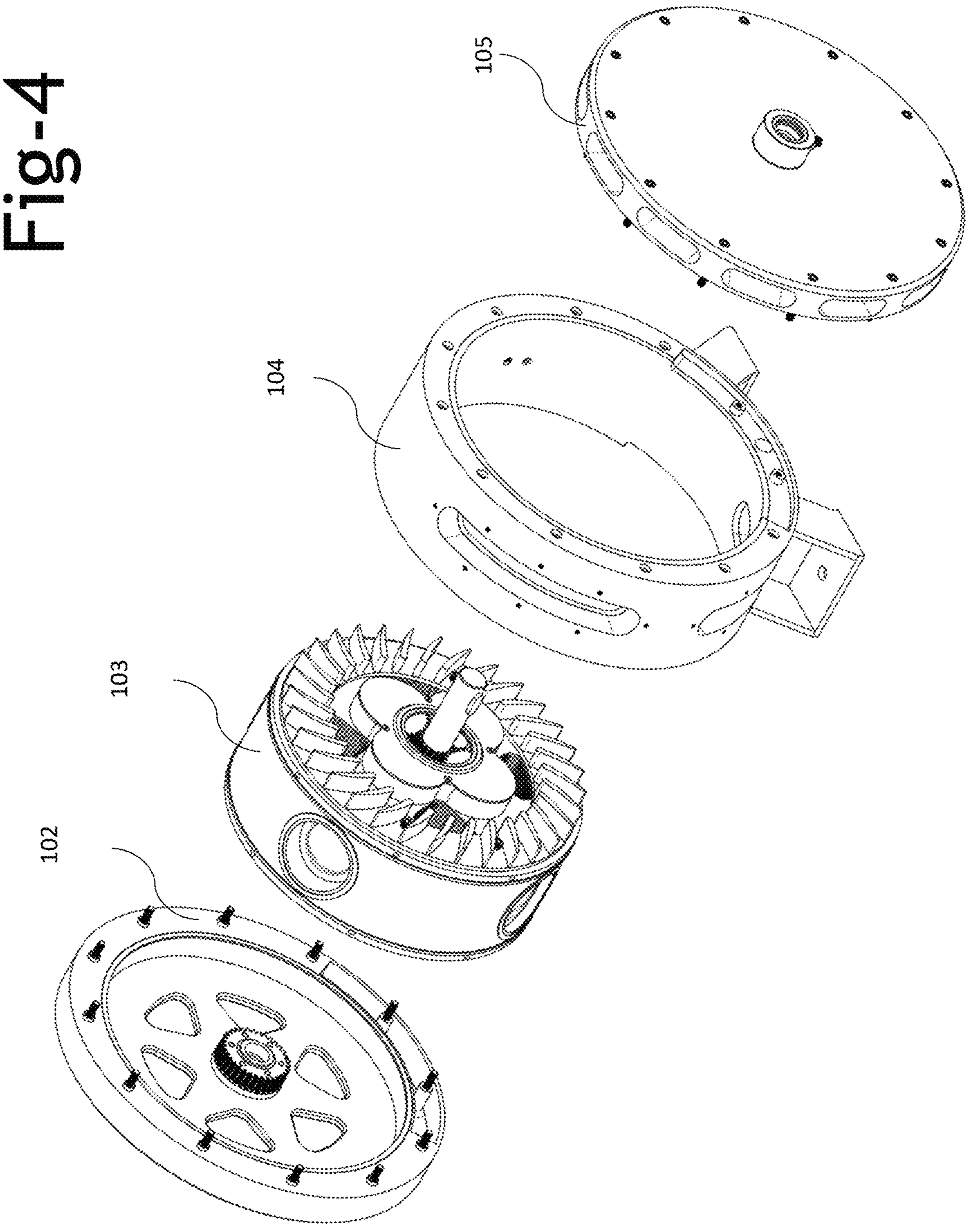
FIG. 4 is an isometric exploded view of the first of the preferred embodiments illustrating the major assemblies from a posterior vantage point.

Referring now to FIG. 3 and FIG. 4 which offer a view of engine assembly 101 from a posterior vantage point. A rotor assembly 103 is sandwiched between a front cover plate assembly 102 and a rear cover plate assembly 105 and axially constrained to rotation within a rotor housing assembly 104. Intake air is drawn through intake manifold 204 and exhaust is expelled through exhaust manifold 203. Lubricating oil is supplied under pressure to oil supply port 206 and is returned through oil drain fitting 205.

Figure 5:
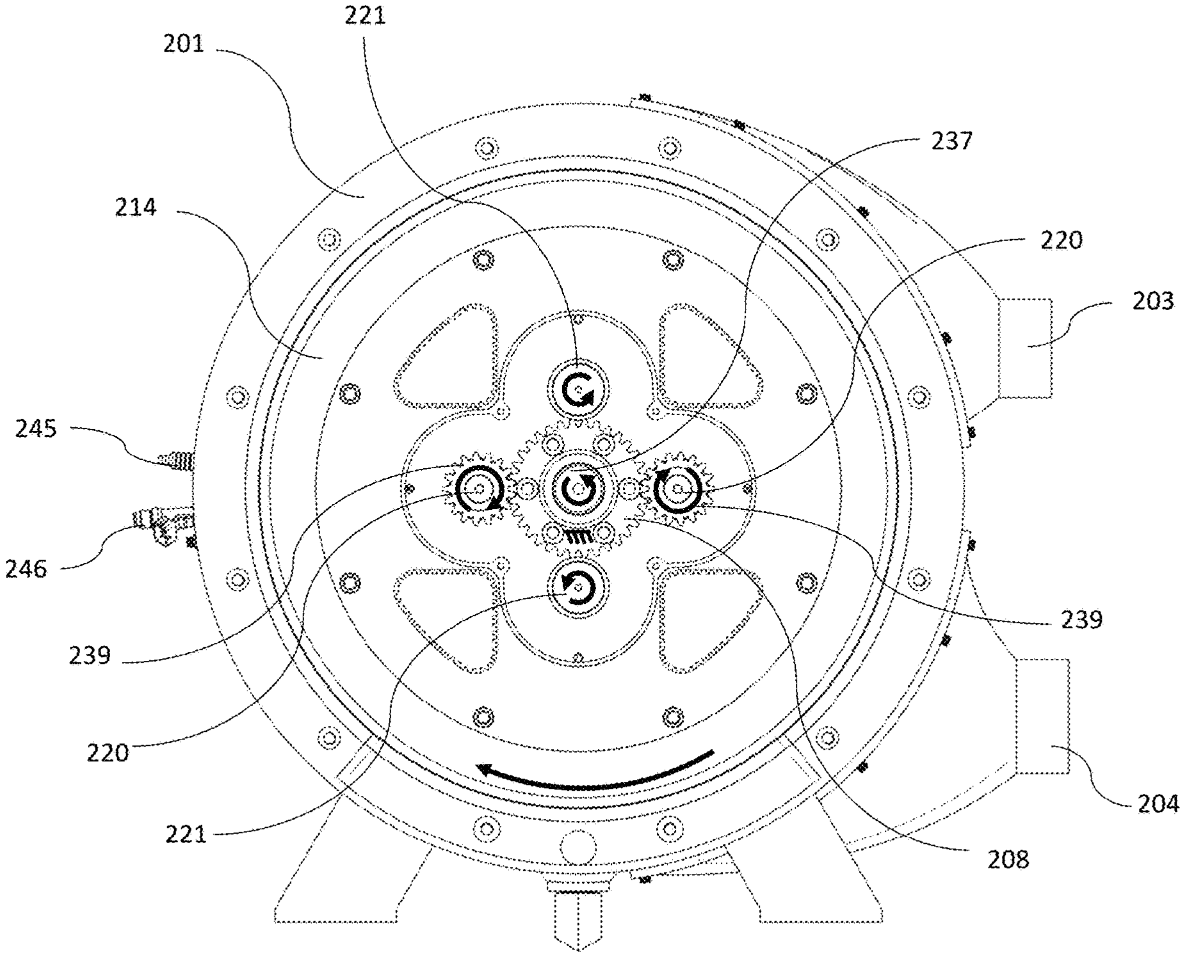
FIG. 5 is an orthogonal front view of the first of the preferred embodiments with the front cover and the timing gear cover hidden from view.
Figure 6:
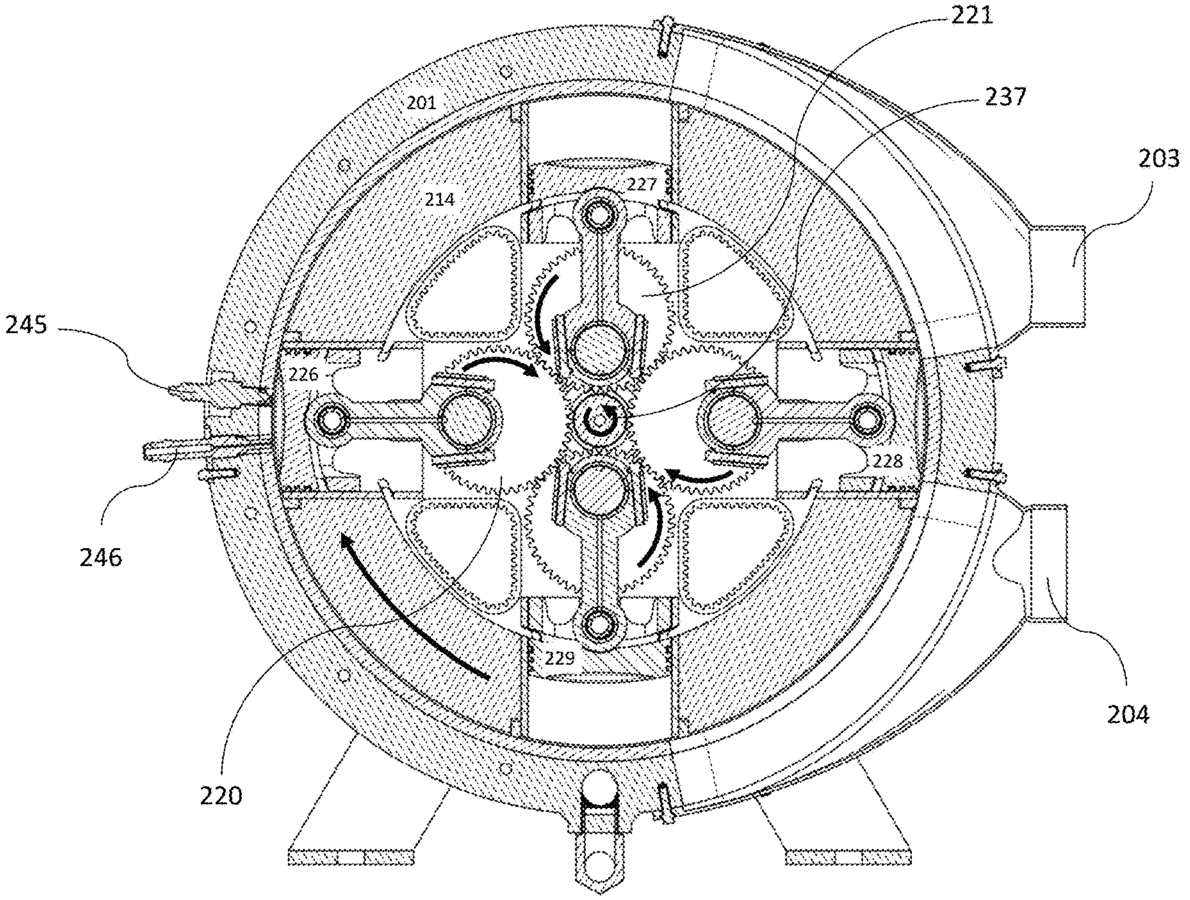
FIG. 6 is a cross sectional view of the first of the preferred embodiments with piston 1 at the beginning of the power stroke.
Figure 7:
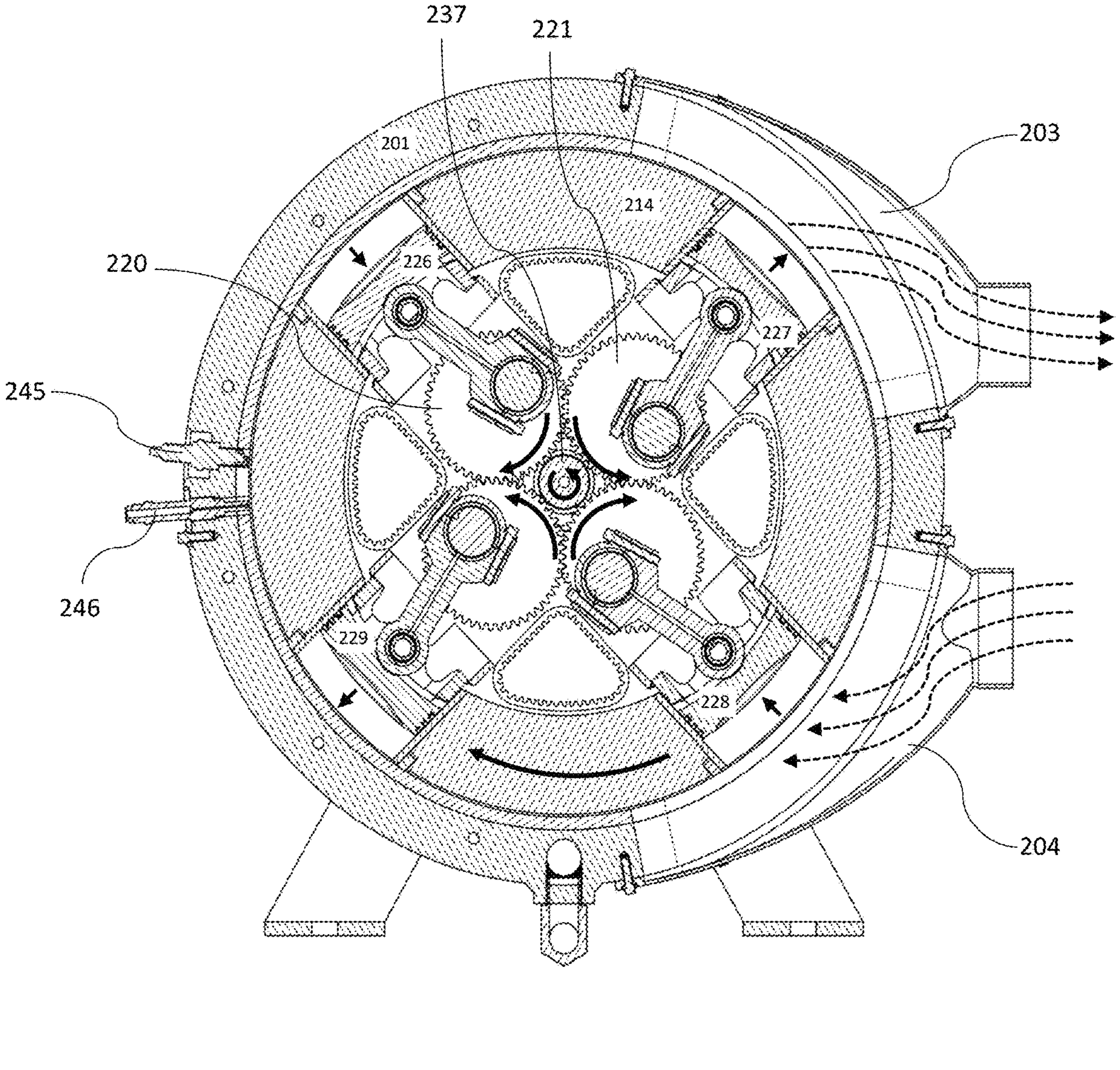
FIG. 7 is a cross sectional view of the first of the preferred embodiments with piston 1 halfway through the power stroke.
Figure 8:
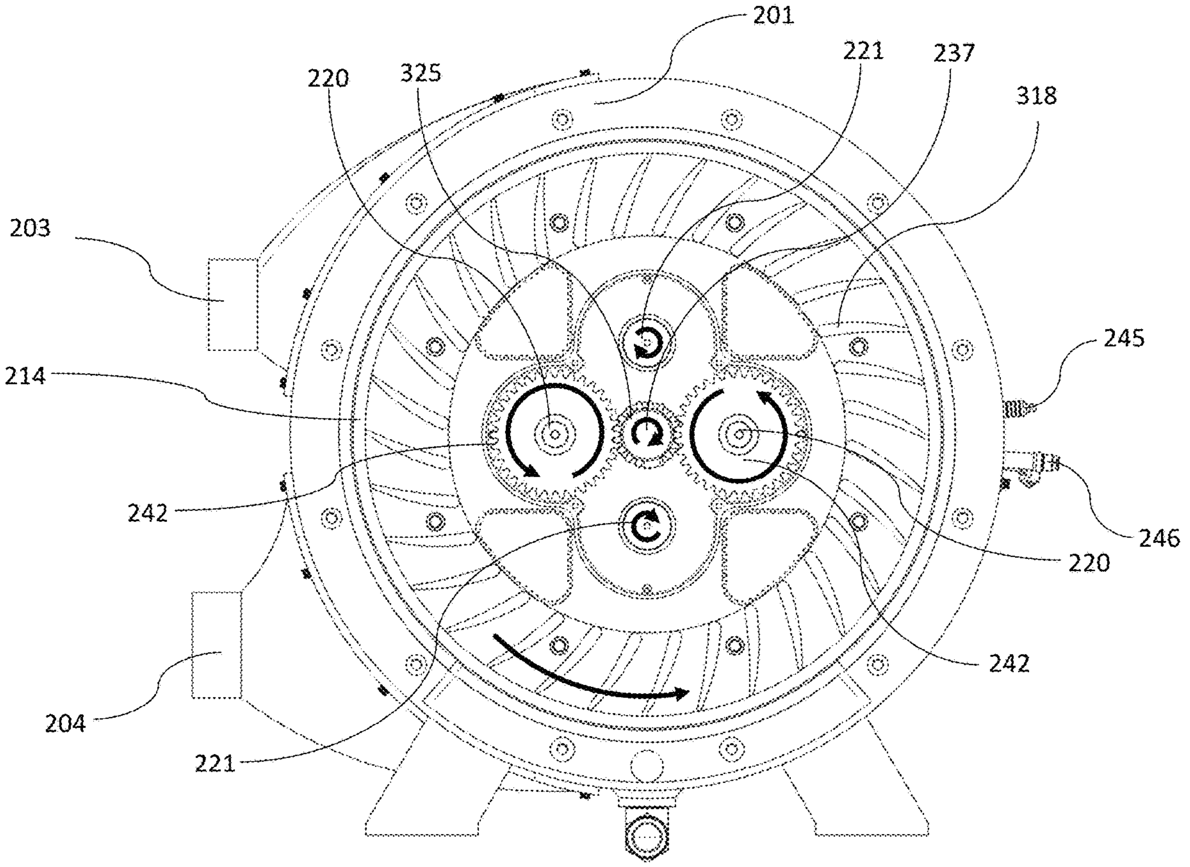
FIG. 8 is an orthogonal rear view of the first of the preferred embodiments with the rear cover and the drive gear cover hidden from view.

For a better understanding of the function of the first embodiment of the engine assembly, reference is directed to FIGS. 5, 6, 7 and 8 which clearly show the dynamic relation of the components of the engine assembly 101. FIG. 5 illustrates the relative motion of the primary crank shafts 220, the secondary crank shafts 221, the rotor 214, and the output shaft 237. Primary crank shafts 220 and secondary crank shafts 221 are geared together to counter rotate in unison. The timing gears 239 mesh with the fixed sun gear 208 in a ratio of 2:1. Thus, for each revolution of the rotor 214, the crank shafts complete 2 revolutions. The rotor housing 201, intake manifold 204, exhaust manifold 203, fuel injector 246, and spark plug 245 are all stationary. FIG. 6 is a cross sectional view with piston 1 226 at top dead center and the beginning of the power stroke. It is clearly observed that pistons 2 227 and 4 229 are at bottom dead center and piston 3 228 is also at top dead center. As the rotor is rotating clockwise as viewed and piston 1 226 is driven by a combustion event, piston 2 227 enters quadrant 1 and begins its exhaust stoke, expelling spent gases through exhaust manifold 203. Piston 3 228 draws fresh air through intake manifold 204 as it begins its sweep through quadrant 4, and piston 4 229 begins to compress its full charge of fresh air as it enters quadrant 3. FIG. 7 further enhances understanding of the cycle as all four pistons are in motion as indicated by the directional arrows placed within the cylinder bores. As the rotor is rotating clockwise as viewed, piston 1 226 is in its power stroke, piston 2 227 is in its exhaust stroke, piston 3 228 is in its intake stroke, and piston 4 229 is in its compression stroke. FIG. 8 more clearly illustrates the mechanism in which the output shaft 237 is driven. As the primary crank shafts 220 are driven at 2 times the rotor speed 214, the drive gears 242 rigidly coupled to them drive the output shaft through its output shaft gear 325. A final drive ratio of 2:1 between the drive gears 242 and the output shaft gear 325 is employed in this embodiment resulting in a shaft speed of 3 times the speed of the rotor.

Figure 9:
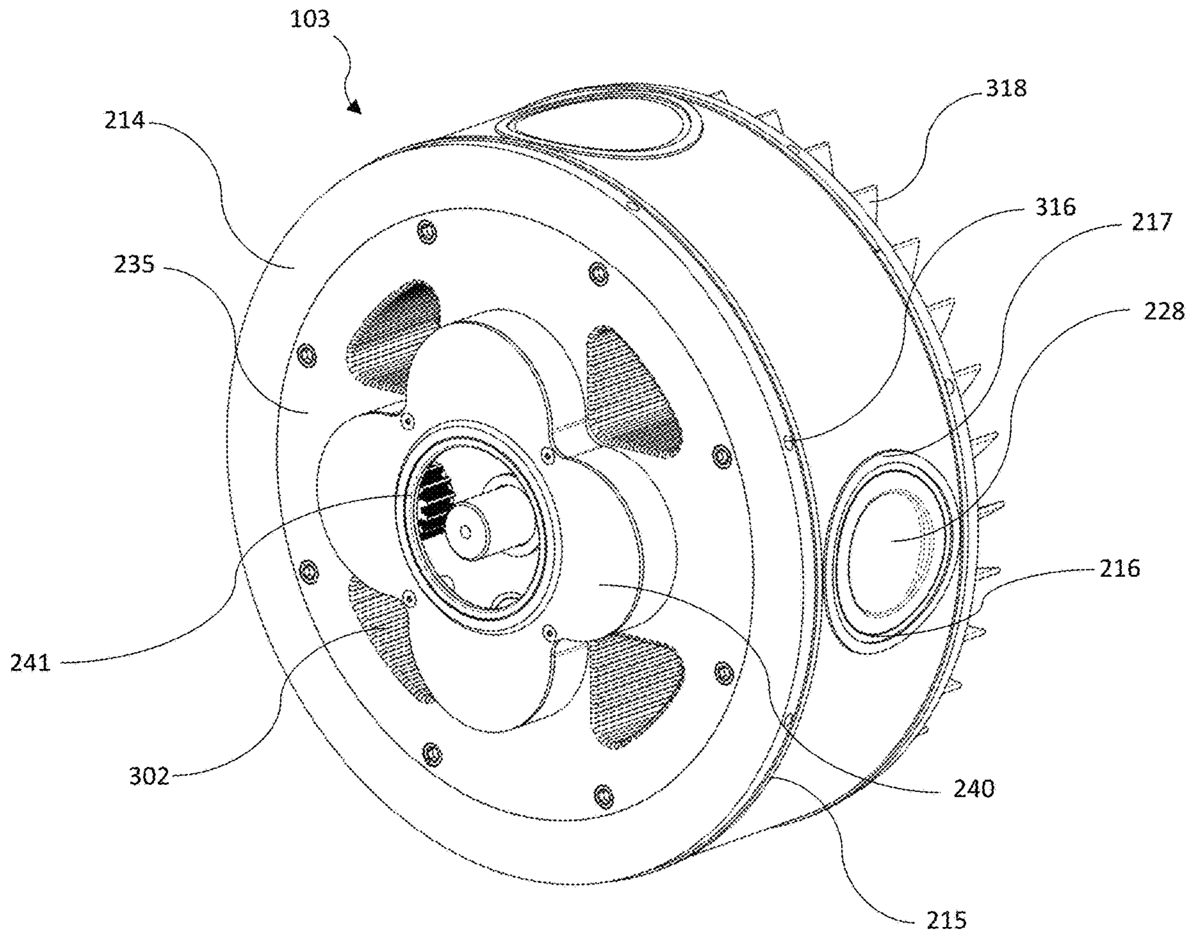
FIG. 9 is an anterior perspective view of the rotor assembly of the first embodiment of the present invention.

Referring now to FIG. 9 which is a perspective view of the rotor assembly 103 of the present invention. In this view, the rotor 214, front cover plate 235, piston 228, cylinder seal 217, rotor oil seals 215, and timing gear cover plate 240 with oil seal 241 can be clearly seen. Some of the features such as the rotor core cooling passages 302, oil ejection ports 316, and fan blades 318 are also visible.

Figure 10:
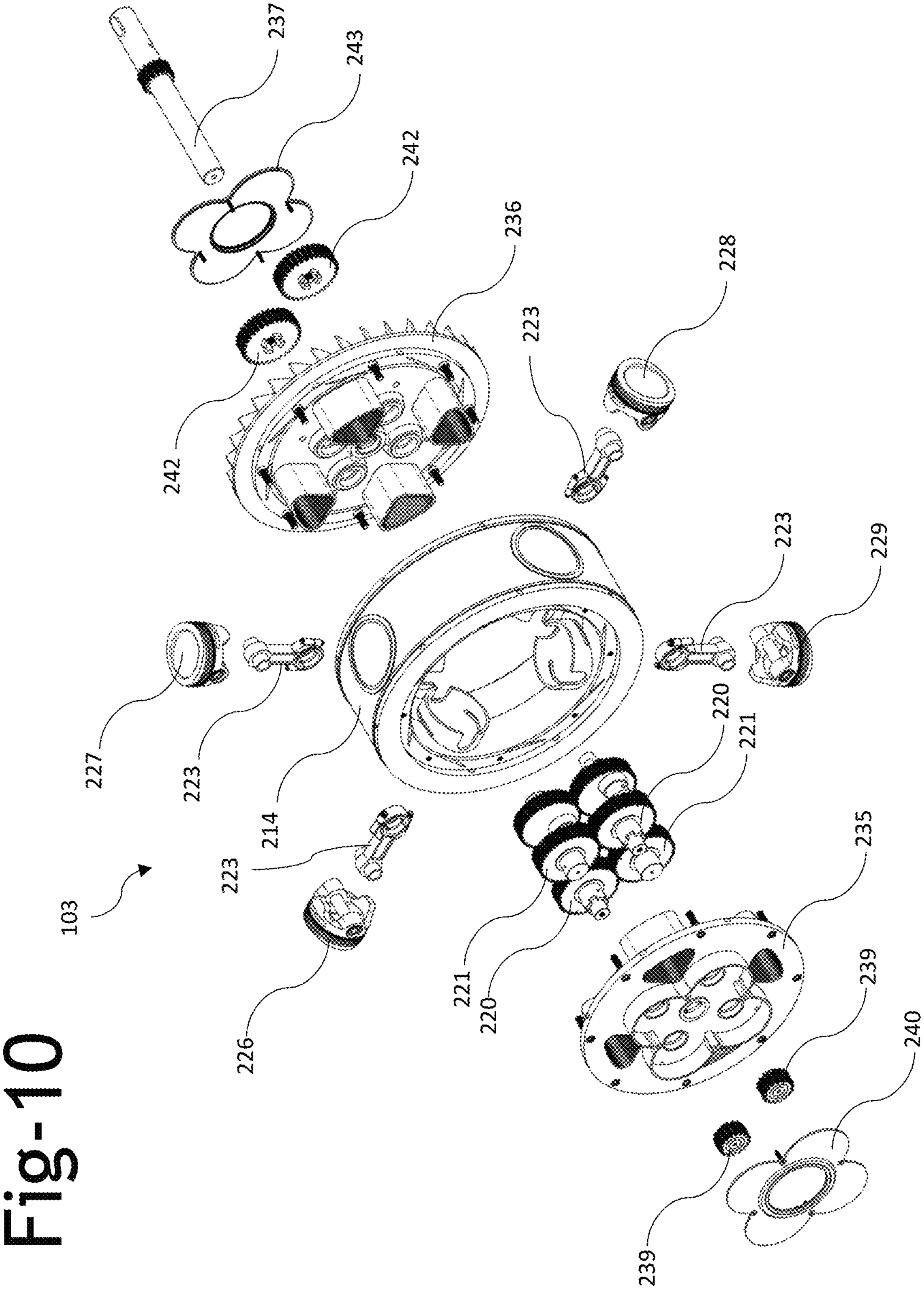
FIG. 10 is an isometric exploded view of the rotor assembly of the first embodiment of the present invention.

For a better understanding of the components and their function within the rotor assembly 103, reference is directed to FIG. 10. A rotor 214 with four cylinder bores houses primary and secondary crankshafts, connecting rods 224, and pistons 226, 227, 228, 229. The crankshafts 220 and 221 are geared together and constrained to rotation about their axis by a front planetary carrier plate 235 and a rear planetary carrier plate 236. Timing gears 239 and drive gears 242 are secured to the ends of each primary crank shaft 221. An output shaft 237 meshes with the drive gears 242. Timing gear cover plate 240 and drive gear cover plate 243 provide a means of containing oil in the rotor assembly.

Figure 11:
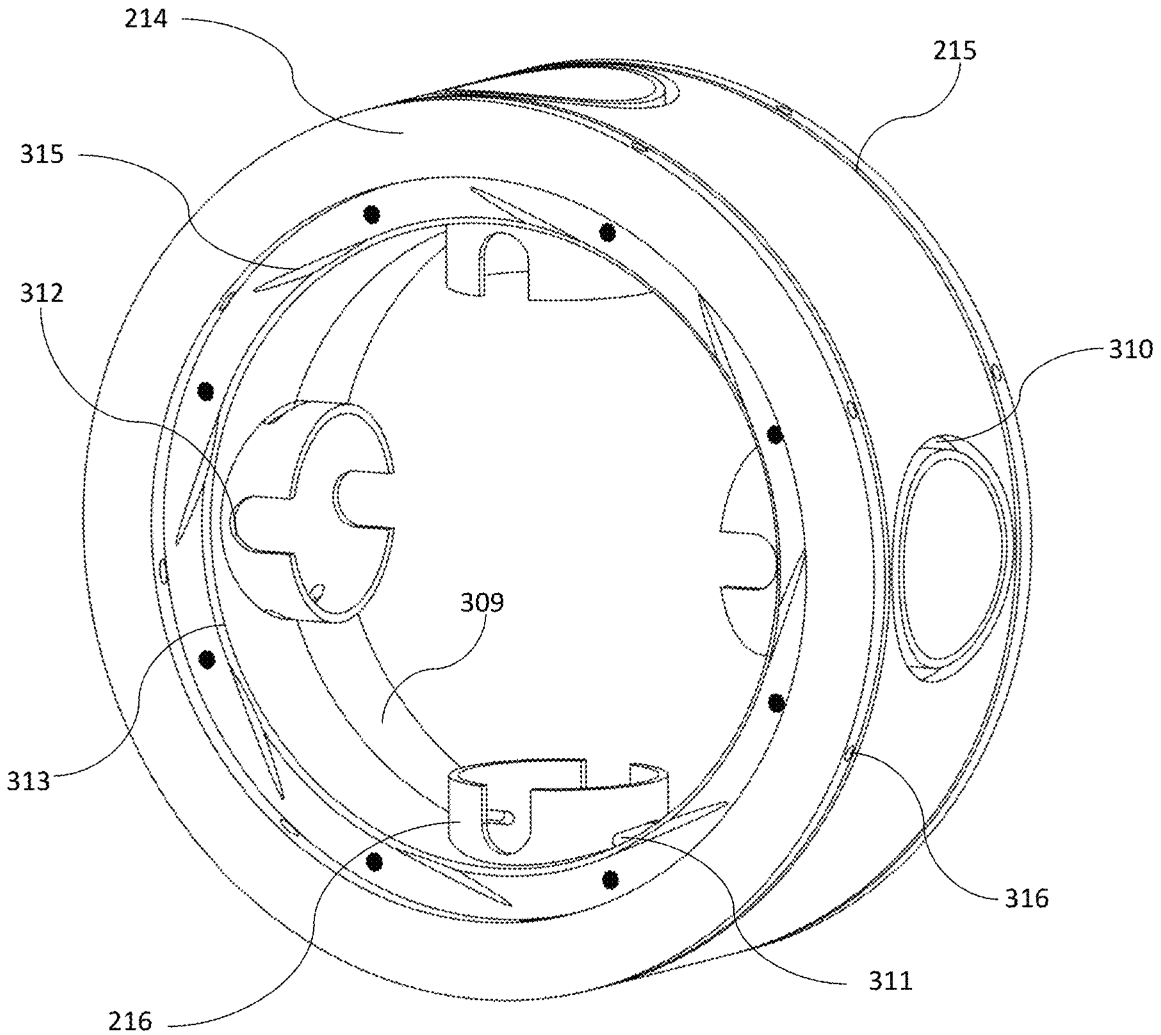
FIG. 11 is a perspective view of the rotor of the first embodiment of the present invention.

FIG. 11 is a perspective view of the rotor 214 illustrating its features. Four equally spaced bores are present in the rotor 214 and each contains and interference fit cylinder sleeve 216. A counterbore 310 is provided for each cylinder in the circumferential surface of the rotor 214 to accommodate a cylinder seal ring. The interior of the rotor is tapered 309 to encourage oil flow toward the annular collection groves 313 about each interior edge of the rotor 214. Tangential oil passages 315 that mate with matching passages in the planetary carrier plates provide a means of scavenging oil from the rotor core and ejecting it to the periphery through oil ejection ports 316. Cylinder sleeve oil passages 311 provide a means of shedding oil from the piston belly at bottom dead center to eliminate fluid accumulation on the piston. Each cylinder sleeve 216 has a pair of cylinder sleeve pin slots 312 to facilitate insertion of the gudgeon pin and assembly of the piston to connecting rod.

Figure 12:
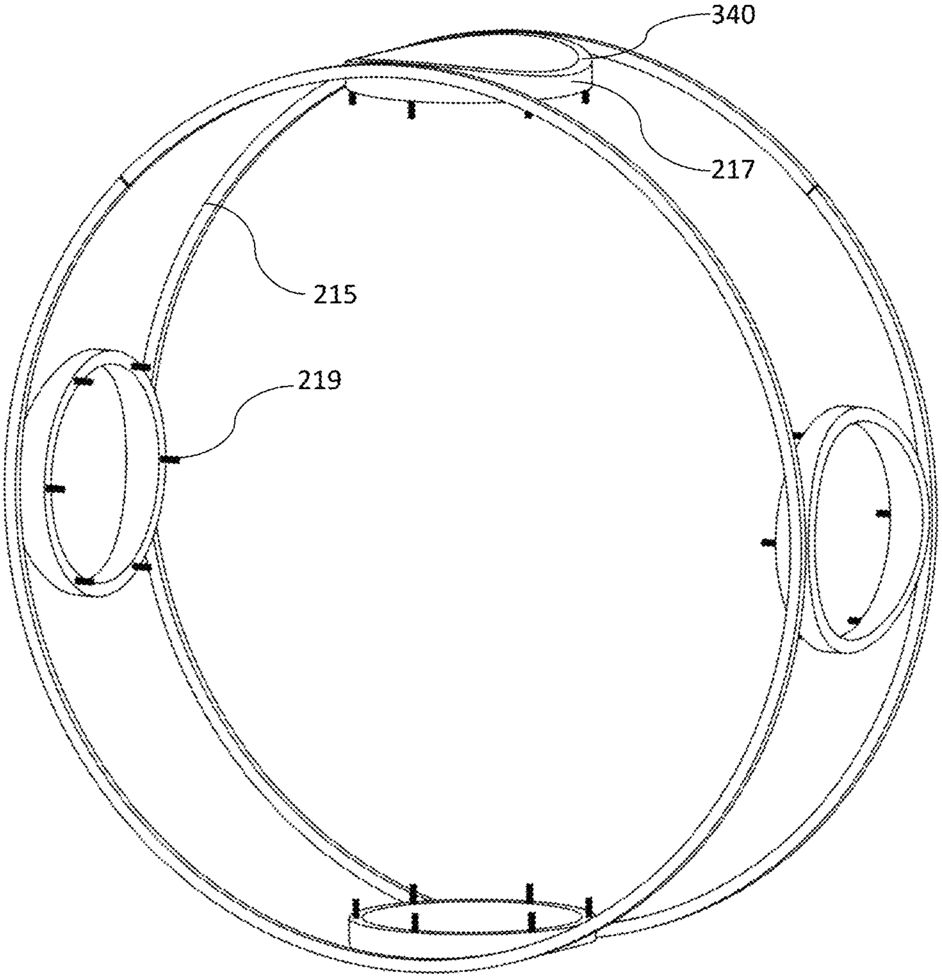
FIG. 12 is a perspective view of the cylinder seals and rotor oil seals of the first embodiment of the present invention.

FIG. 12 is a perspective view of the cylinder compression seal rings 217 and the rotor oil rings 215. The cylinder seal mating surface 340 of the cylinder compression seal rings 217 are radiused to match the interior surface of the rotor housing sleeve. A plurality of compression seal springs 219 are fitted in counterbores located in the underside of each cylinder compression seal. These springs 219 are preloaded to maintain an adequate seal between cylinder and housing during operation. The cylinder compression seal must be of sufficient tensile strength to handle the hoop stresses of peak cylinder pressures and have lubricating properties to allow for dry running. Rotor oil rings 215 contained in slots about the rotor contain oil to the outer edges of the rotor where it is ejected by the oil ejection ports.

Figure 13:
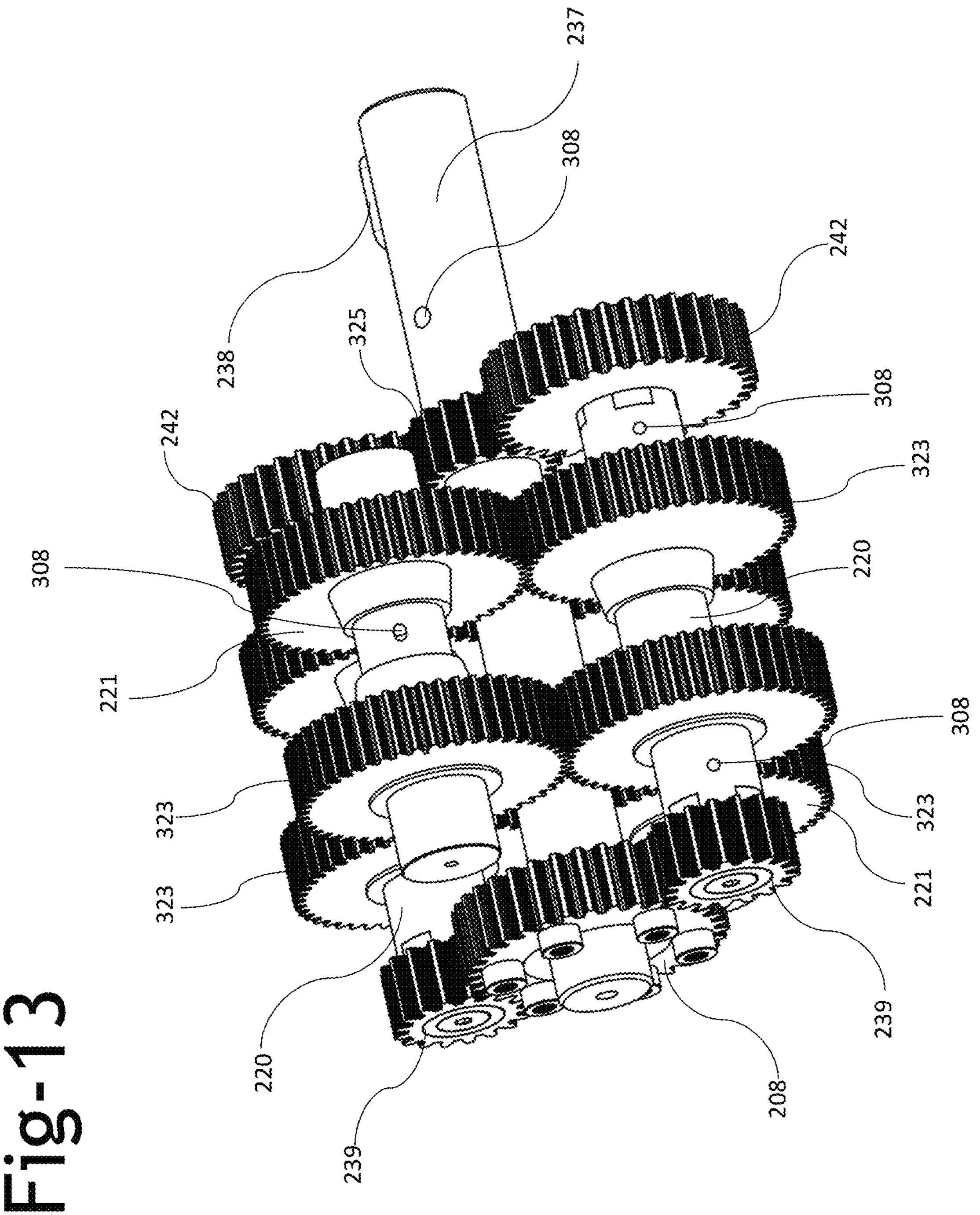
FIG. 13 is a perspective view of the geartrain of the first embodiment of the present invention.

FIG. 13 is an illustration of the geartrain of the rotor with the fixed sun gear of the front cover included for ease of comprehension. Primary crank shafts 220 and secondary crank shafts 221 are geared together in a 1:1 ratio by crank gears 323. Timing gears 239 coupled to primary crank shafts 220 mesh with the fixed sun gear 208 in a 2:1 ratio. Drive gears 242 couple to the posterior end of the primary crank shafts 220 drive the output shaft 237 through engagement with its gear 325. The oil gallery 308 drilling routes oil to all bearing surfaces from entry at the rear bearing of the output shaft. A shaft key 238 is provided to transmit power to the load.

Figure 14:
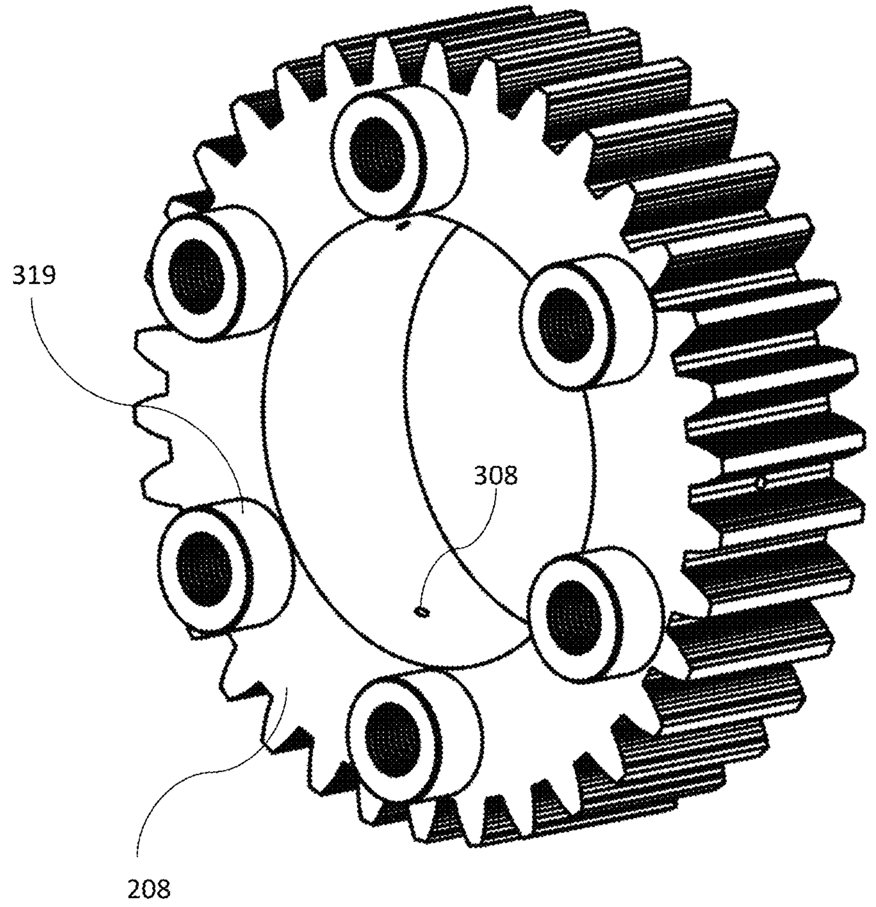
FIG. 14 is a perspective view of the fixed sun gear of the first embodiment of the present invention.

FIG. 14 is a perspective view of the fixed sun gear 208 showing the locating pins 319 that engage with the front cover. Small oil gallery drillings 308 are provided to ensure adequate lubrication of the timing gears.

Figure 15:
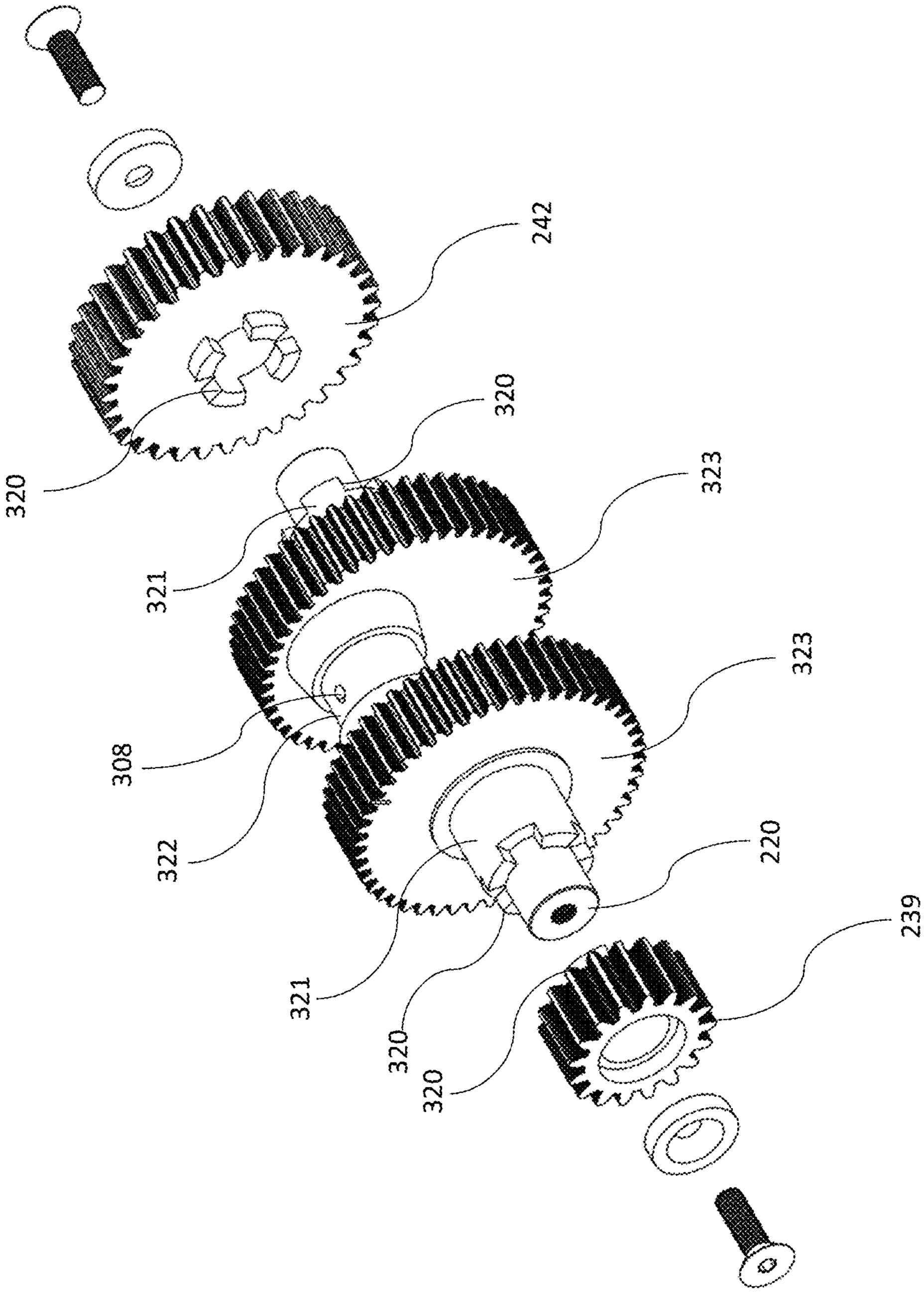
FIG. 15 is an isometric exploded view of the primary crankshaft assembly of the first embodiment of the present invention.

FIG. 15 is an isometric exploded view of a primary crank shaft 220 with its mating timing gears 239 and drive gears 242. Face teeth 320 in each gear engage with face teeth 320 at the main journals on either end of the primary crank shaft 220. The connecting rod journal 322 is straddled on either side by a gear 323. Oil gallery 308 drilling distributes oil from the main journal bearings through the main journals 321 to the connecting rod journal 322.

Figure 16:
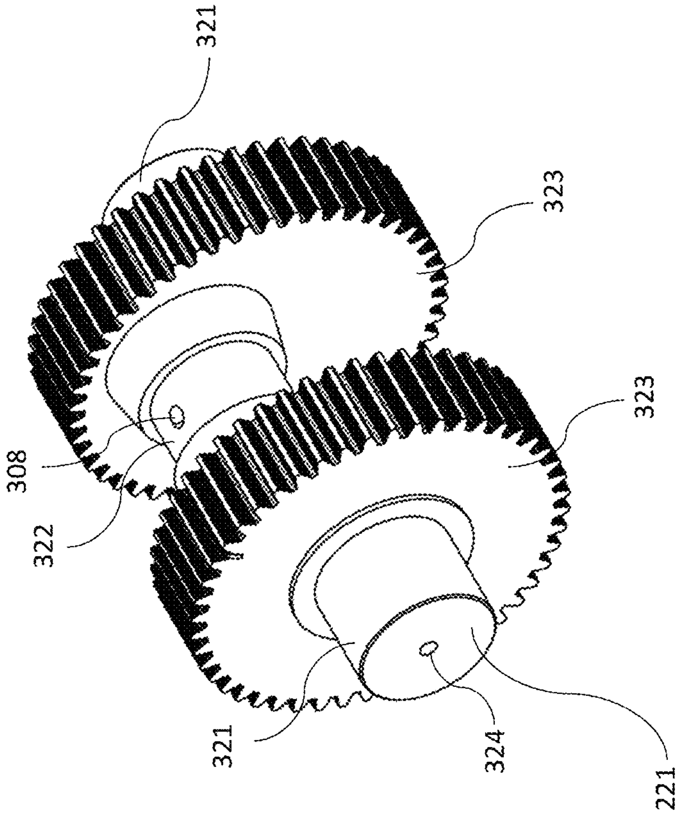
FIG. 16 is an isometric view of the secondary crankshaft of the first embodiment of the present invention.

FIG. 16 is an isometric view of a secondary crank shaft 221. The connecting rod journal 322 is straddled on either side by a gear 323. Oil gallery 308 drilling distributes oil from the main journal bearings through the main journals 321 to the connecting rod journal 322. The main journal ends of the drilled oil gallery are plugged 324 to maintain the desired flow path.

Figure 17:
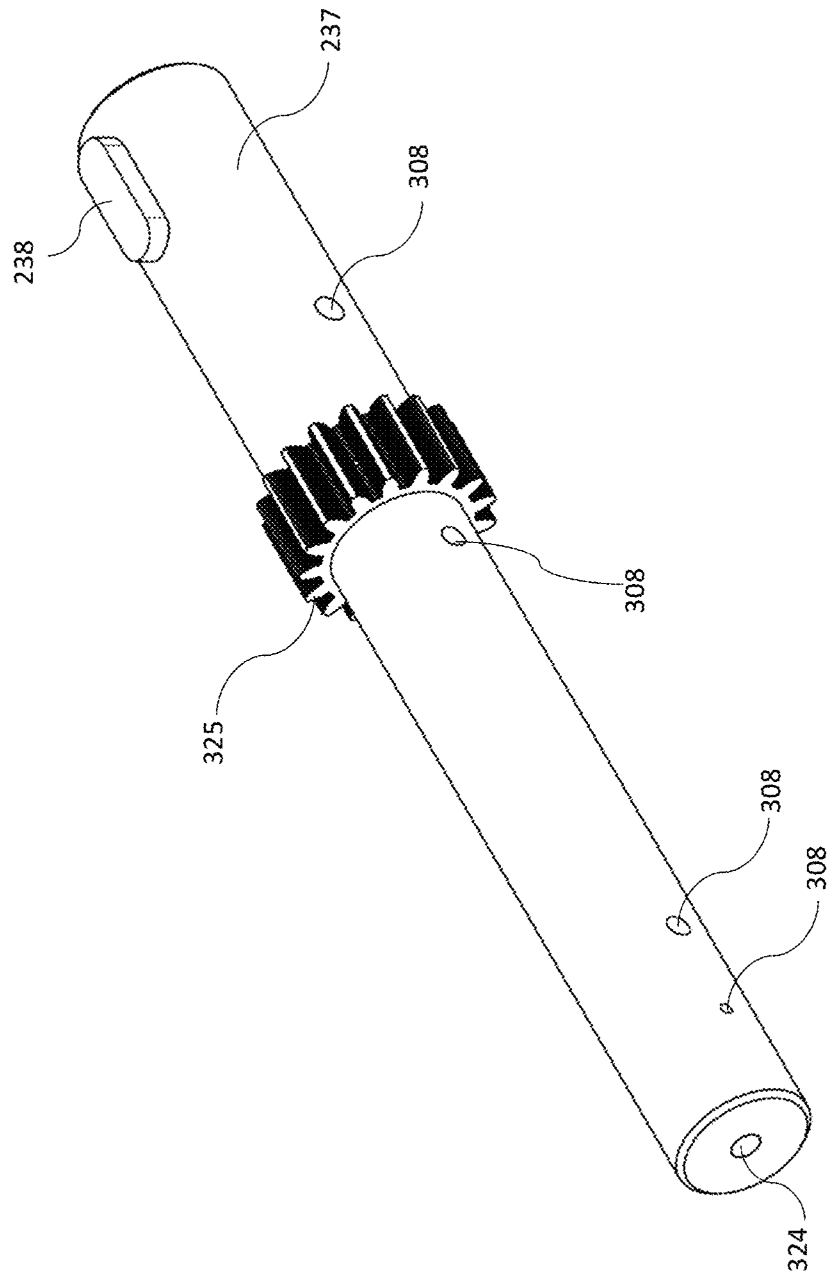
FIG. 17 is an isometric view of the output shaft of the first embodiment of the present invention.

FIG. 17 is an isometric view of the output shaft 237. Oil enters the oil gallery 308 through the rear cover output shaft bearing and is distributed to the front and rear carrier plate output shaft bearings and the front cover bearing. A plug 324 contains oil to maintain pressure and desired flow though the gallery. A gear 325 integral with the shaft is driven by the drive gears and a shaft key 238 transmits power to the load.

Figure 18:
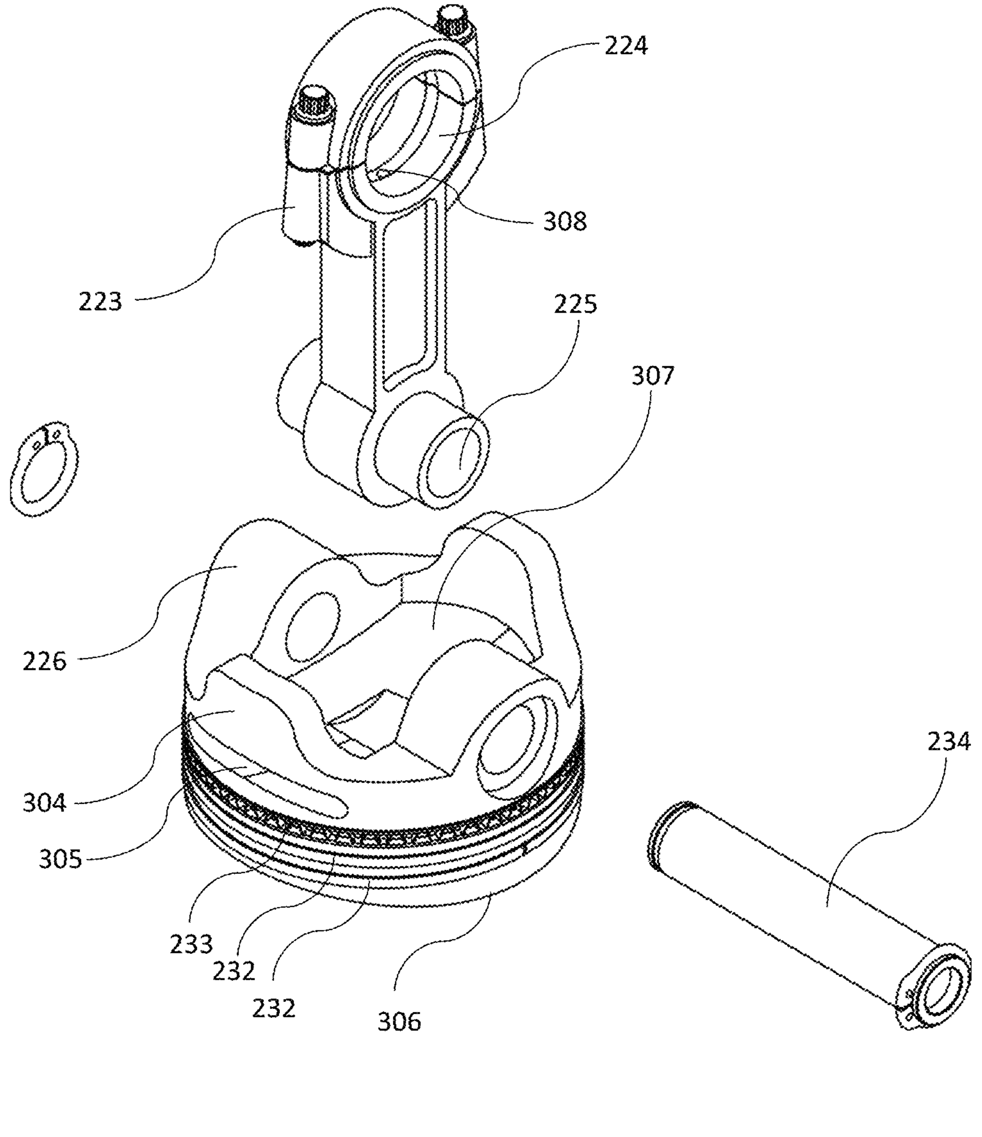
FIG. 18 is a perspective view of a piston and connecting rod of the first embodiment of the present invention.

FIG. 18 is a perspective view of a piston 226 and connecting rod 223 of the present invention. The piston crown 306 is radiused to match the radius of the rotor. Compression sealing is accomplished with compression rings 232 and an oil ring 233 is equipped to limit oil consumption. Piston skirts 304 keep the piston from cocking in the cylinder bore. The piston belly 307 is tapered and radiused to match the rotor interior and skirt oil slots 305 permit the passage of oil to the cylinder sleeve oil passages to avoid accumulation. The connecting rod 223 is attached to the piston 226 via a gudgeon pin 234.

Figure 19:
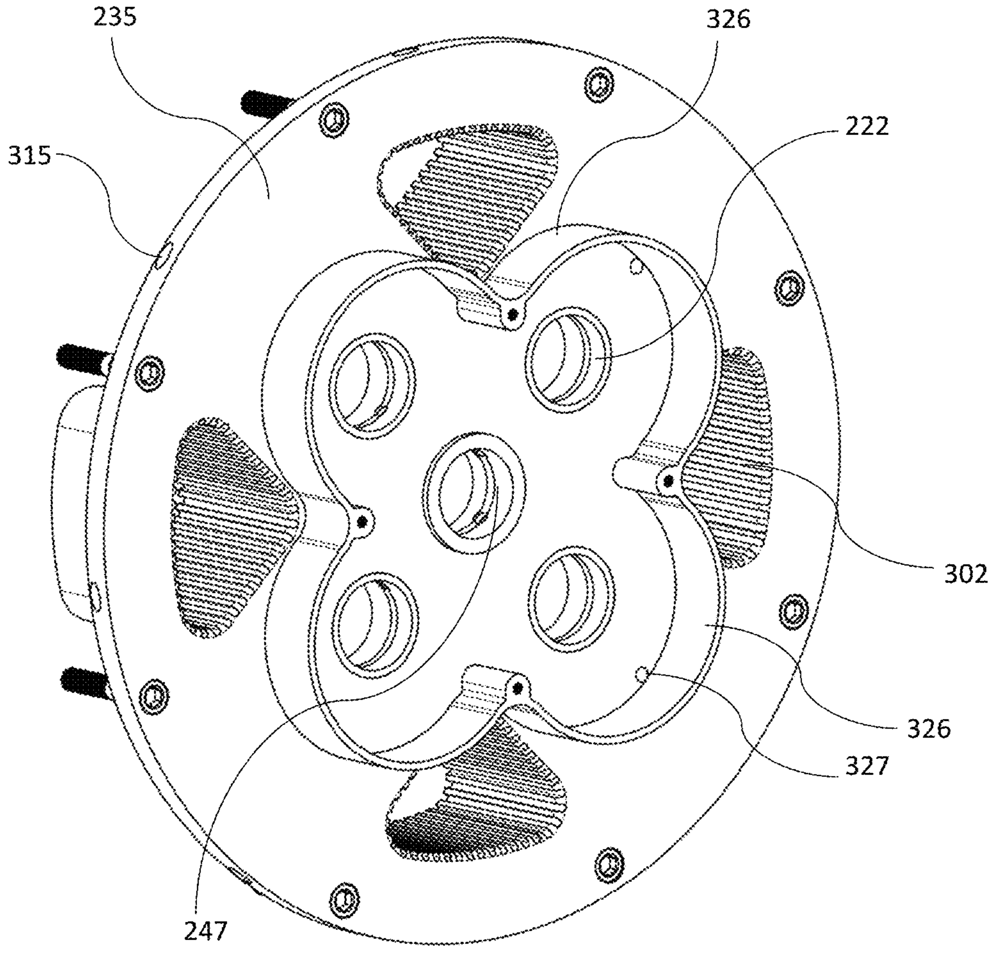
FIG. 19 is an anterior perspective view of the front planetary carrier of the rotor assembly of the first embodiment of the present invention.

FIG. 19 is a frontal perspective view of the front carrier plate 235 of the rotor. The front carrier plate 235 houses four main journal bearings 222 and an output shaft bearing 247. Rotor cooling passages 302 are integrated into the plate 235 as well as the timing cover gear case 326. Oil delivered through the oil gallery is returned to the rotor core by oil return passages 327. Tangential oil passages 315 match the tangential passages of the rotor providing a path from the annular collection groove to the periphery of the rotor.

Figure 20:
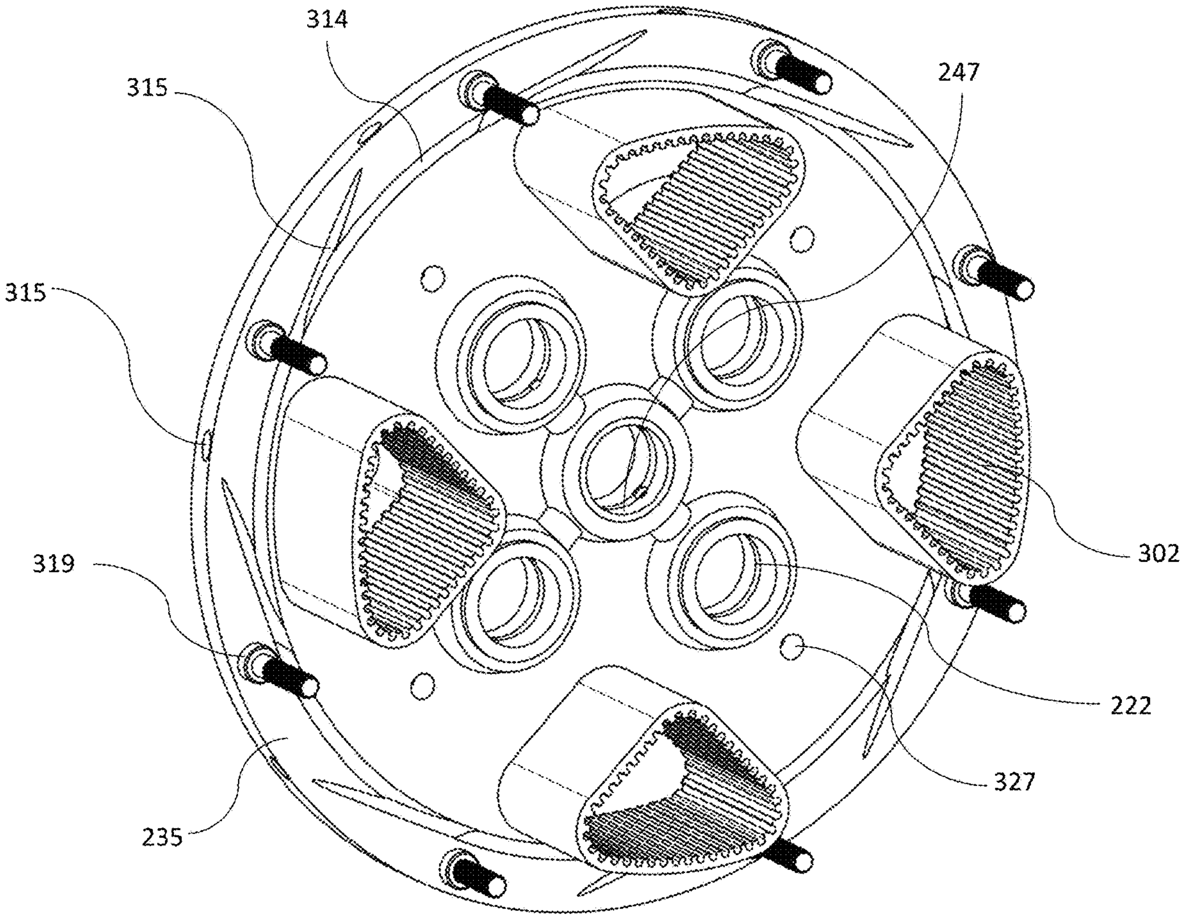
FIG. 20 is a posterior perspective view of the front planetary carrier of the rotor assembly of the first embodiment of the present invention.

FIG. 20 is a posterior perspective view of the front carrier plate 235 of the rotor. The front carrier plate 235 houses four main journal bearings 222 and an output shaft bearing 247. Rotor cooling passages 302 are integrated into the plate 235. Oil delivered through the oil gallery is returned to the rotor core by oil return passages 327. Tangential oil passages 315 match the tangential passages of the rotor providing an oil path from the annular collection groove 314 to the periphery of the rotor. Locating pins 319 are incorporated to key the plate to the rotor.

Figure 21:
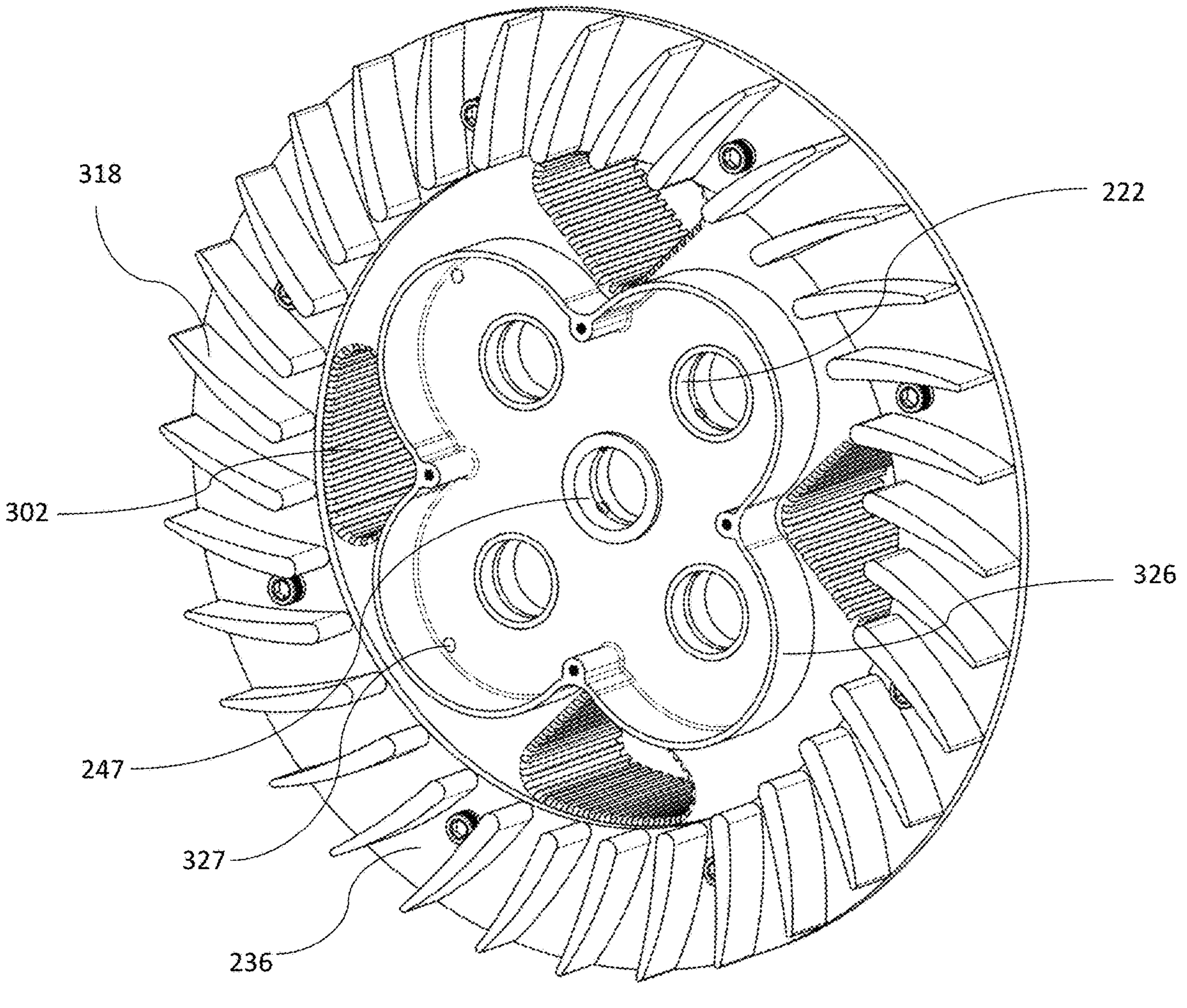
FIG. 21 is a posterior perspective view of the rear planetary carrier of the rotor assembly of the first embodiment of the present invention.

FIG. 21 is posterior perspective view of the rear carrier plate 236 of the rotor. The rear carrier plate houses four main journal bearings 222 and an output shaft bearing 247. Rotor cooling passages 302 are integrated into the plate 236. Oil delivered to the drive gear set is returned to the rotor core by oil return passages 327. Fan blades 318 draw air through the rotor core for cooling.

Figure 22:
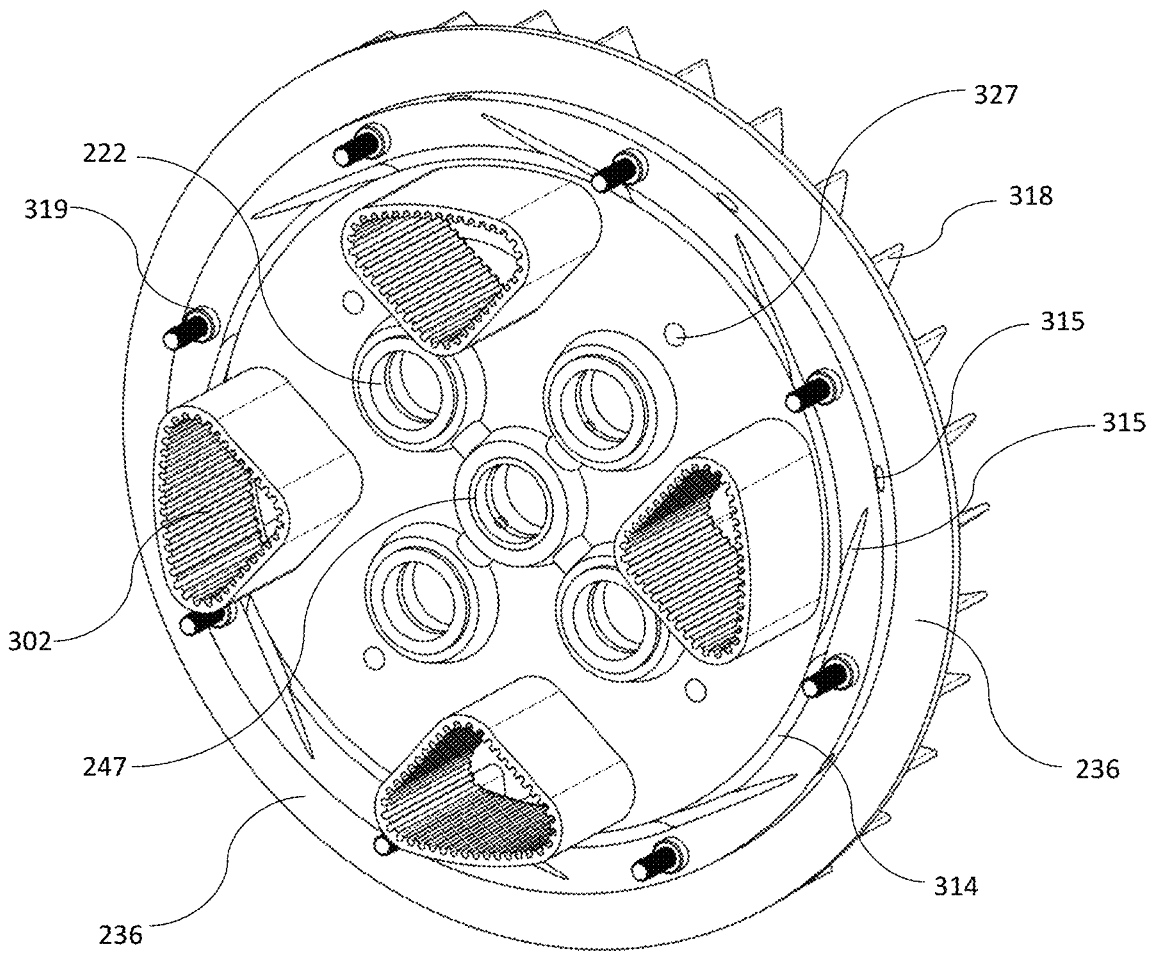
FIG. 22 is an anterior perspective view of the rear planetary carrier of the rotor assembly of the first embodiment of the present invention.

FIG. 22 is an anterior perspective view of the rear carrier plate 236 of the rotor. The rear carrier plate houses four main journal bearings 222 and an output shaft bearing 247. Rotor cooling passages 302 are integrated into the plate 236. Tangential oil passages 315 match the tangential passages of the rotor providing an oil path from the annular collection groove 314 to the periphery of the rotor. Oil delivered to the drive gear set is returned to the rotor core by oil return passages 327. Locating pins 319 are incorporated to key the plate to the rotor.

Figure 23:
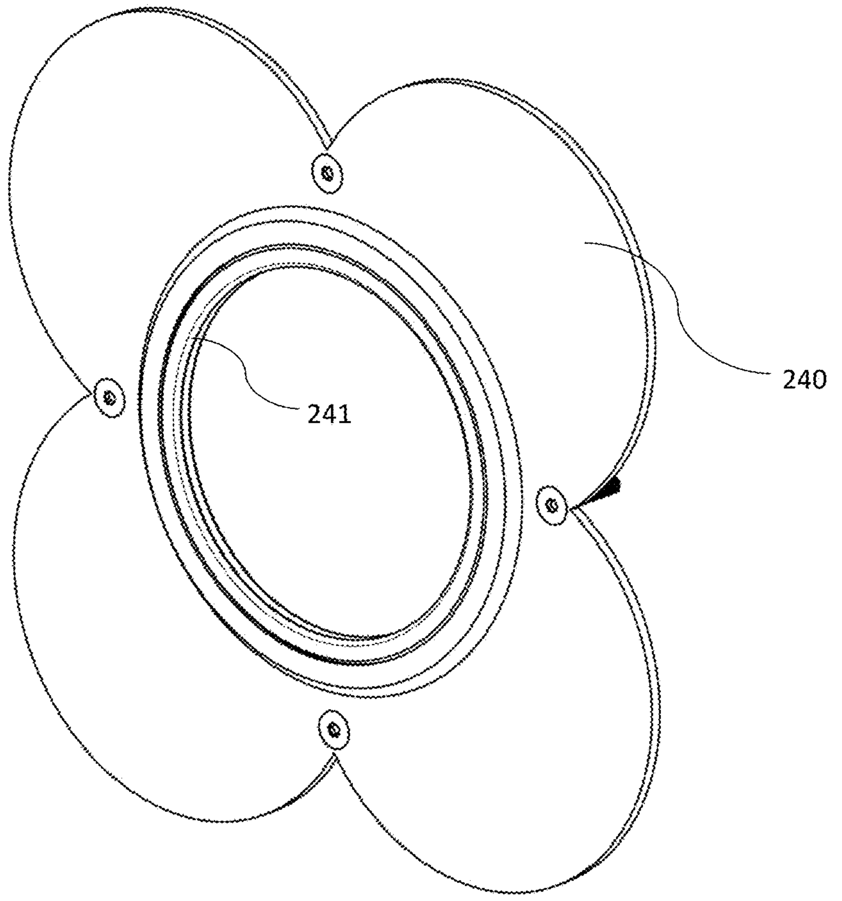
FIG. 23 is a perspective view of the gear case cover and oil seal of the first embodiment of the present invention.

FIG. 23 is a perspective view of the timing gear cover plate 240. It contains oil in the gear case and houses a gear cover oil seal 241 that forms a rotary seal about the oil seal mating surface of the front cover. The drive gear cover 243 (not shown in this figure) is configured the same.

Figure 24:
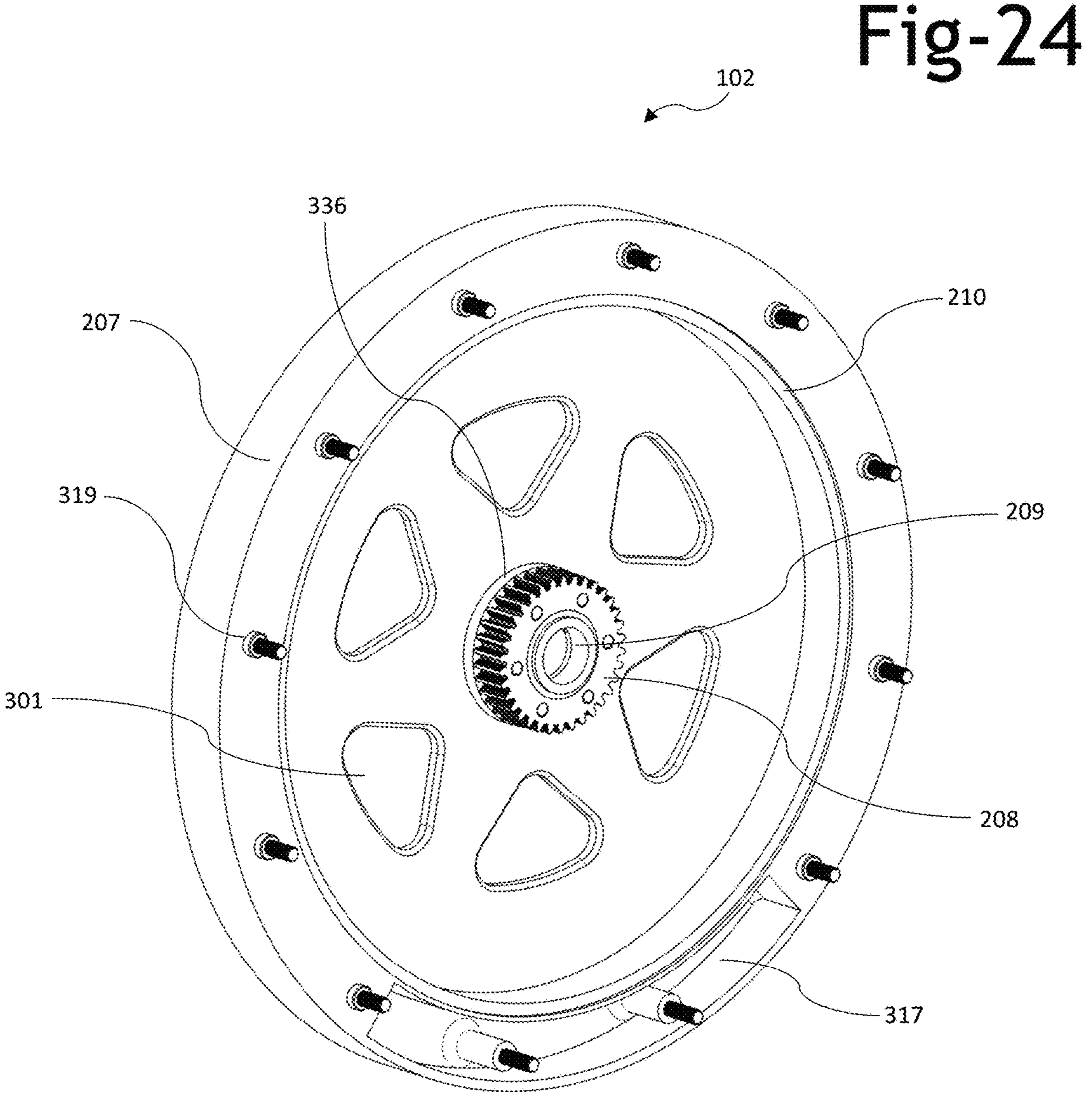
FIG. 24 is a posterior perspective view of the front cover assembly of the first embodiment of the present invention.

FIG. 24 is a perspective view of the front cover assembly 102. The front cover 207 supports the output shaft through output shaft bearing 209. An oil seal mating surface 336 is incorporated to accommodate the gear cover oil seal. Fixed sun gear 208 is rigidly mounted. Locating pins 319 are incorporated to engage with corresponding locating bores in the rotor housing. Front cover cooling passages 301 provide entry of cooling air to the rotor as it is drawn through the rotor core cooling passages by the fan. A lower cavity matching the lower cavity in the rotor housing serves to form the primary oil sump 317. A rotor thrust bearing/seal 210 is fitted to contain oil in the oil gallery and to prevent lateral movement of the rotor.

Figure 25:
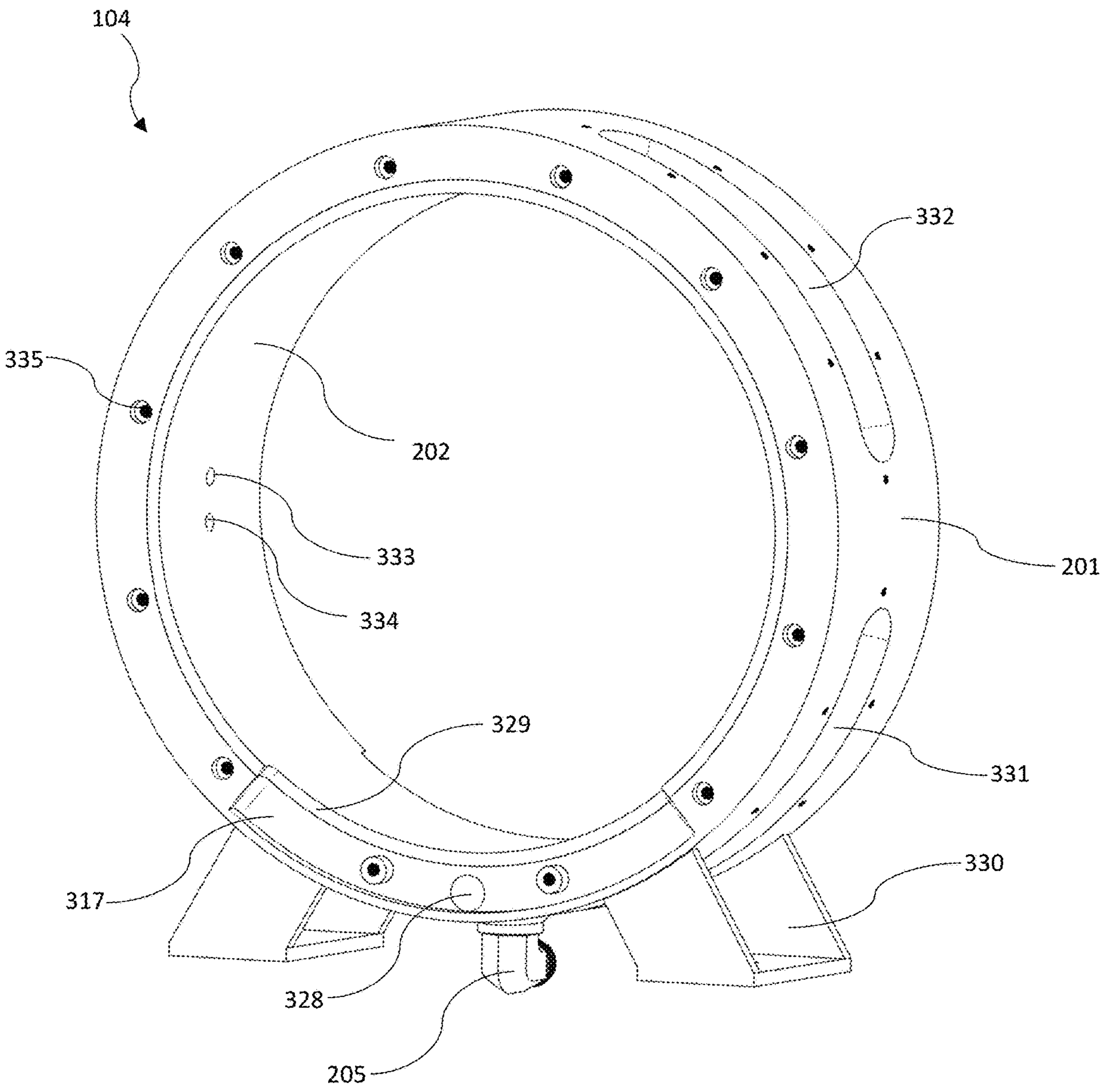
FIG. 25 is an anterior perspective view of the rotor housing assembly of the first embodiment of the present invention.

FIG. 25 is an anterior perspective view of the rotor housing assembly 104. Mounting feet 330 integral to the housing provided means of securing the motor to a substrate. Locating bores 335 are provided to accept the locating pins of the front cover. The rotor housing 201 may be lined with a rotor housing liner 202 of a suitable material to minimize friction and wear. Porting of intake air and spent exhaust gases is provided through intake port 331 and exhaust port 332. A fuel injection port 334 and a spark plug bore 333 are located opposite the intake and exhaust ports in the region occupied by the piston at top dead center and entering the power-stroke. Oil expelled at the periphery of the rotor is free to drain by gravity past the drainage slots 329 into the primary oil sump 317. Oil in the sump flows through the oil sump connecting passage 328 and out through oil drain fitting 205 to a larger remote sump (not illustrated) before it is returned under the force of a pump (not illustrated).

Figure 26:
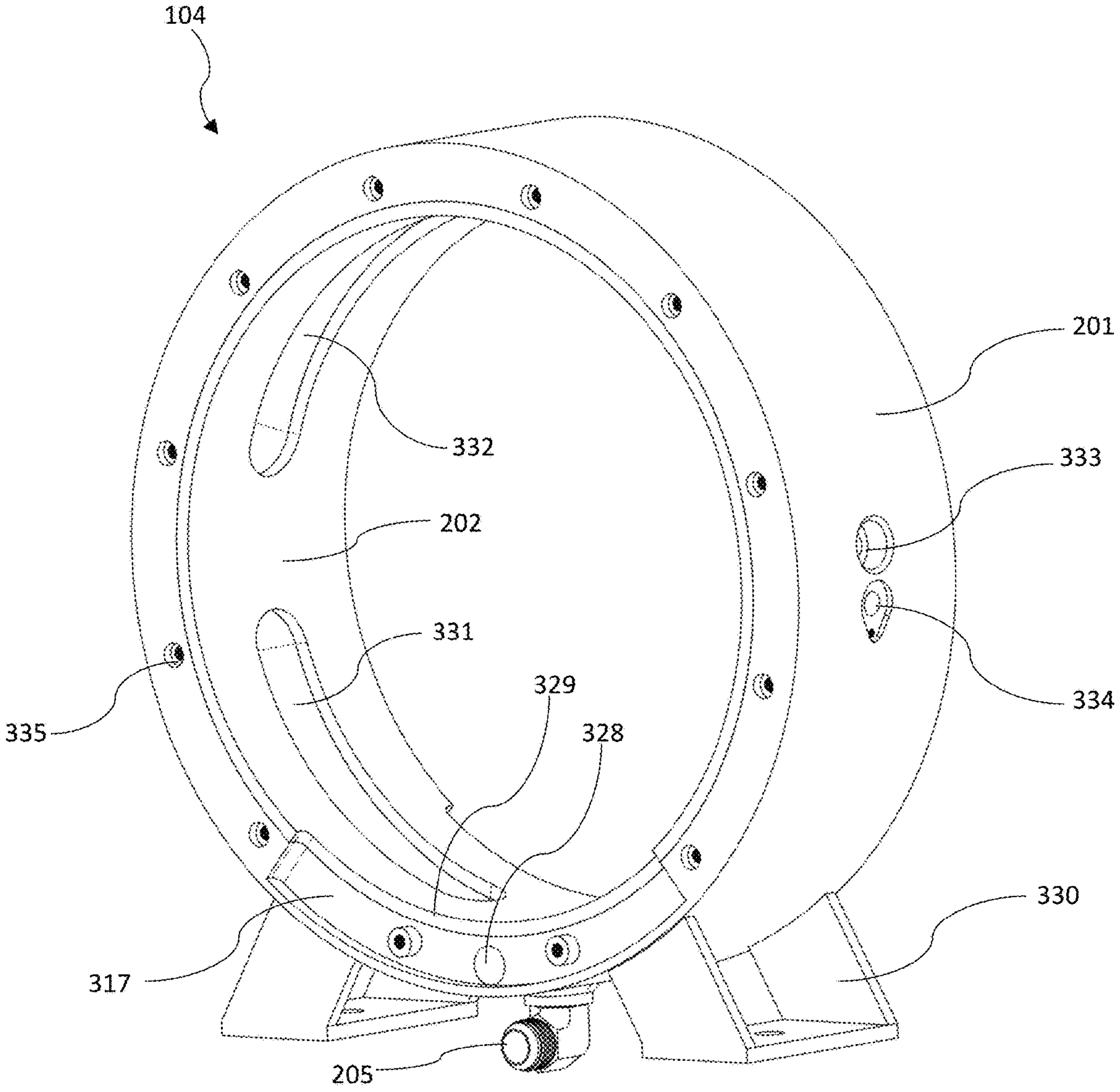
FIG. 26 is a posterior perspective view of the rotor housing assembly of the first embodiment of the present invention.

FIG. 26 is a posterior perspective view of the rotor housing assembly 104 illustrating the features outlined in the preceding paragraph from a different vantage point. Mounting feet 330 integral to the housing provided means of securing the motor to a substrate. Locating bores 335 are provide to accept the locating pins of the front cover. The rotor housing 201 may be lined with a rotor housing liner 202 of a suitable material to minimize friction and wear. Porting of intake air and spent exhaust gases is provided through intake port 331 and exhaust port 332. A fuel injection port 334 and a spark plug bore 333 are located opposite the intake and exhaust ports in the region occupied by the piston at top dead center and entering the power-stroke. Oil expelled at the periphery of the rotor is free to drain by gravity past the drainage slots 329 into the primary oil sump 317. Oil in the sump flows through the oil sump connecting passage 328 and out through oil drain fitting 205 to a larger remote sump (not illustrated) before it is returned under the force of a pump (not illustrated).

Figure 27:
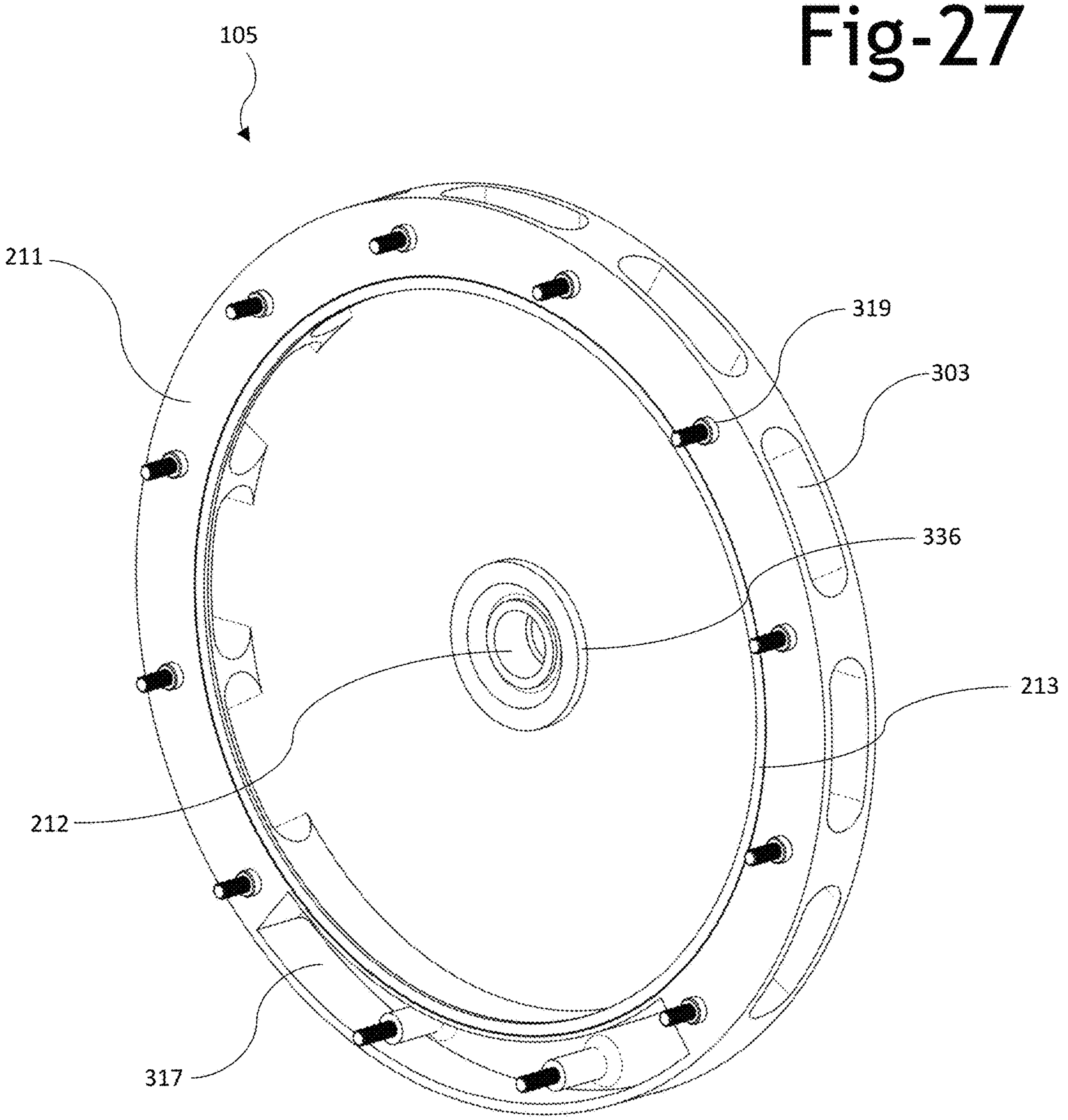
FIG. 27 is an anterior perspective view of the rear cover assembly of the first embodiment of the present invention.

FIG. 27 is a perspective view of the rear cover assembly 105. The rear cover 211 supports the output shaft through rear cover output shaft bearing 212. An oil seal mating surface 336 is incorporated to accommodate the gear cover oil seal. Rear cover cooling passages 303 provide egress of cooling air drawn through the rotor core cooling passages by the fan. A lower cavity matching the lower cavity in the rotor housing serves to form the primary oil sump 317. A rotor thrust bearing/seal 213 is fitted to contain oil in the oil gallery and to prevent lateral movement of the rotor.

Figure 28:
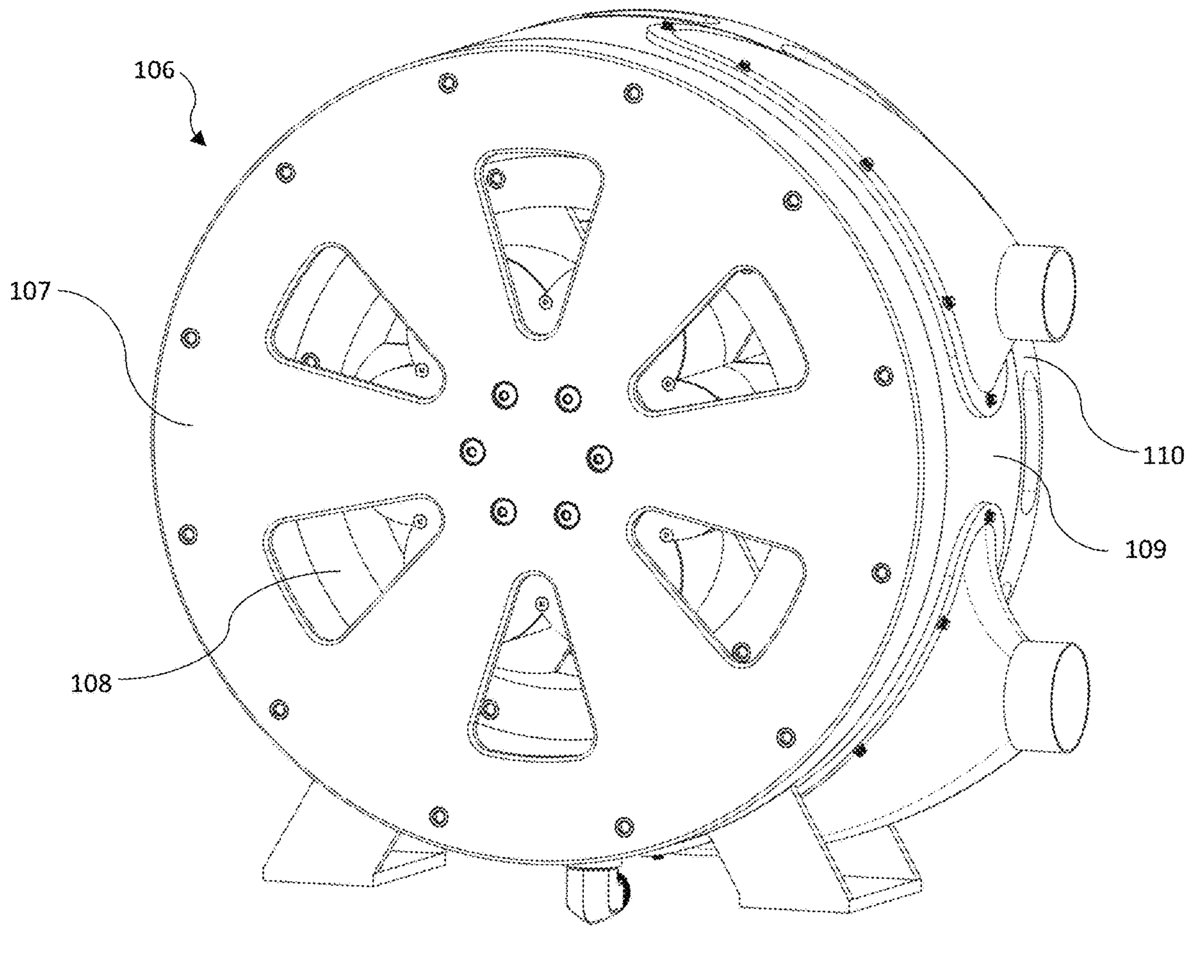
FIG. 28 is an anterior perspective view of a 6-cylinder engine of the second embodiment of the present invention.
Figure 29:
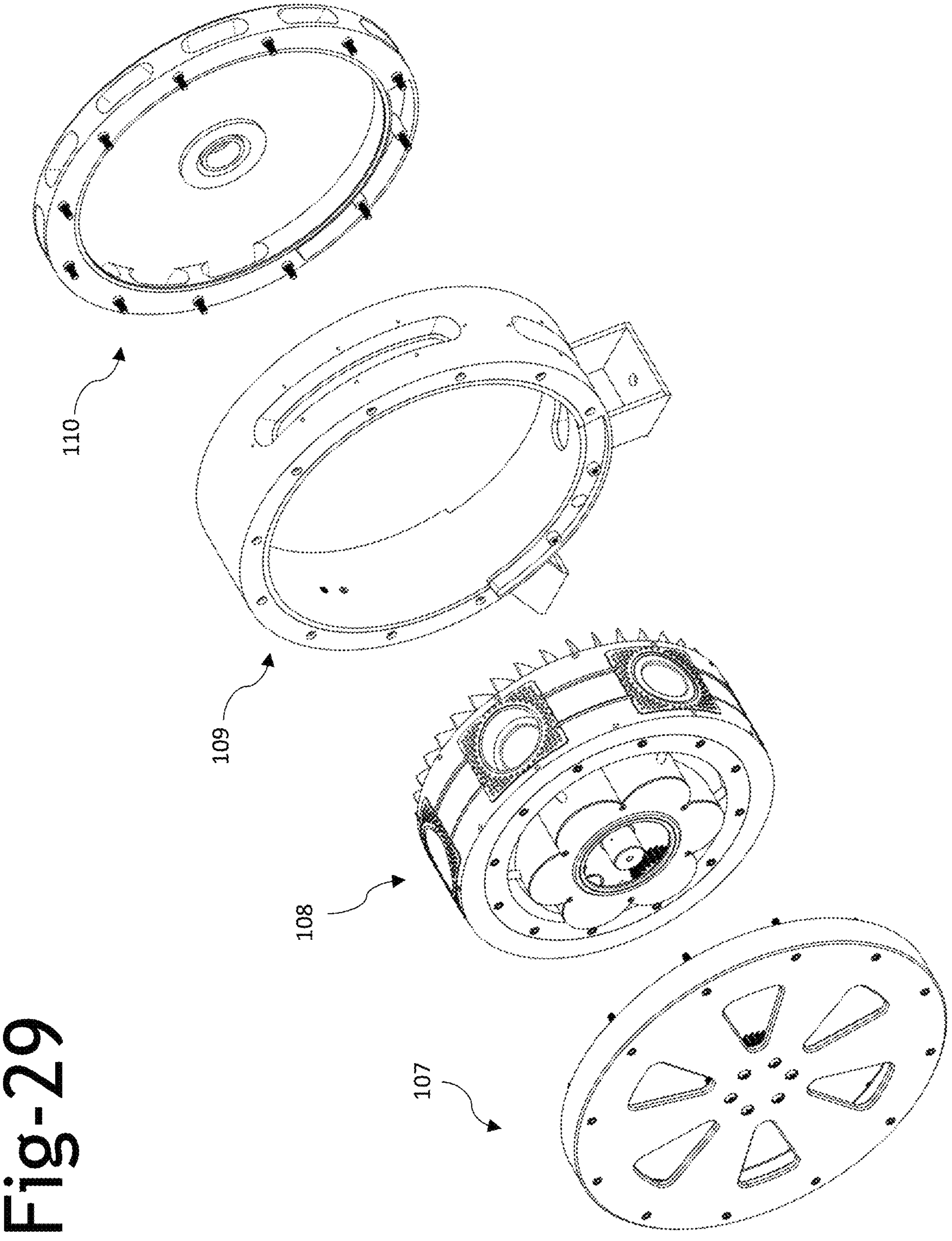
FIG. 29 is an isometric exploded view of the second of the preferred embodiments illustrating the major assemblies from an anterior vantage point.

For a fuller understanding of the nature, application, and function of the second embodiment of the present invention, reference should be directed to the following detailed description taken in context with the accompanying drawings. Referring first to FIGS. 28 and 29 for a better understanding of the general construction of the second preferred embodiment. A 6-cylinder engine assembly 106 is illustrated in assembled form and in an exploded representation of its major components. A rotor assembly 108 is sandwiched between a front cover plate assembly 107 and a rear cover plate assembly 110 and axially constrained to rotation within a rotor housing assembly 109.

Figure 30:
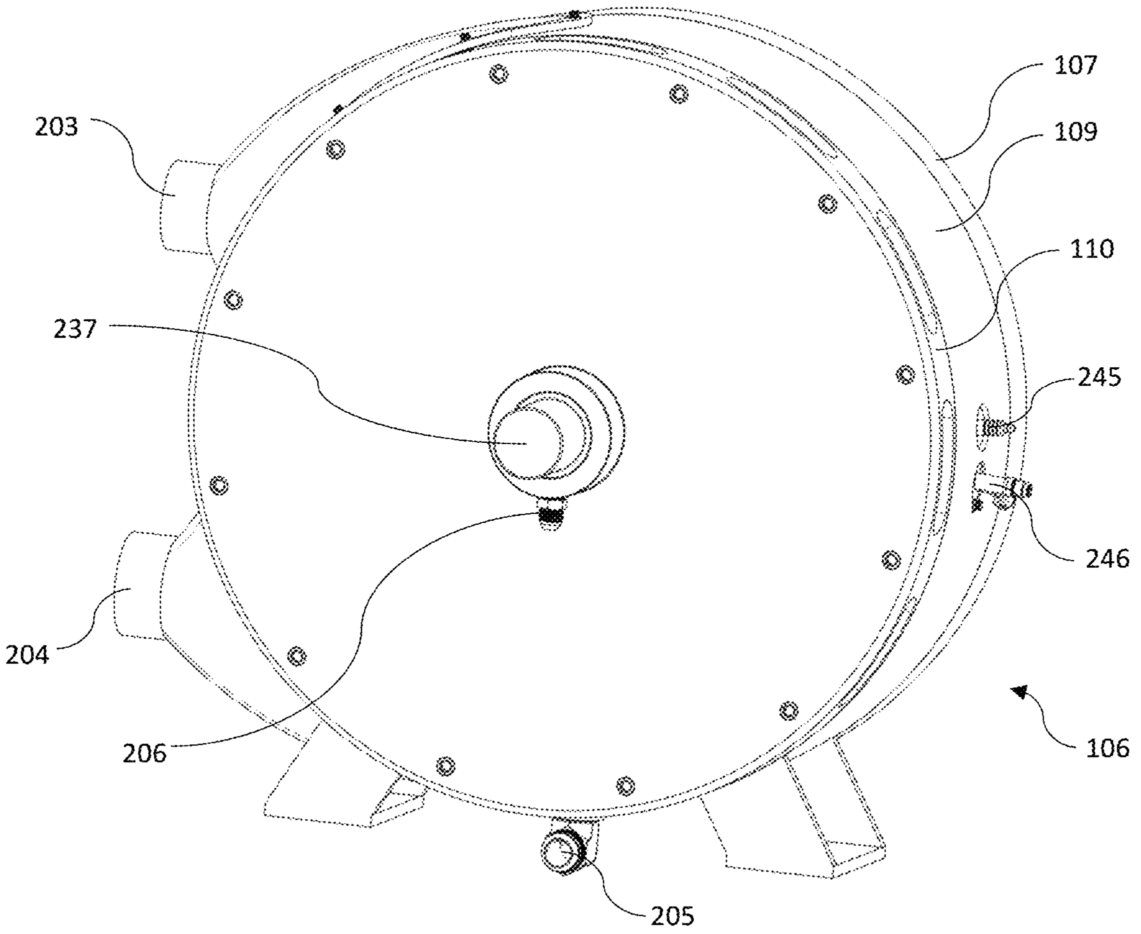
FIG. 30 is a posterior perspective view of a 6-cylinder engine of the second embodiment of the present invention.
Figure 31:
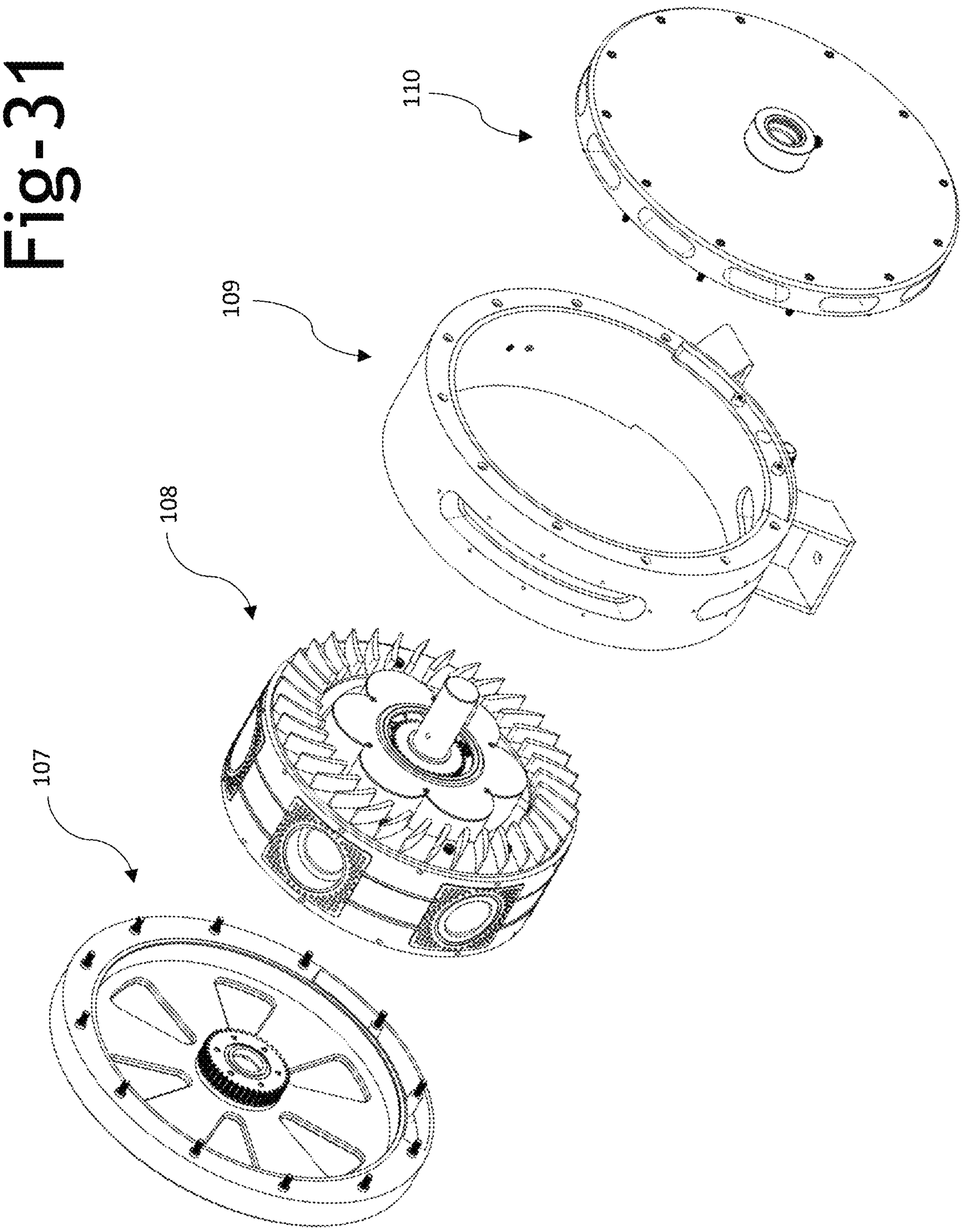
FIG. 31 is an isometric exploded view of the second of the preferred embodiments illustrating the major assemblies from a posterior vantage point.

Referring now to FIG. 30 and FIG. 31 which offer a view of engine assembly 106 from a posterior vantage point. A rotor assembly 108 is sandwiched between a front cover plate assembly 107 and a rear cover plate assembly 110 and axially constrained to rotation within a rotor housing assembly 109. An oil supply fitting 206 is equipped to route oil under pressure to the oil gallery. Oil is returned to a remote reservoir through oil return fitting 205. Intake air is drawn through intake manifold 204 and exhaust expelled through exhaust manifold 203. Fuel is delivered by fuel injector 246 and ignited by spark plug 245.

Figure 32:
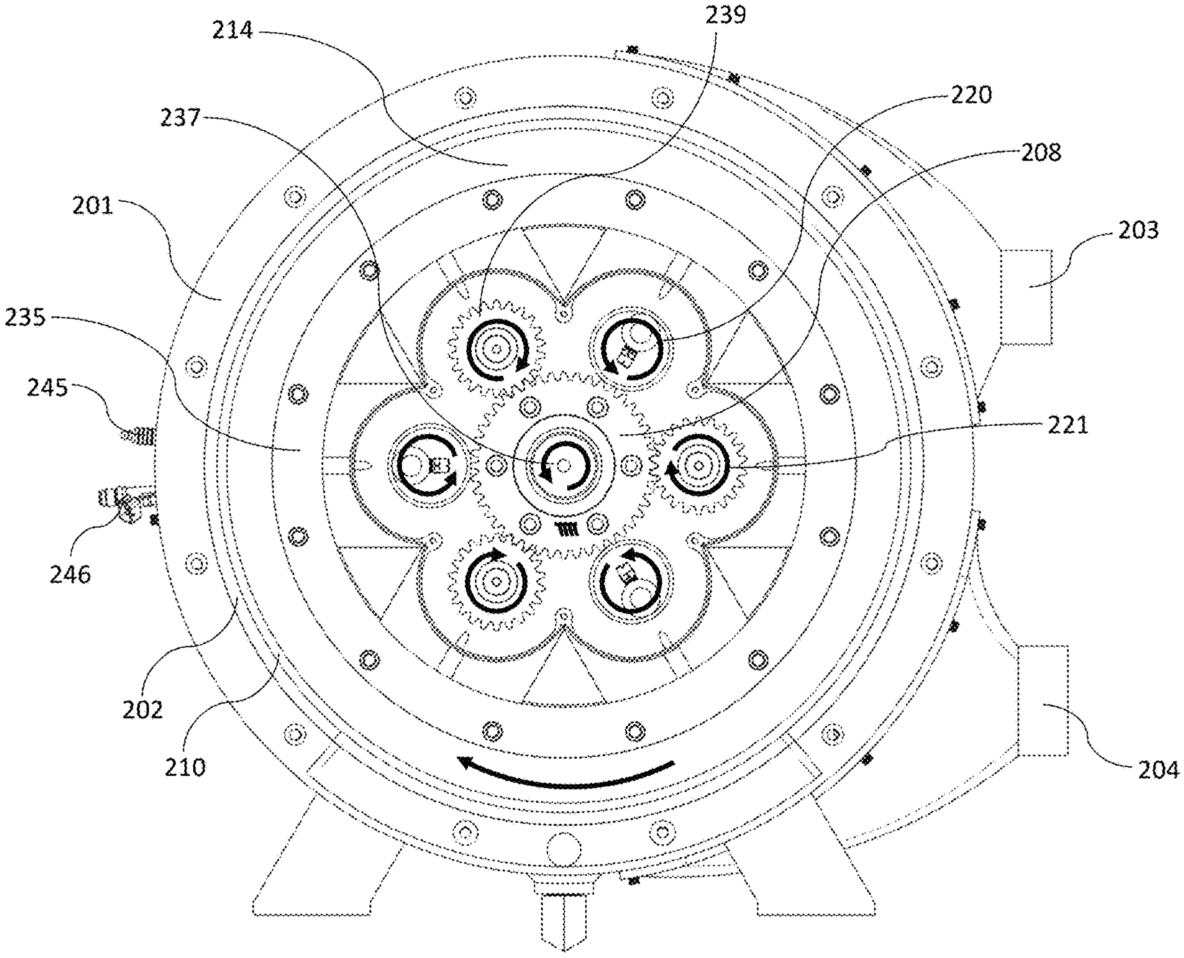
FIG. 32 is an orthogonal front view of the second of the preferred embodiments with the front cover and the timing gear cover hidden from view.
Figure 33:
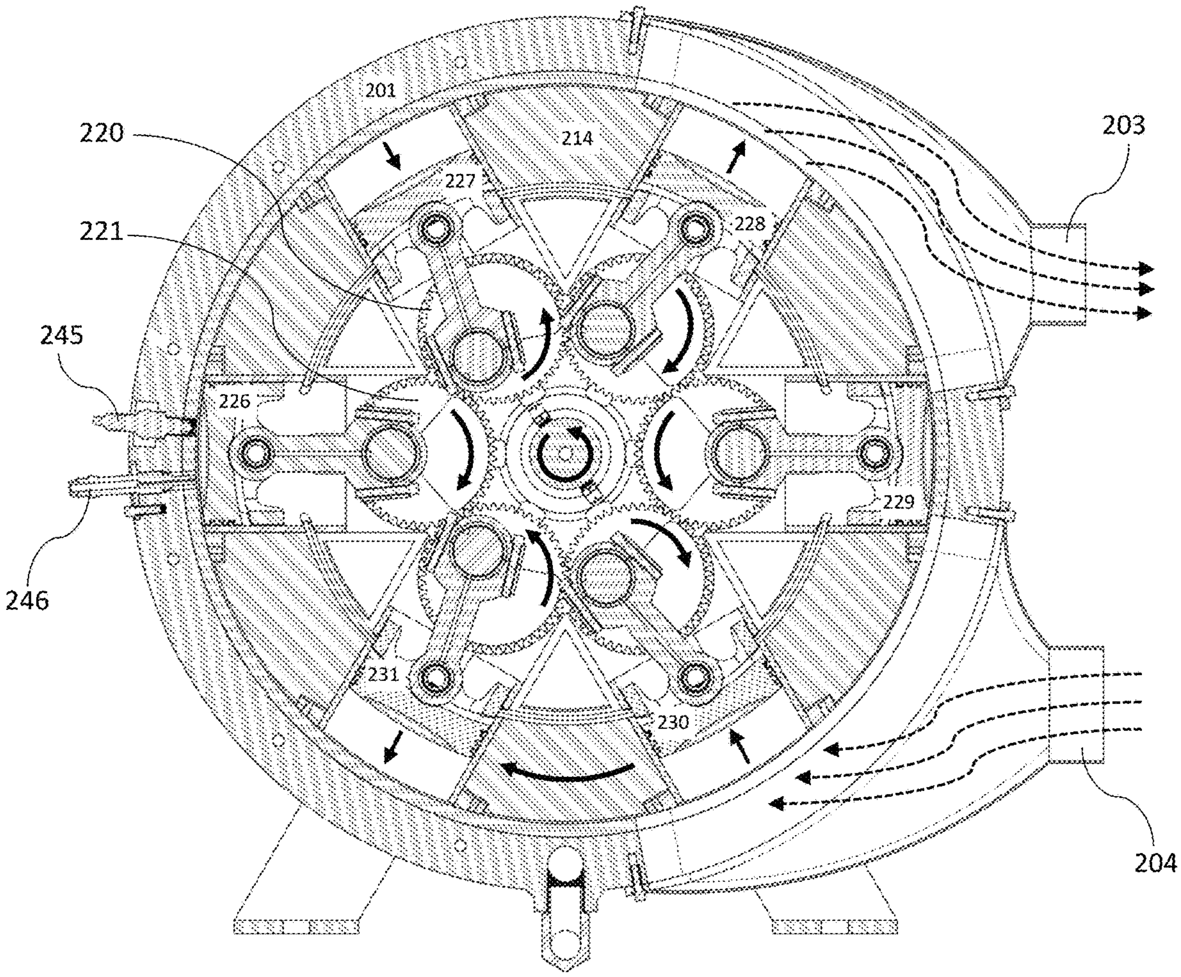
FIG. 33 is a cross sectional view of the second of the preferred embodiments with piston 1 at the beginning of the power stroke.
Figure 34:
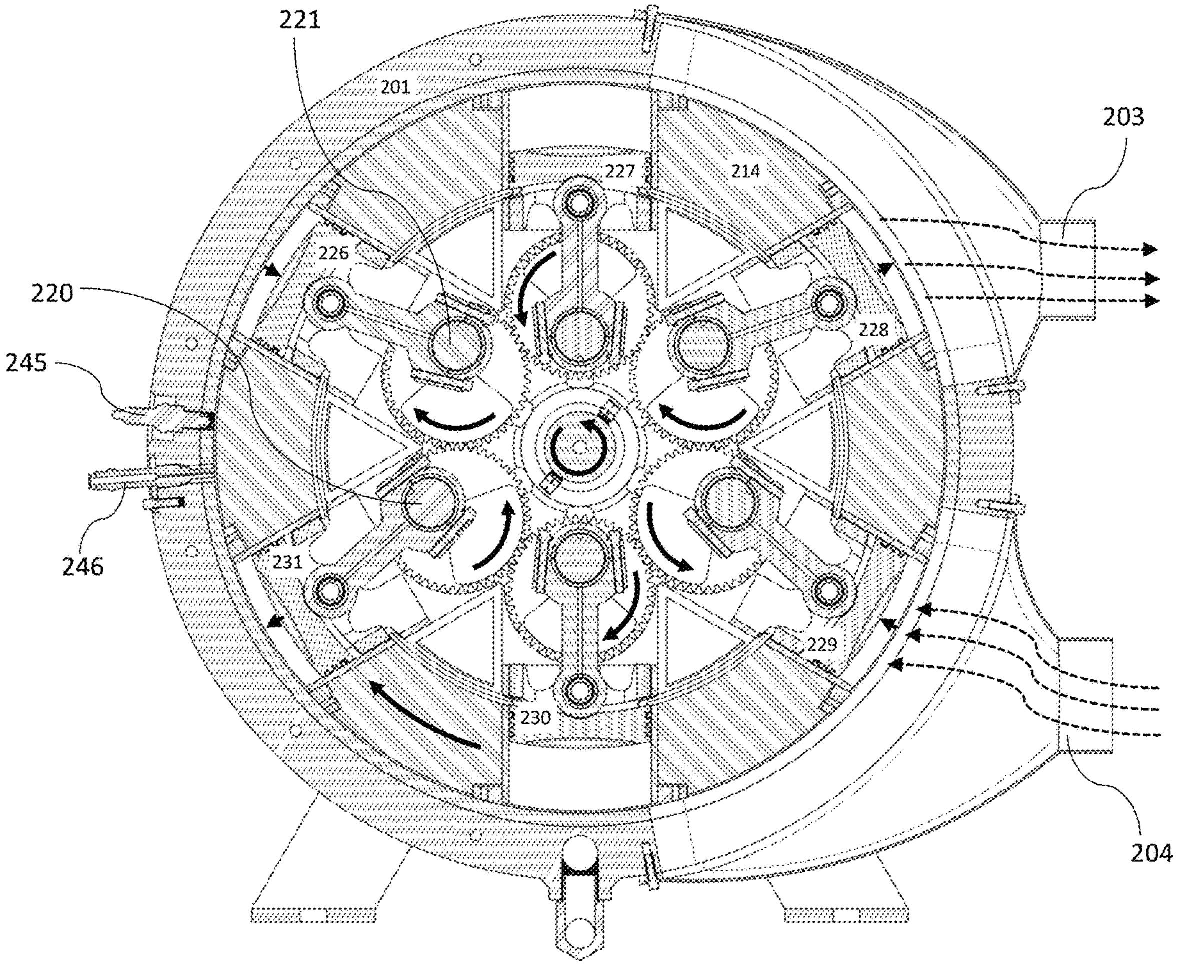
FIG. 34 is a cross sectional view of the first of the preferred embodiments with piston 1 partially through the power stroke.
Figure 35:
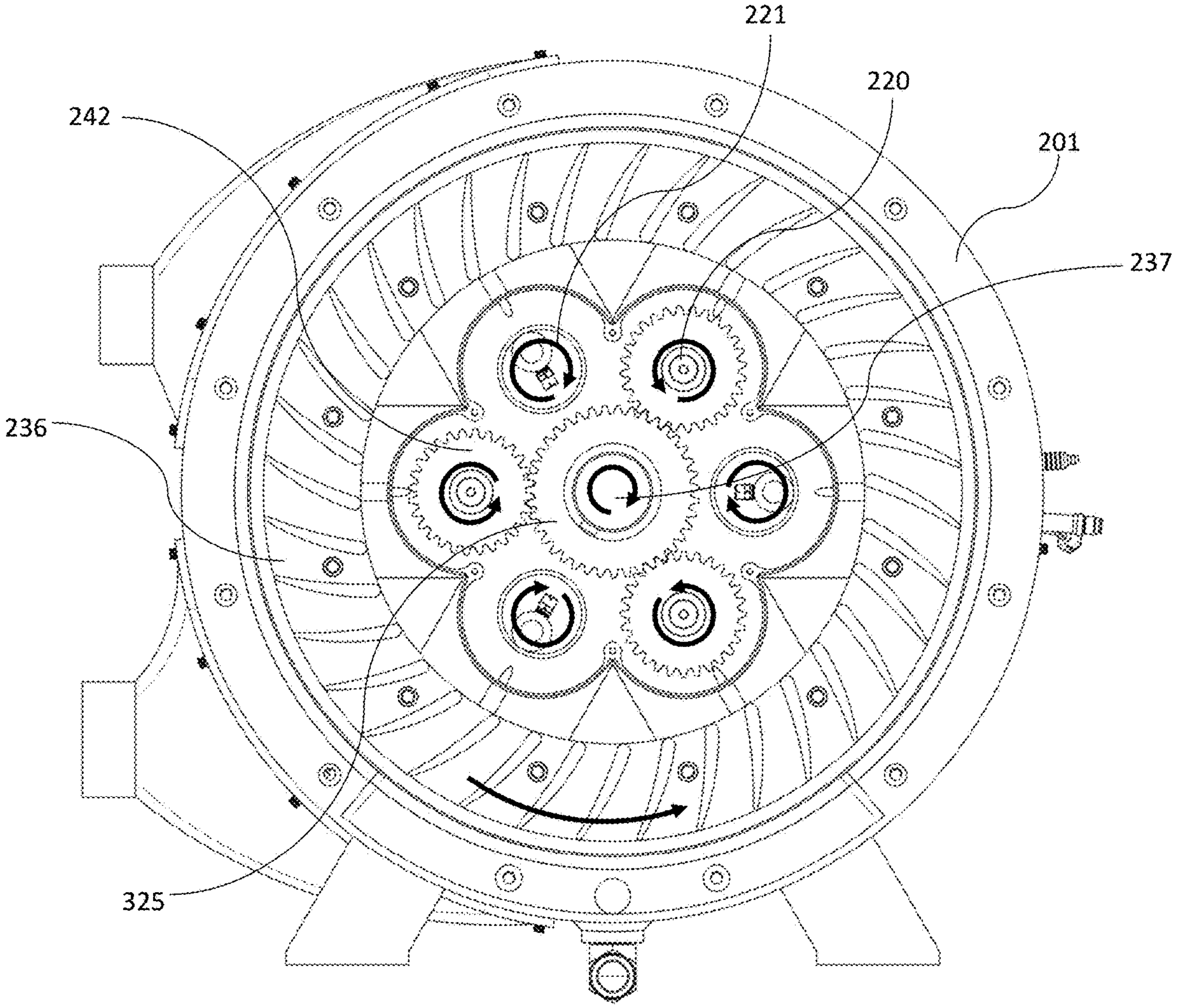
FIG. 35 is a rear orthogonal view of the second of the preferred embodiments with the rear cover and the drive gear cover hidden from view.

For a better understanding of the function of the second embodiment of the engine assembly, reference is directed to FIGS. 32, 33, 34 and 35 which clearly show the dynamic relation of the components of the engine assembly. FIG. 32 illustrates the relative motion of the primary crank shafts 220, the secondary crank shafts 221, the rotor 214, and the output shaft 237. Primary crank shafts 220 and secondary crank shafts 221 are geared together to counter rotate in unison. The timing gears 239 mesh with the fixed sun gear 208 in a ratio of 2:1. Thus, for each revolution of the rotor 214, the crank shafts complete 2 revolutions. FIG. 33 is a cross sectional view with piston 1 226 at top dead center and at the beginning of the power stroke. As the rotor is rotating clockwise as viewed, piston 1 226 is entering its power stroke, piston 2 227 is completing its power stroke, piston 3 228 is in its exhaust stroke, piston 4 229 is entering its intake stroke, piston 5 230 is completing its intake stroke, and piston 6 231 is in its compression stroke. FIG. 34 further enhances understanding of the cycle with the rotor advanced 15 degrees clockwise, and by way of directional arrows placed within the cylinder bores. Pistons 2 227 and 5 230 are at their bottom dead centers and transitioning between strokes. Piston 1 226 is in its power stroke, piston 3 228 is in its exhaust stroke, piston 4 229 is in its intake stroke, and piston 6 231 is in its compression stroke. FIG. 35 more clearly illustrates the mechanism in which the output shaft 237 is driven. As the primary crank shafts 220 are driven at 2 times the rotor speed, the drive gears 242 rigidly coupled to them drive the output shaft 237 through its output shaft gear 325. A final drive ratio of 28:39 between the drive gears 242 and the output shaft gear 325 is employed in this embodiment resulting in a shaft speed of roughly 7/16 the speed of the rotor.

Figure 36:
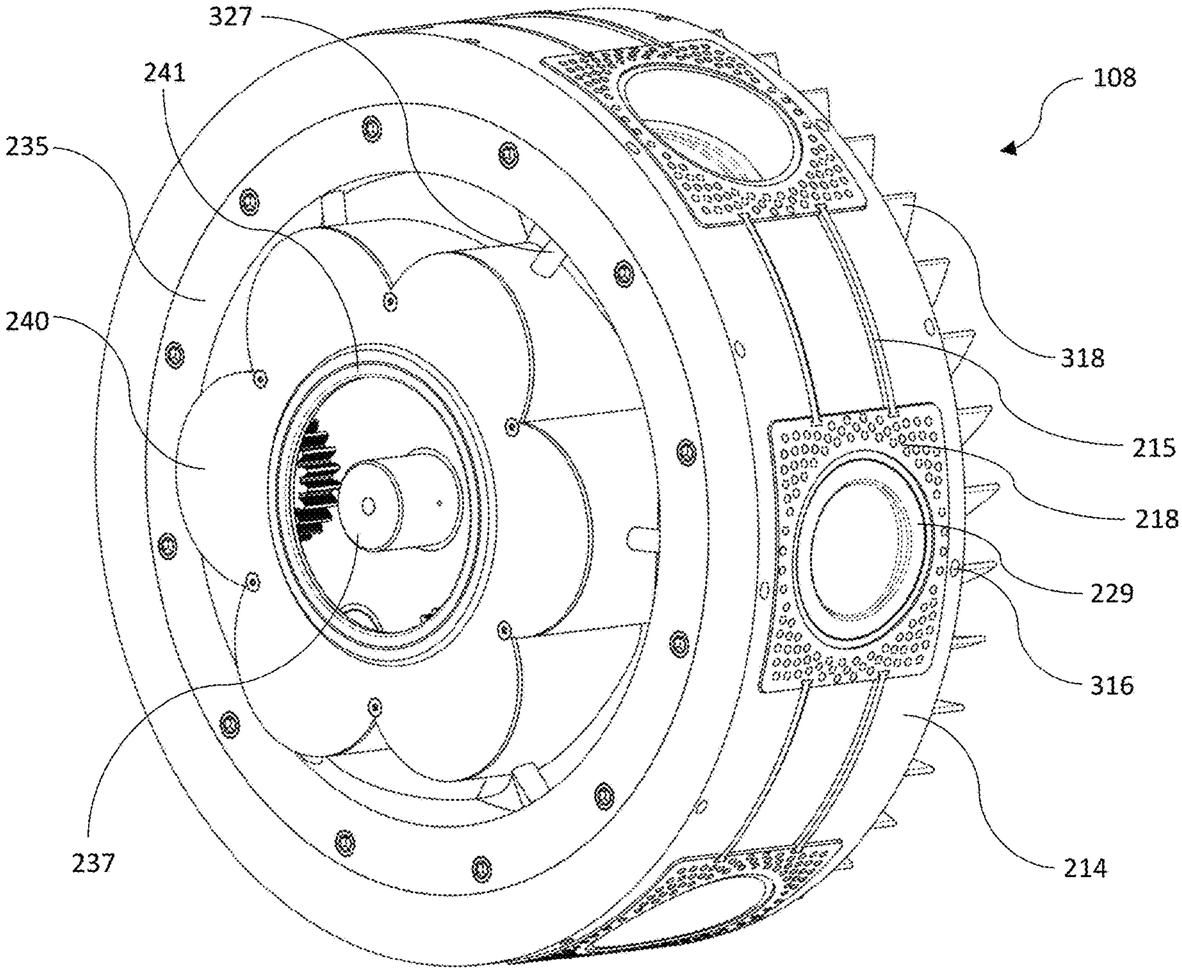
FIG. 36 is an anterior perspective view of the rotor assembly of the second embodiment of the present invention.

Referring now to FIG. 36 which is a perspective view of the rotor assembly 108 of the present invention. In this view, the rotor 214, front planetary carrier plate 235, piston 229, composite cylinder seal 218, rotor oil rings 215, and timing gear cover plate 240 with oil seal 241 can be clearly seen. Some of the features such as oil return passages 327, oil ejection ports 316, and fan blades 318 are also visible.

Figure 37:
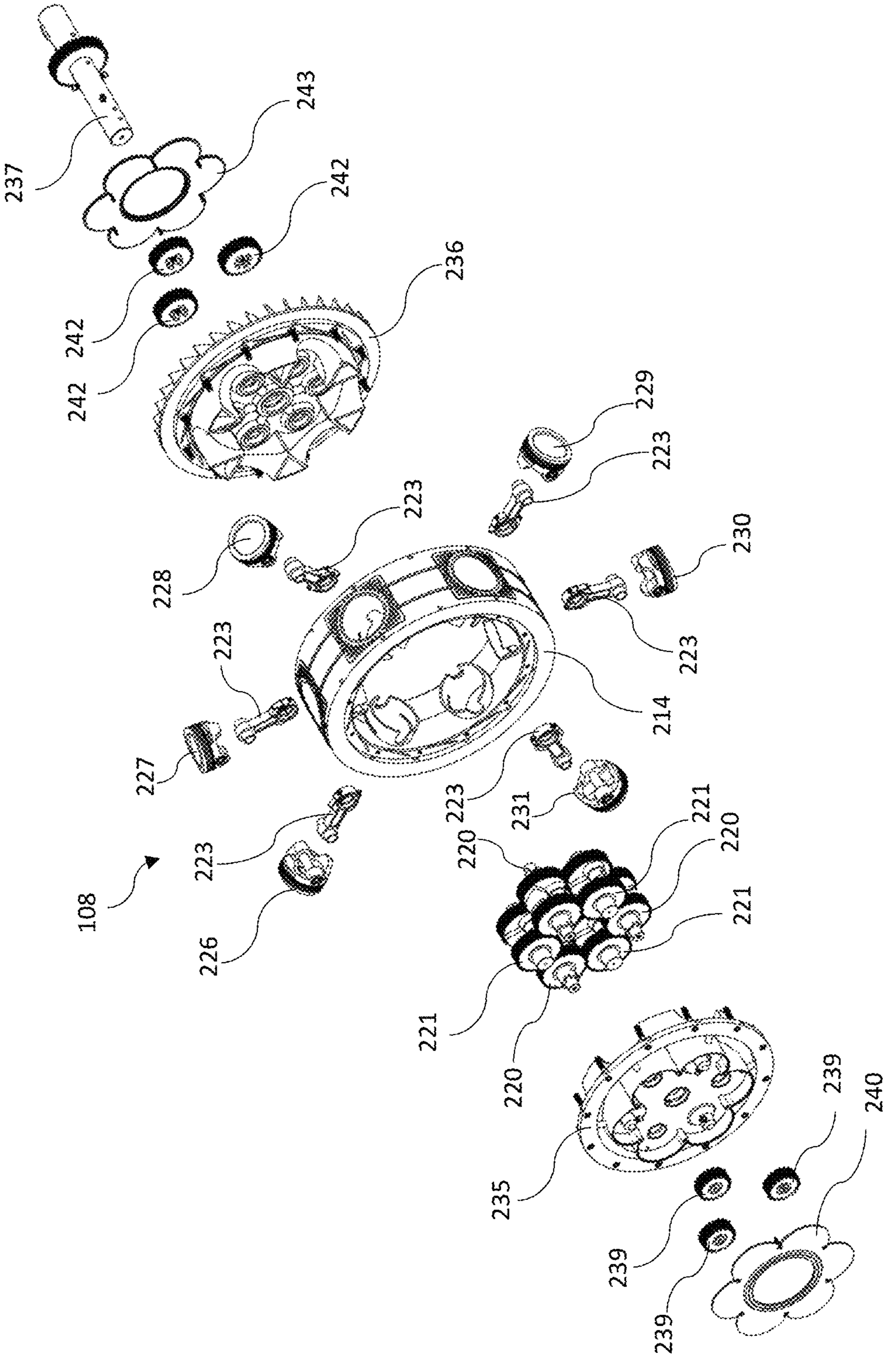
FIG. 37 is an isometric exploded view of the rotor assembly of the second embodiment of the present invention.

For a better understanding of the components and their function within the rotor assembly 108, reference is directed to FIG. 37. A rotor 214 with six cylinder bores houses primary and secondary crankshafts 220 and 221, connecting rods 223, and pistons 226, 227, 228, 229, 230, 231. The crankshafts 220 and 221 are geared together and constrained to rotation about their axis by a front planetary carrier plate 235 and a rear planetary carrier plate 236. Timing gears 239 and drive gears 242 are secured to the ends of each primary crank shaft 221. An output shaft 237 meshes with the drive gears 242. Timing gear cover plate 240 and drive gear cover plate 243 provide a means of containing oil in the rotor assembly.

Figure 38:
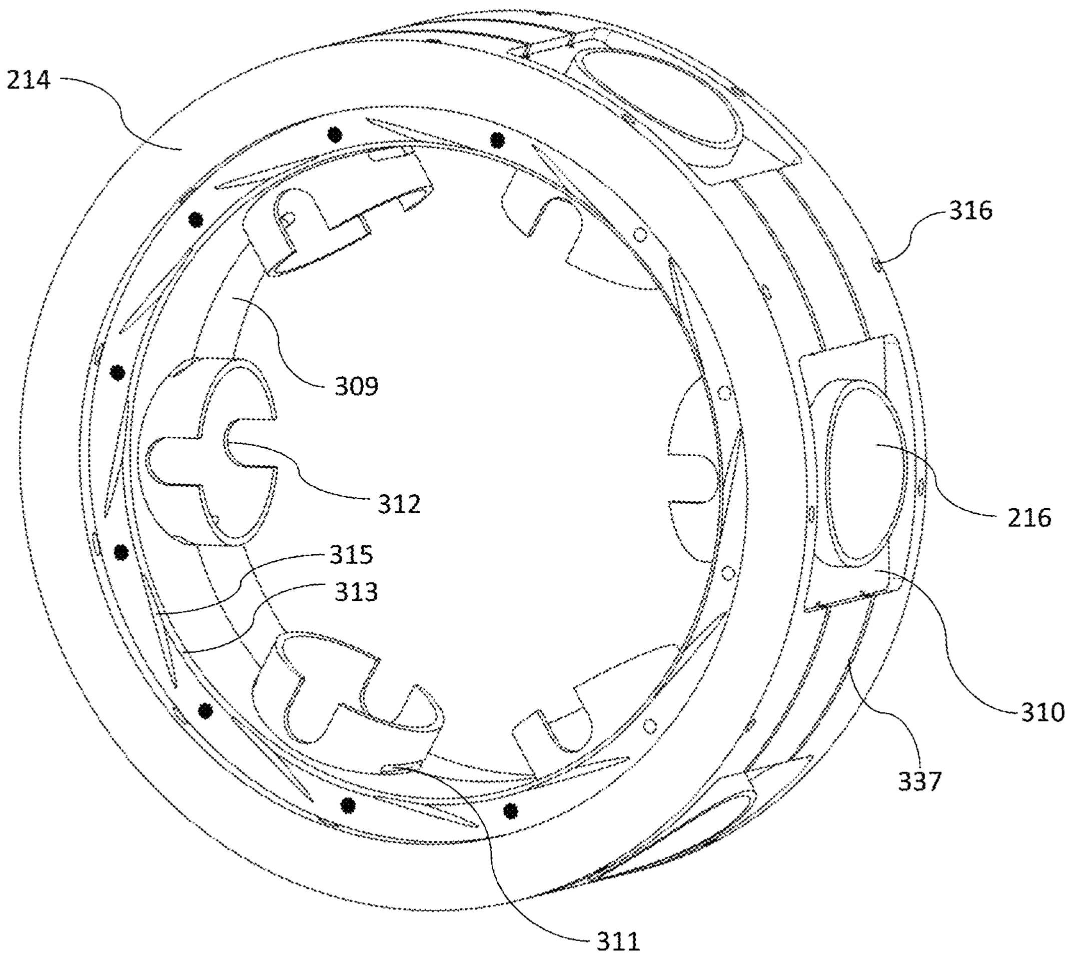
FIG. 38 is a perspective view of the rotor of the second embodiment of the present invention.

FIG. 38 is a perspective view of the rotor 214 illustrating its features. Six equally spaced bores are present in the rotor 214 and each contains an interference fit cylinder sleeve 216. A counterbore 310 is provided for each cylinder in the circumferential surface of the rotor 214 to accommodate a composite cylinder seal ring. The interior of the rotor is tapered 309 to encourage oil flow toward the annular collection groves 313 about each interior edge of the rotor 214. Tangential oil passages 315 that mate with matching passages in the planetary carrier plates provide a means of scavenging oil from the rotor core and ejecting it to the periphery through oil ejection ports 316. Cylinder sleeve oil passages 311 provide a means of shedding oil from the piston belly at bottom dead center to eliminate fluid accumulation on the underside of the piston. Each cylinder sleeve 216 has a pair of cylinder sleeve pin slots 312 to facilitate insertion of the gudgeon pin and assembly of the piston to connecting rod.

Figure 39:
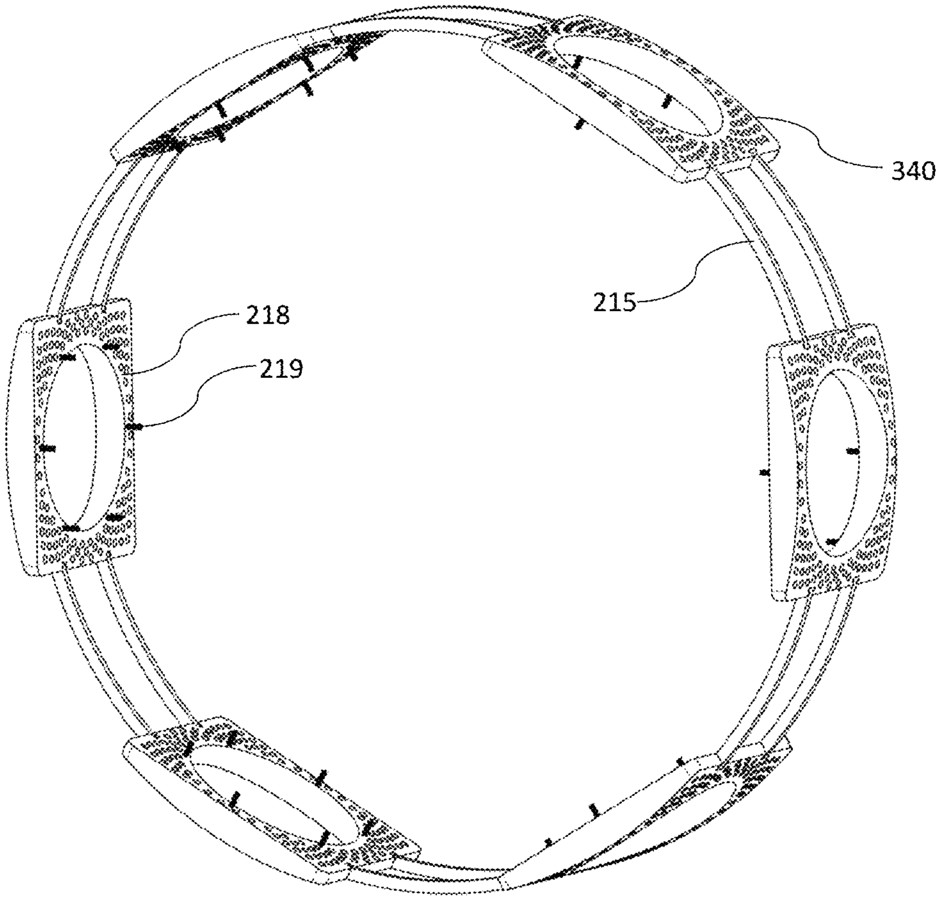
FIG. 39 is a perspective view of the cylinder seals and rotor oil seals of the second embodiment of the present invention.

FIG. 39 is a perspective view of the cylinder composite cylinder seals 218 and the rotor oil rings 215. The composite cylinder seals 218 are radiused 340 to match the interior surface of the rotor housing sleeve. A plurality of compression seal springs 219 are fitted in counterbores located in the underside of each composite cylinder compression seal 218. These springs 219 are preloaded to maintain an adequate seal between cylinder and housing during compression and power strokes. The cylinder compression seal must be of sufficient tensile strength to handle the hoop stresses of peak cylinder pressures and have lubricating properties to allow for dry running. Rotor oil rings 215 contained in slots about the rotor contain oil to the outer edges of the rotor where it is ejected by the oil ejection ports.

Figure 40:
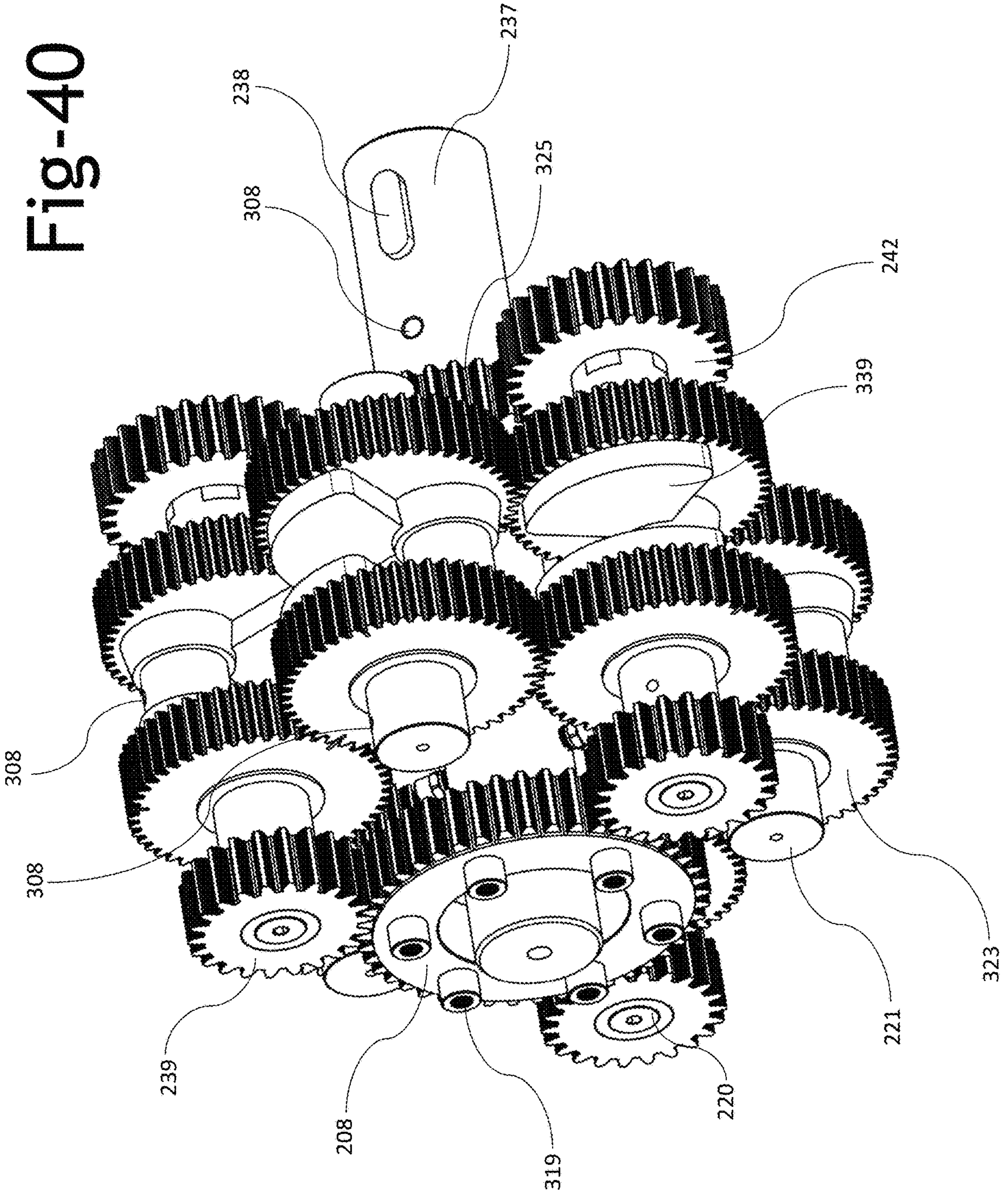
FIG. 40 is a perspective view of the geartrain of the second embodiment of the present invention.

FIG. 40 is an illustration of the geartrain of the rotor with the fixed sun gear of the front cover included for ease of understanding. Primary crank shafts 220 and secondary crank shafts 221 are geared together in a 1:1 ratio by crank gears 323. Timing gears 239 coupled to primary crank shafts 220 mesh with the fixed sun gear 208 in a 2:1 ratio. The sun gear is fixed to the front cover by locating pins 319. Drive gears 242 couple to the anterior end of the primary crank shafts 220 drive the output shaft 237 through engagement with its gear 325. The oil gallery drilling routes oil to all bearing surfaces from entry at the rear bearing of the output shaft. A shaft key 238 is provided to transmit power to the load.

Figure 41:
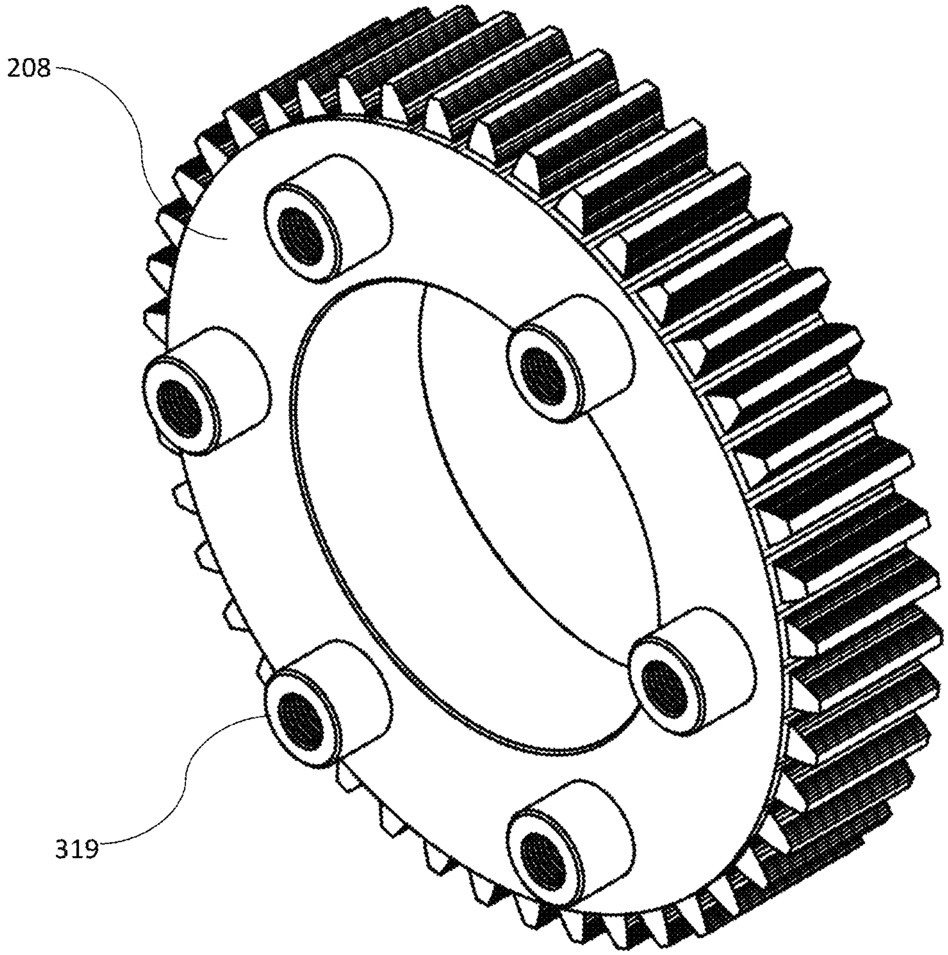
FIG. 41 is a perspective view of the fixed sun gear of the second embodiment of the present invention.

FIG. 41 is a perspective view of the fixed sun gear 208 showing the locating pins 319 that engage with the front cover.

Figure 42:
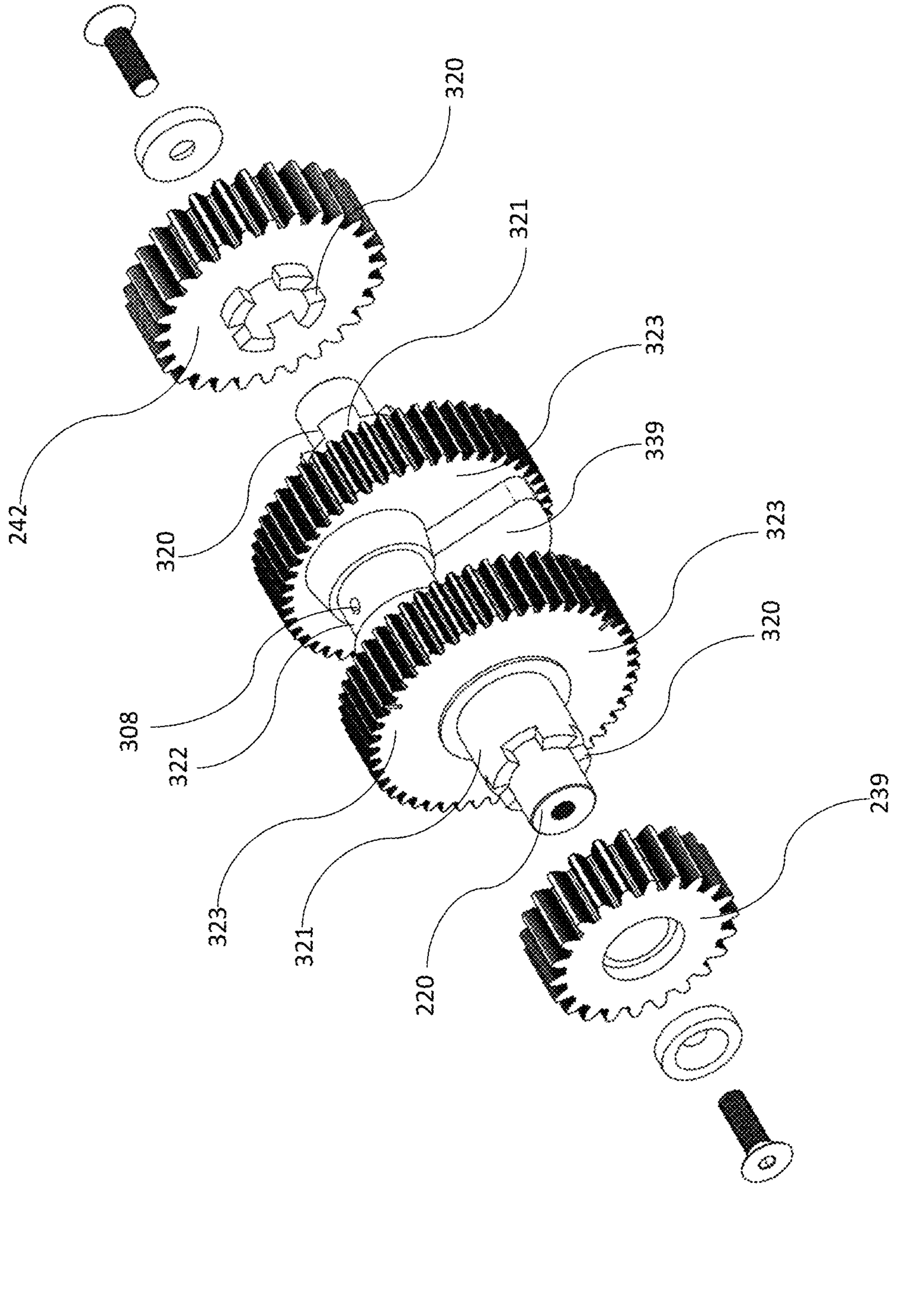
FIG. 42 is an isometric exploded view of the primary crankshaft assembly of the second embodiment of the present invention.

FIG. 42 is an isometric exploded view of a primary crank shaft 220 with its mating timing gear 239 and drive gear 242. Face teeth 320 in each gear engage with face teeth 320 at the main journals on either end of the primary crank shaft 220. The connecting rod journal 322 is straddled on either side by a gear 323. Oil gallery 308 drilling distributes oil from the main journal bearings through the main journals 321 to the connecting rod journal 322. Counterweights 339 are integrated for rotational balance of the 6-cylinder cranks.

Figure 43:
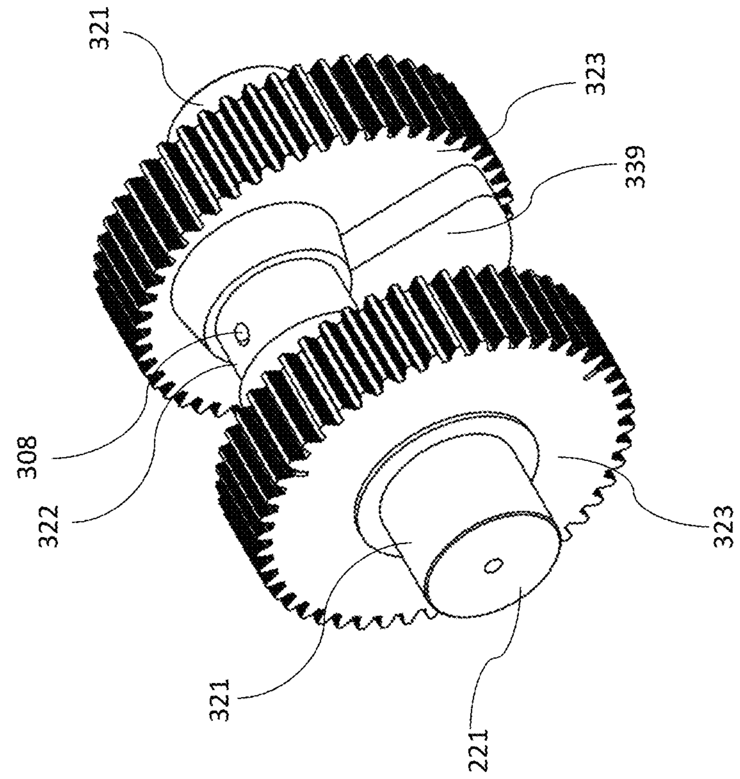
FIG. 43 is an isometric view of the secondary crankshaft of the second embodiment of the present invention.

FIG. 43 is an isometric view of a secondary crank shaft. The connecting rod journal 322 is straddled on either side by a gear 323. Oil gallery 308 drilling distributes oil from the main journal bearings through the main journals 321 to the connecting rod journal 322. The main journal ends of the drilled oil gallery are open to feed oil to the timing gear and drive gear oil nozzles. Counterweights 339 are integrated for engine balance of the 6-cylinder cranks.

Figure 44:
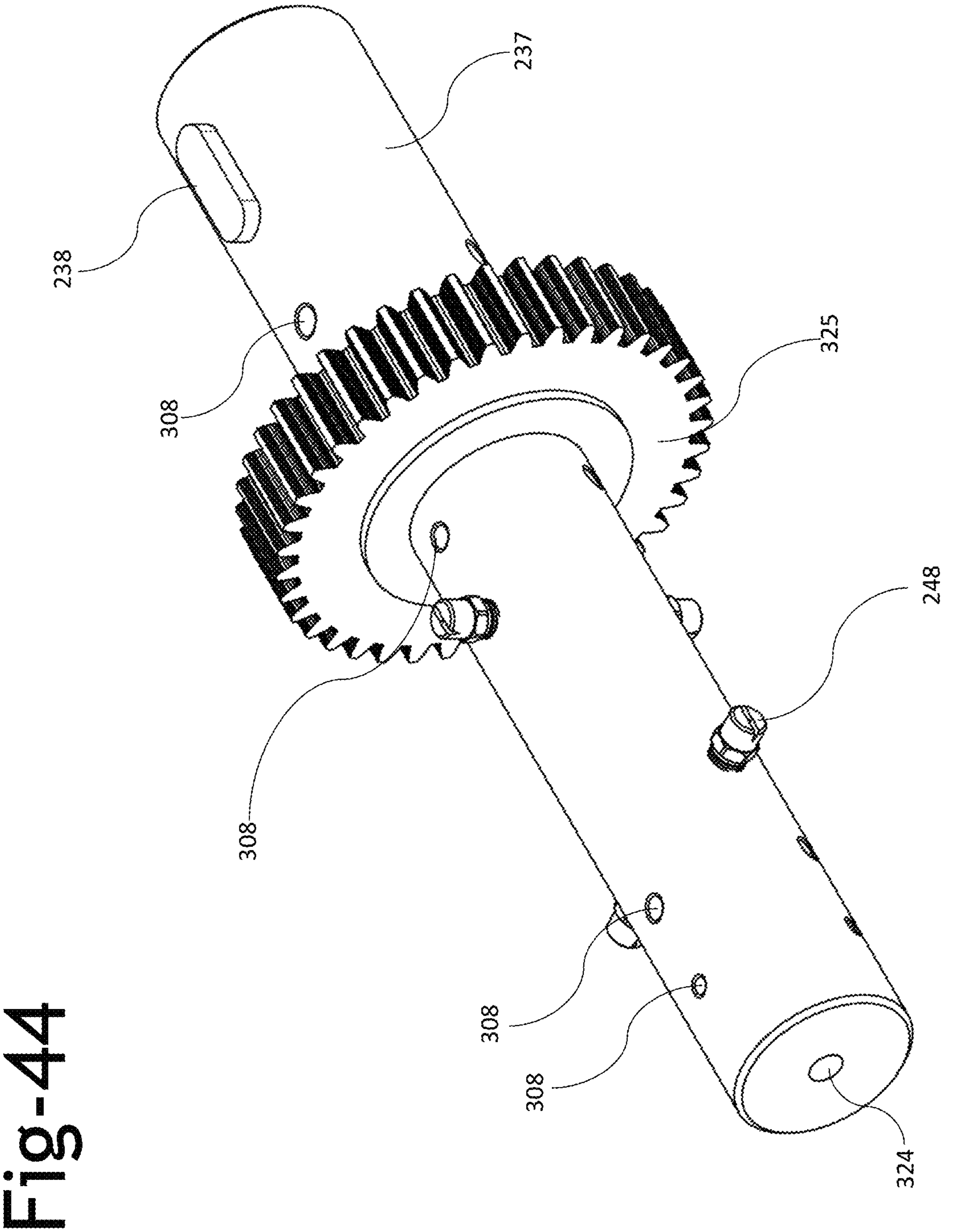
FIG. 44 is an isometric view of the output shaft of the second embodiment of the present invention.

FIG. 44 is an isometric view of the output shaft 237. Oil enters the oil gallery 308 through the rear cover output shaft bearing and is distributed to the main journals and front cover bearing. A plug 324 contains oil to maintain pressure and desired flow though the oil gallery 308. Nozzles 248 are equipped to spray a continuous mist of oil directly on the synchronous crank shaft gears as the shaft rotates. A gear 325 integral with the shaft is driven by the drive gears and a shaft key 238 transmits power to the load.

Figure 45:
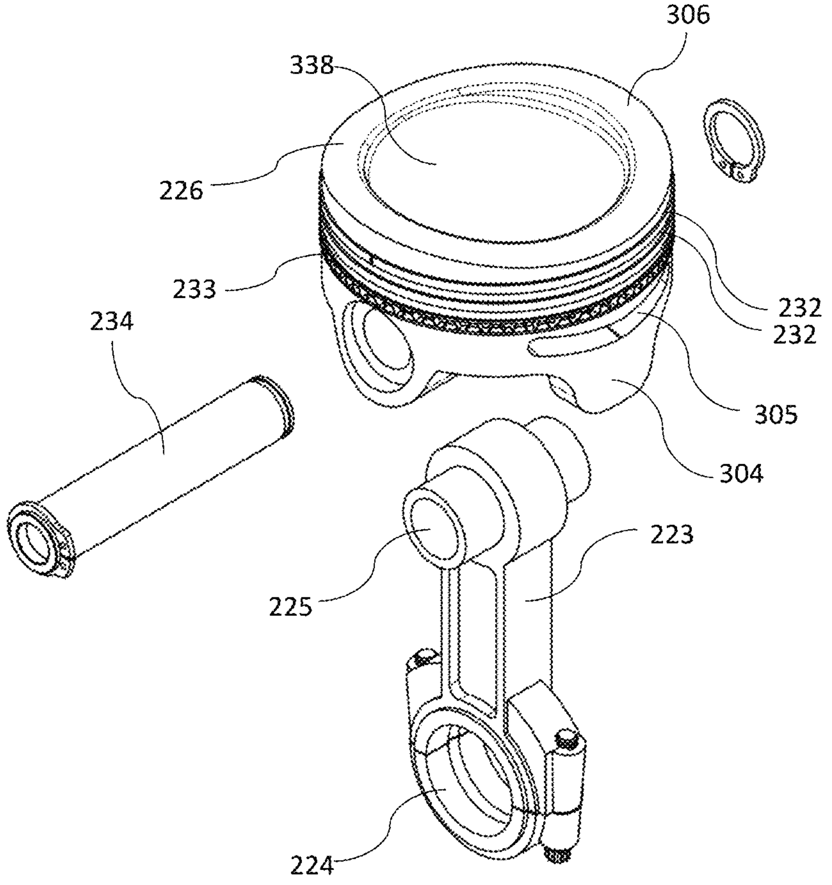
FIG. 45 is an isometric view of a piston and connecting rod of the second embodiment of the present invention.

FIG. 45 is a perspective view of a piston 226 and connecting rod 223 of the present invention. The piston crown 306 is radiused to match the radius of the rotor. Compression sealing is accomplished with compression rings 232 and an oil ring 233 is equipped to limit oil consumption. Piston skirts 304 keep the piston from cocking in the cylinder bore. The piston belly (not visible) is tapered and radiused to match the rotor interior and skirt oil slots 305 permit the passage of oil to the cylinder sleeve oil passages to avoid accumulation on the bottom of the piston. The connecting rod 223 is attached to the piston 226 via a gudgeon pin 234.

Figure 46:
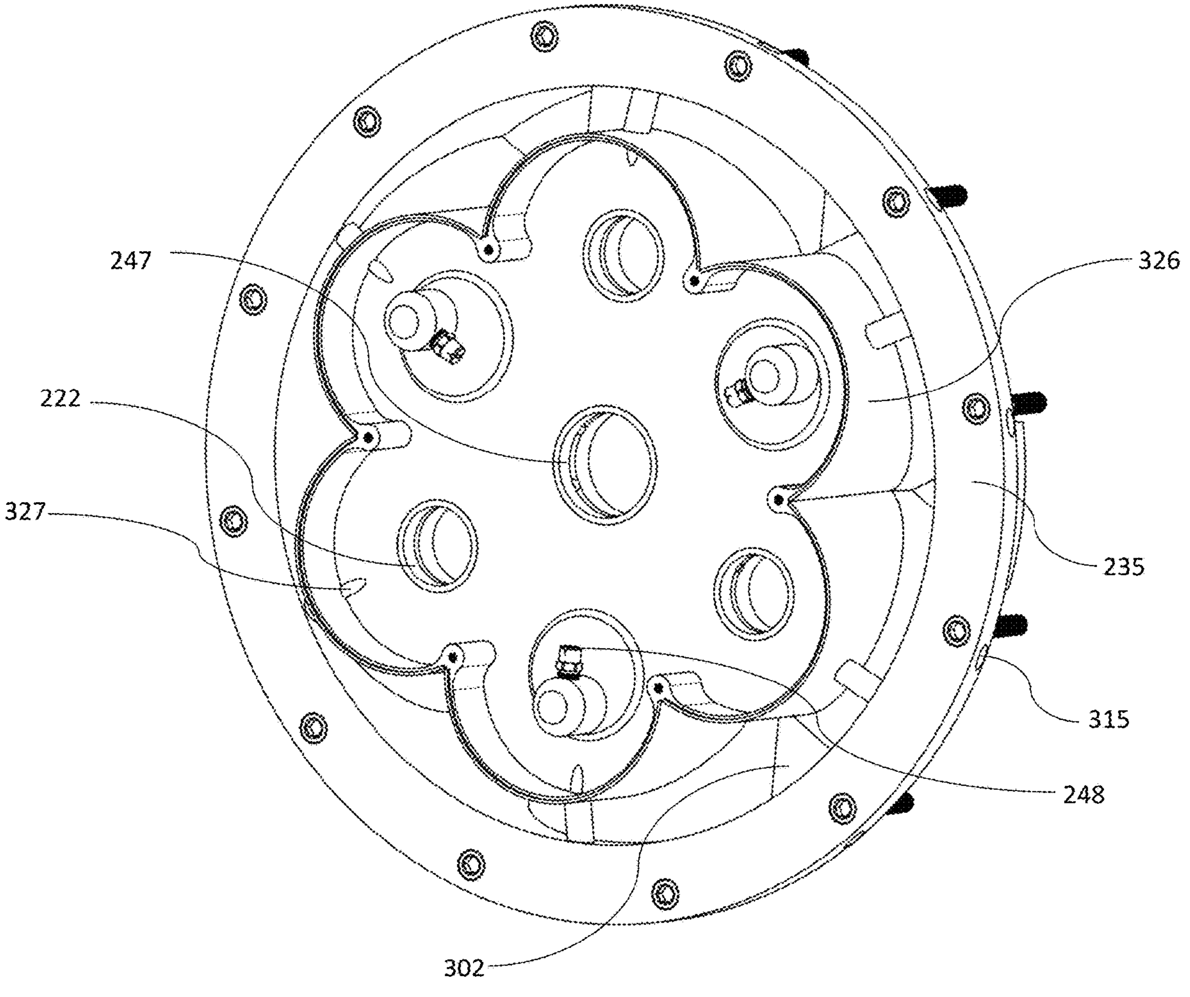
FIG. 46 is an anterior perspective view of the front planetary carrier of the rotor assembly of the second embodiment of the present invention.

FIG. 46 is a frontal perspective view of the front carrier plate 235 of the rotor. The front carrier plate houses six main journal bearings 222 and an output shaft bearing 247. Rotor cooling passages 302 are integrated into the plate 235, as well as the timing cover gear case 326. Oil delivered through the oil gallery is directed to nozzles 248 and sprayed directly on the fixed sun gear as the rotor rotates. It is then returned to the rotor core by oil return passages 327. Tangential oil passages 315 match the tangential passages of the rotor providing a path from the annular collection groove to the periphery of the rotor.

Figure 47:
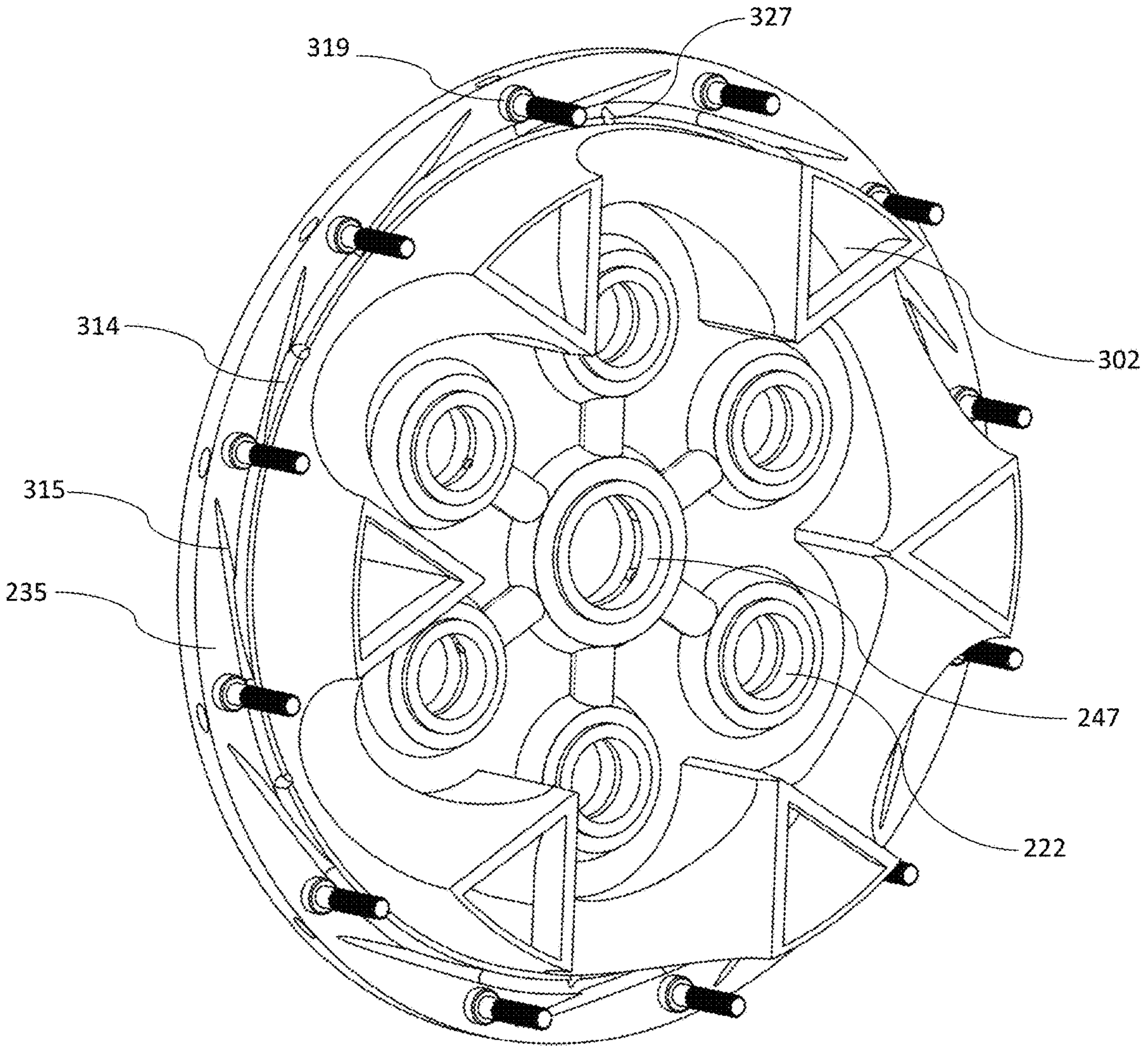
FIG. 47 is a posterior perspective view of the front planetary carrier of the rotor assembly of the second embodiment of the present invention.

FIG. 47 is a posterior perspective view of the front carrier plate 235 of the rotor. The front carrier plate houses six main journal bearings 222 and an output shaft bearing 247. Rotor cooling passages 302 are integrated into the planetary carrier plate 235. Oil delivered through the oil gallery is returned to the rotor core by oil return passages 327. Tangential oil passages 315 match the tangential passages of the rotor providing an oil path from the annular collection groove 314 to the periphery of the rotor.

Figure 48:
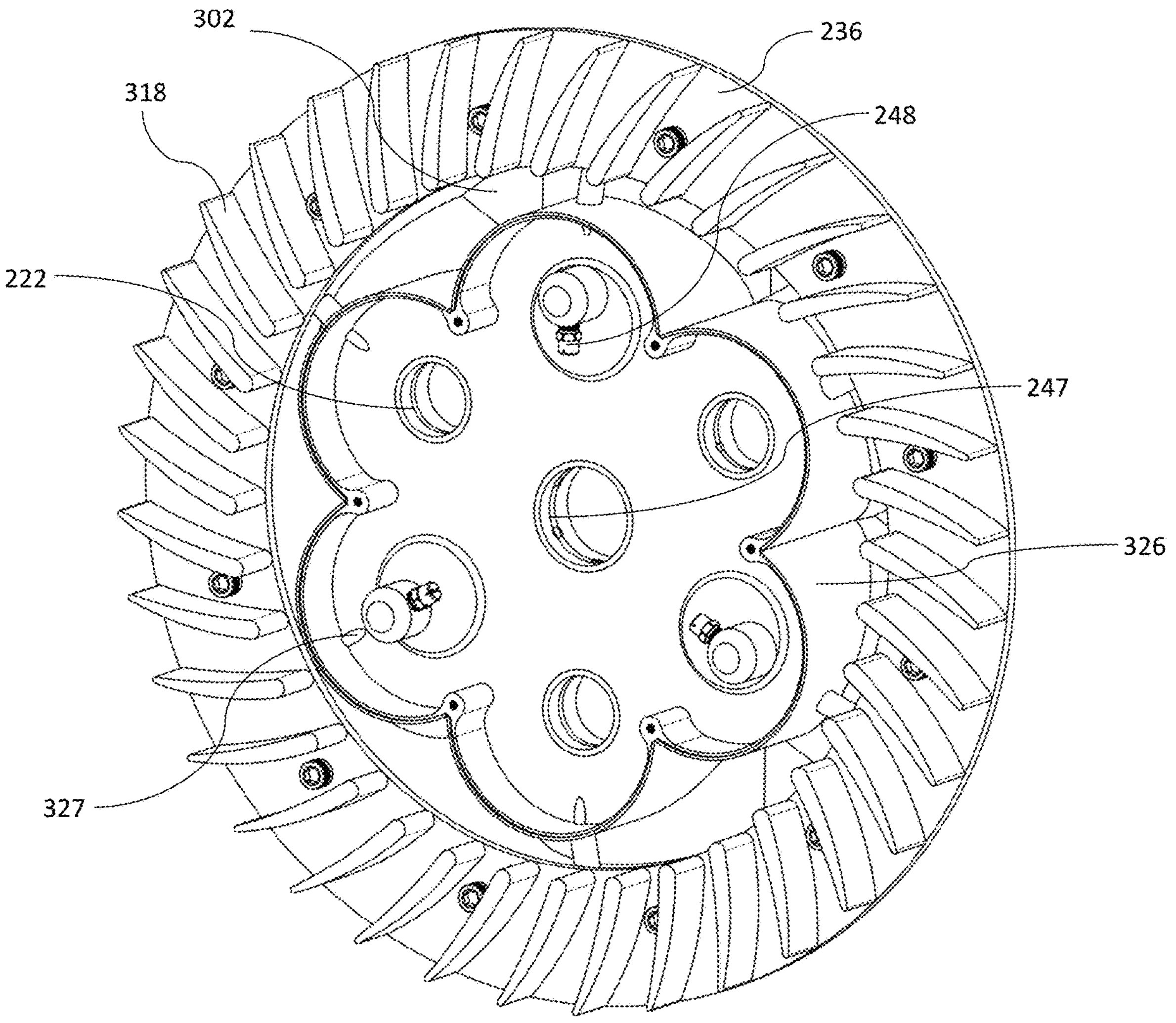
FIG. 48 is a posterior perspective view of the rear planetary carrier of the rotor assembly of the second embodiment of the present invention.

FIG. 48 is a posterior perspective view of the rear carrier plate 236 of the rotor. The rear carrier plate houses six main journal bearings 222 and an output shaft bearing 247. Rotor cooling passages 302 are integrated into the plate 236 as is the gear case 326. Oil delivered through the oil gallery is directed to nozzles 248 and sprayed directly on the output shaft sun gear as the rotor rotates. It is then returned to the rotor core by oil return passages 327. Fan blades 318 draw air through the rotor core for cooling.

Figure 49:
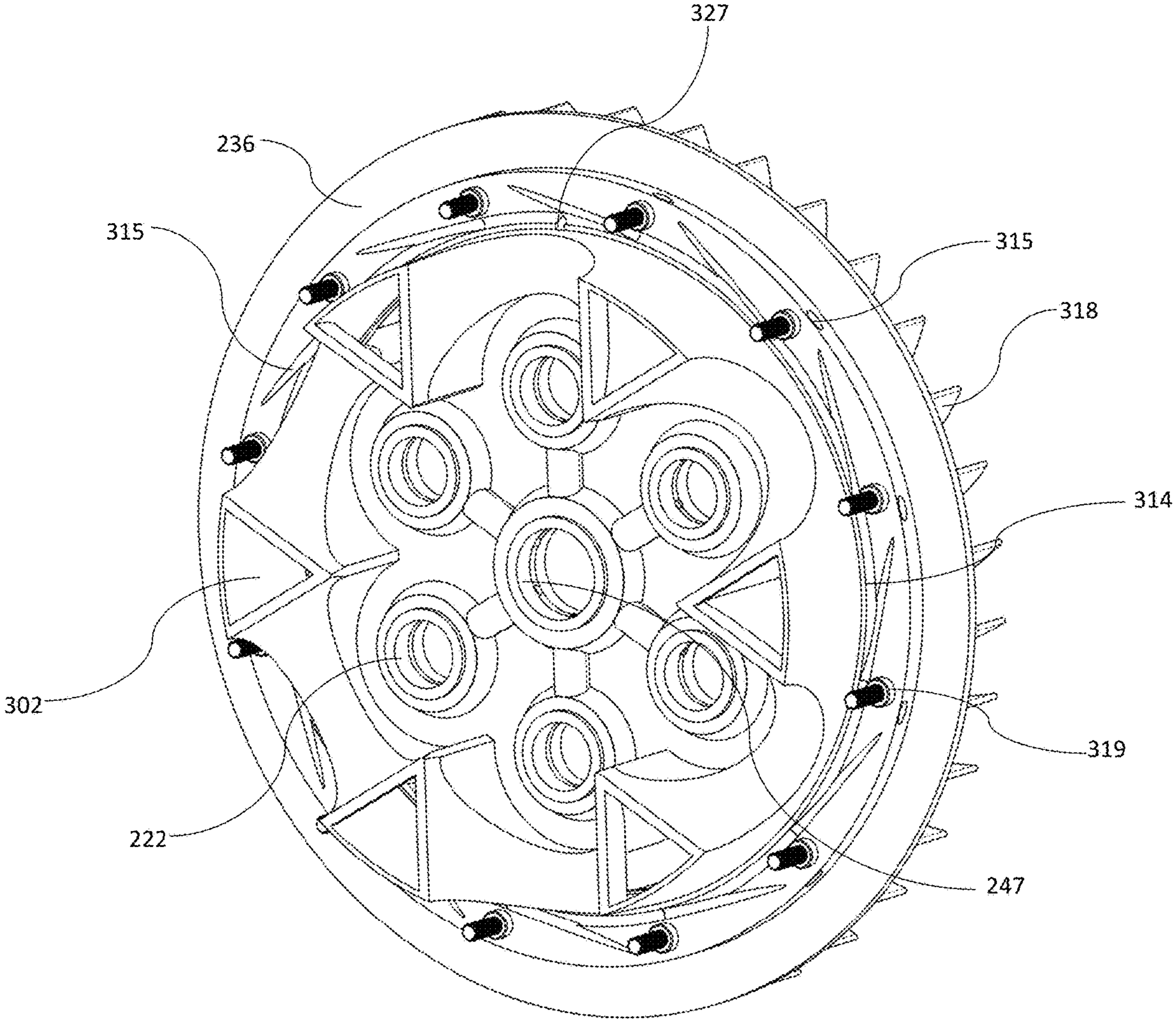
FIG. 49 is an anterior perspective view of the rear planetary carrier of the rotor assembly of the second embodiment of the present invention.

FIG. 49 is an anterior perspective view of the rear carrier plate 236 of the rotor. The rear carrier plate houses six main journal bearings 222 and an output shaft bearing 247. Rotor cooling passages 302 are integrated into the plate 236. Tangential oil passages 315 match the tangential passages of the rotor providing an oil path from the annular collection groove 314 to the periphery of the rotor. Oil delivered to the drive gear set is returned to the rotor core by oil return passages 327.

Figure 50:
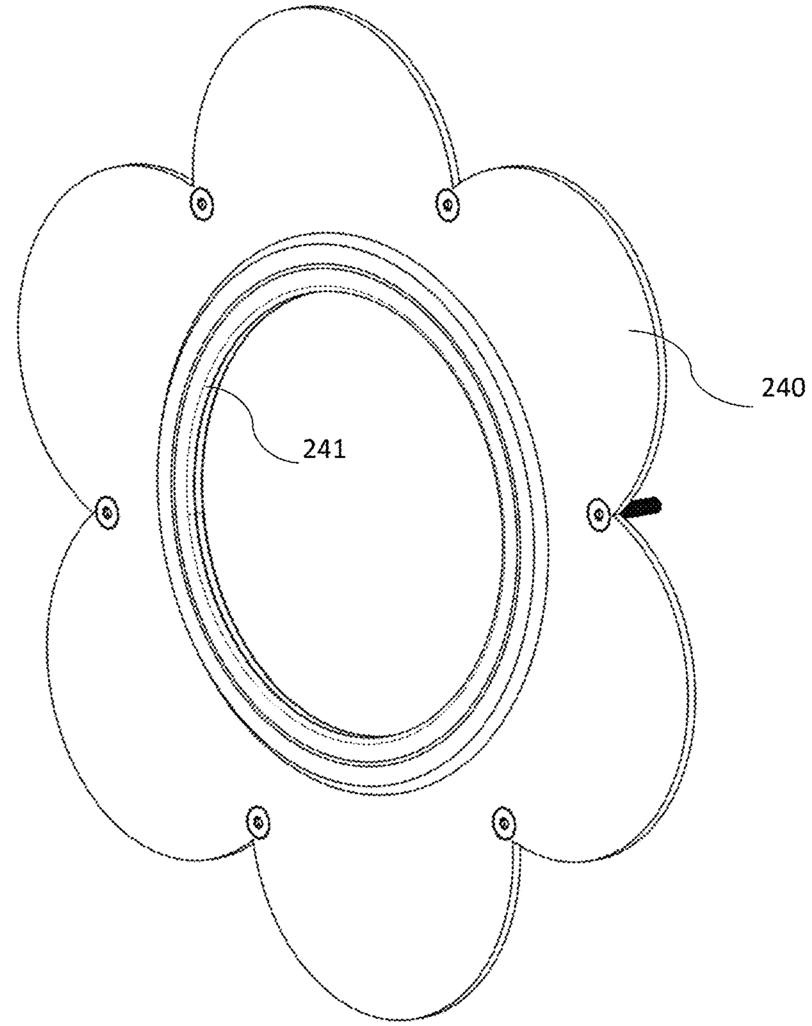
FIG. 50 is a perspective view of the gear case cover and oil seal of the second embodiment of the present invention.

FIG. 50 is a perspective view of the timing gear cover plate 240. It contains oil in the gear case and houses a gear cover oil seal 241 that forms a rotary seal about the oil seal sealing surface of the front cover. The drive gear cover 243 (not shown) is identical and configured the same.

Figure 51:
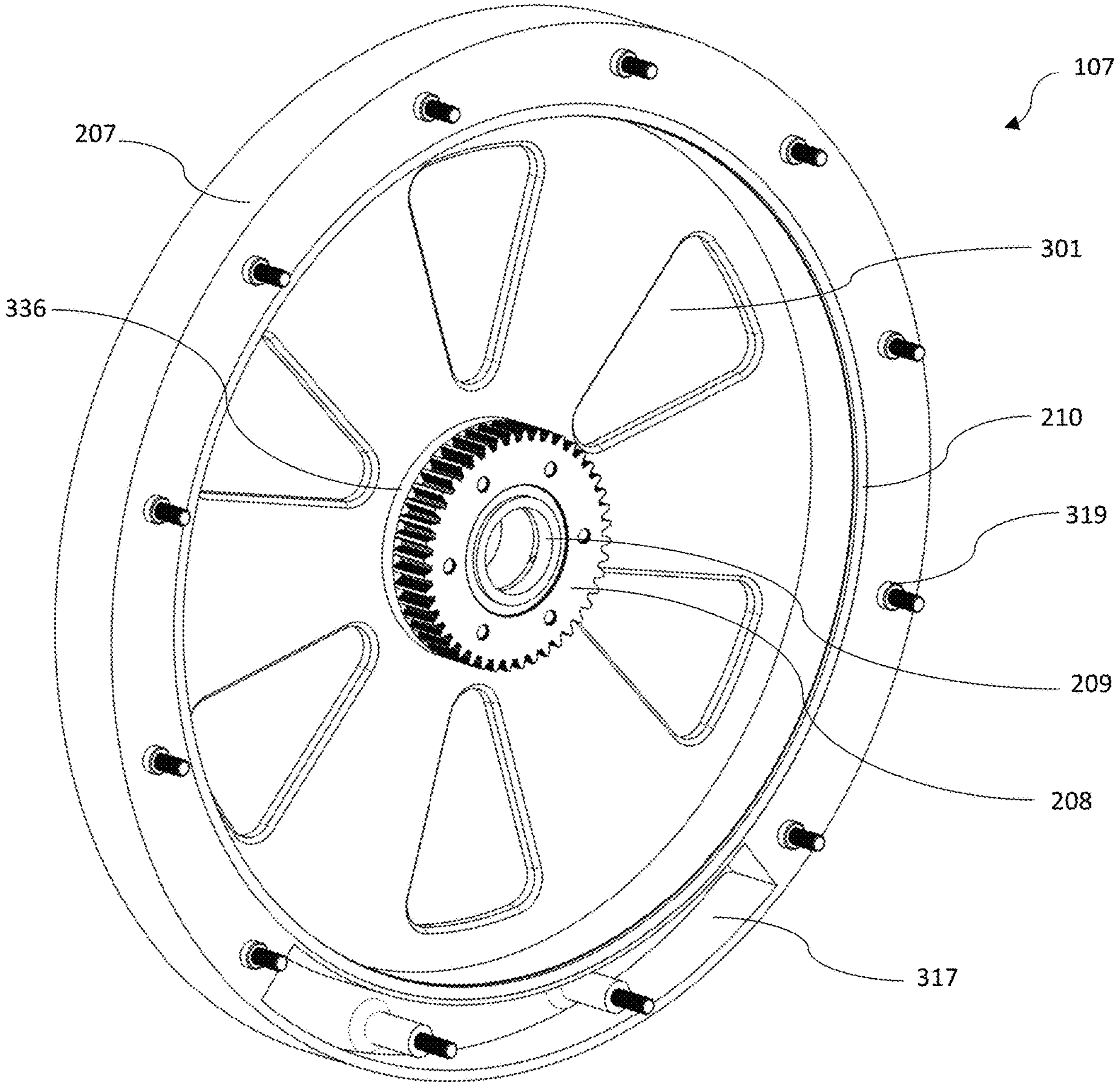
FIG. 51 is a posterior perspective view of the front cover assembly of the second embodiment of the present invention.

FIG. 51 is a perspective view of the front cover assembly 107. The front cover 207 supports the output shaft through output shaft bearing 209. Fixed sun gear 208 is rigidly mounted. Locating pins 319 are incorporated to engage with corresponding locating bores in the rotor housing. Front cover cooling passages 301 provide entry of cooling air to the rotor as it is drawn through the rotor core cooling passages by the fan. A lower cavity matching the lower cavity in the rotor housing serves to form the primary oil sump 317. A rotor thrust bearing/seal 210 is fitted to contain oil in the oil gallery and to prevent lateral movement of the rotor.

Figure 52:
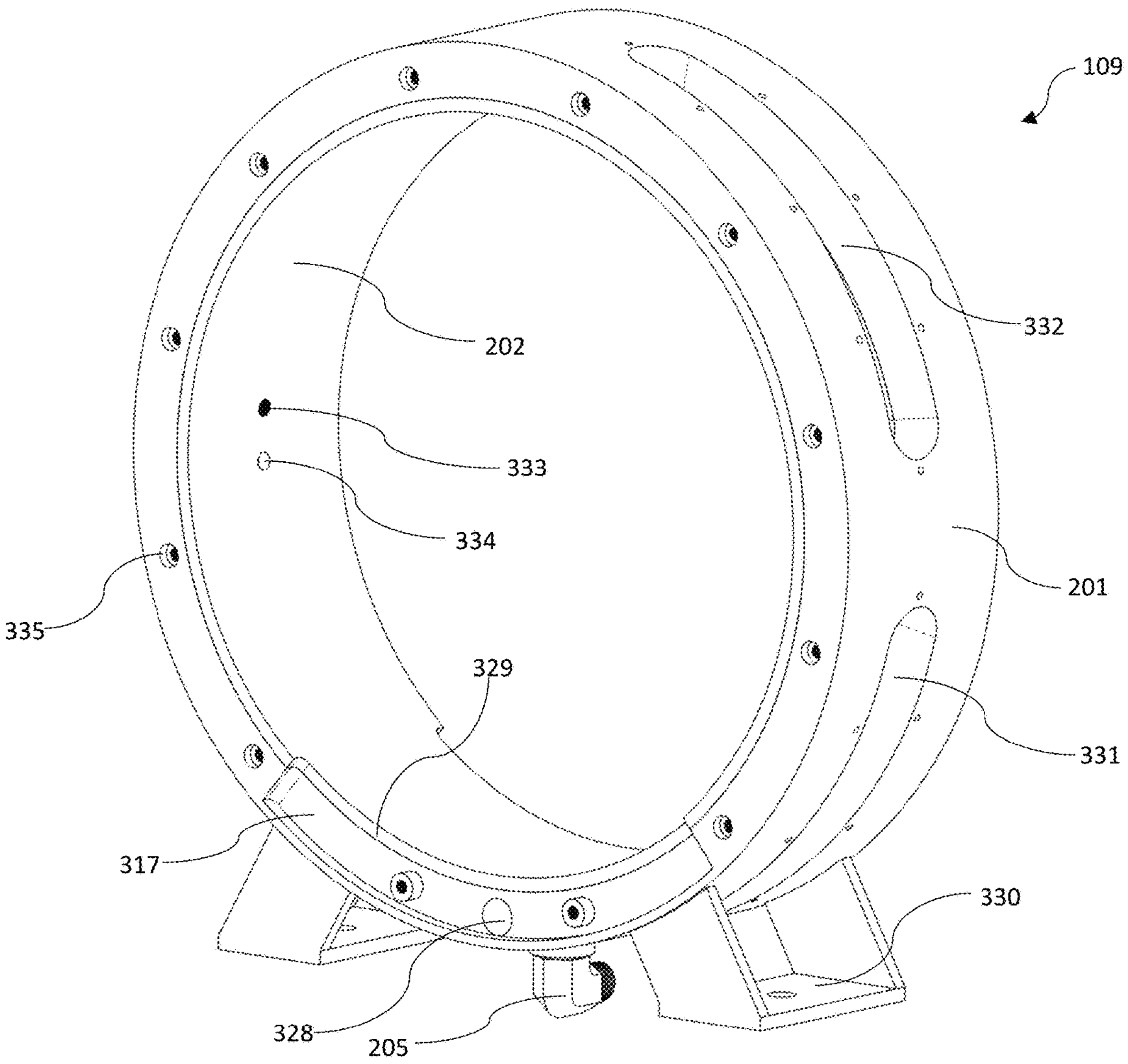
FIG. 52 is an anterior perspective view of the rotor housing assembly of the second embodiment of the present invention.

FIG. 52 is an anterior perspective view of the rotor housing assembly 109. Mounting feet 330 integral to the housing provided means of securing the motor to a substrate. Locating bores 335 are provide to accept the locating pins of the front cover. The rotor housing 201 may be lined with a rotor housing liner 202 of a suitable material to minimize friction and wear. Porting of intake air and spent exhaust gases is provided through intake port 331 and exhaust port 332. A fuel injection port 334 and a spark plug bore 333 are located opposite the intake and exhaust ports in the region occupied by the piston at top dead center and entering the power-stroke. Oil expelled at the periphery of the rotor is free to drain by gravity past the drainage slots 329 into the primary oil sump 317. Oil in the sump flows through the oil sump connecting passage 328 and out through oil drain fitting 205 as it is transferred to a larger remote reservoir by a scavenging pump.

Figure 53:
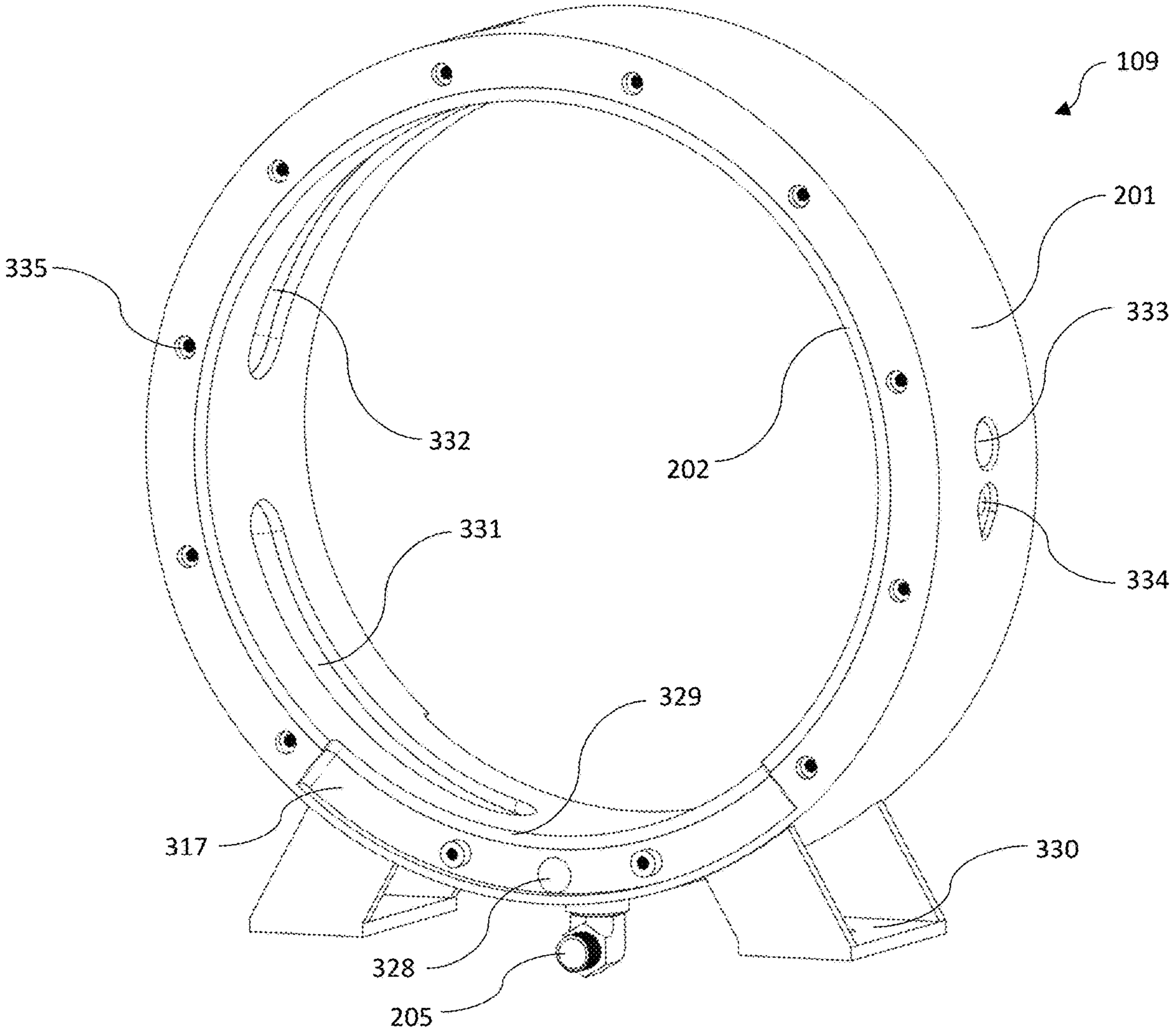
FIG. 53 is a posterior perspective view of the rotor housing assembly of the second embodiment of the present invention.

FIG. 53 is a posterior perspective view of the rotor housing assembly 109 illustrating the features outlined in the preceding paragraph from a different vantage point. Mounting feet 330 integral to the housing provided means of securing the motor to a substrate. Locating bores 335 are provide to accept the locating pins of the front cover. The rotor housing 201 may be lined with a rotor housing liner 202 of a suitable material to minimize friction and wear. Porting of intake air and spent exhaust gases is provided through intake port 331 and exhaust port 332. A fuel injection port 334 and a spark plug bore 333 are located opposite the intake and exhaust ports in the region occupied by the piston at top dead center and entering the power-stroke. Oil expelled at the periphery of the rotor is free to drain past the drainage slots into the primary oil sump 317. Oil in the sump flows through the oil sump connecting passage 328 and out through oil drain fitting 205 as it is transferred to a larger remote reservoir by a scavenging pump.

Figure 54:
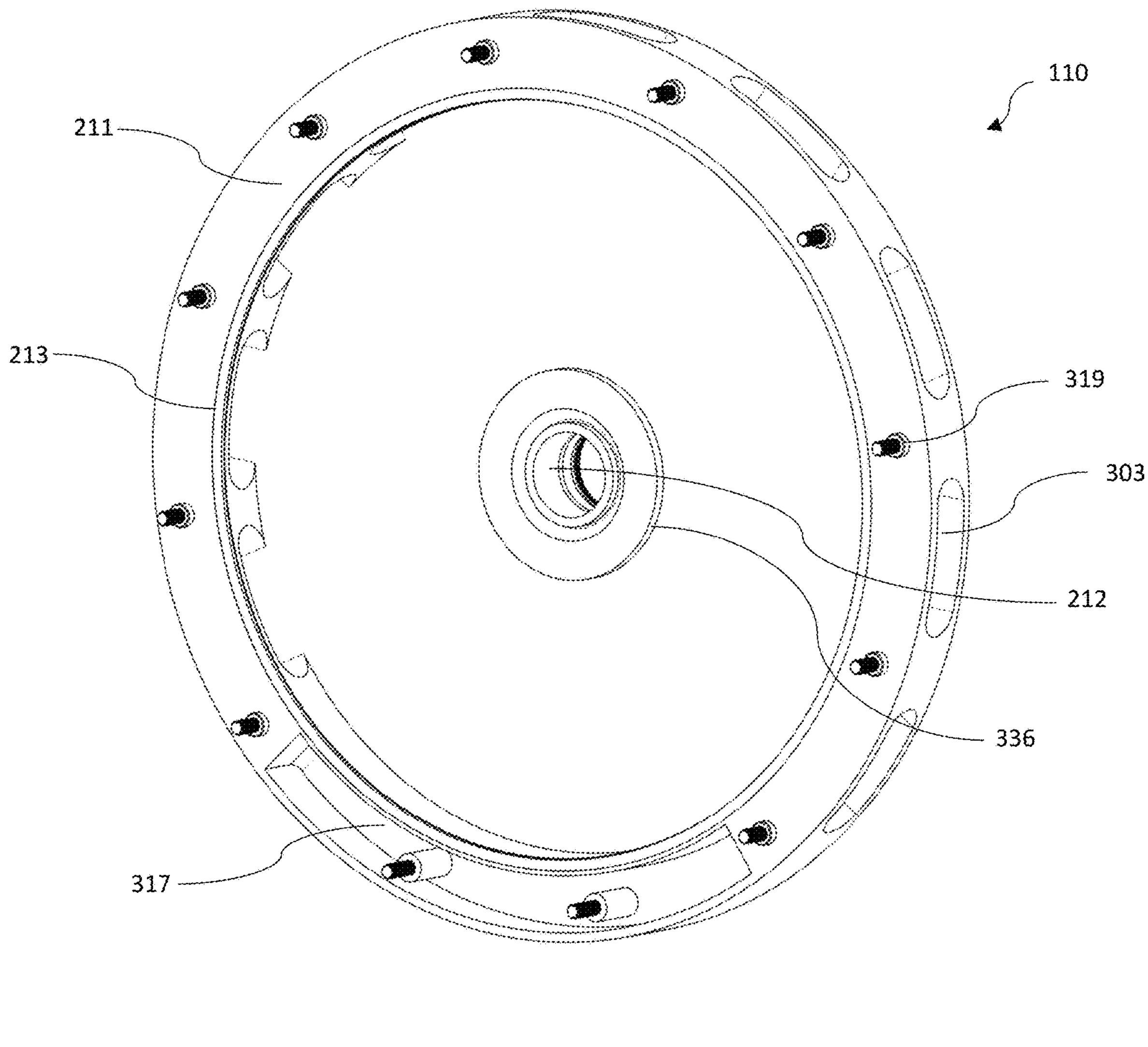
FIG. 54 is an anterior perspective view of the rear cover assembly of the second embodiment of the present invention.

FIG. 54 is a perspective view of the rear cover assembly 110. The rear cover 211 supports the output shaft through rear cover output shaft bearing 212. An oil seal mating surface 336 is incorporated to accommodate the gear cover oil seal. Rear cover cooling passages 303 provide egress of cooling air drawn through the rotor core cooling passages by the fan. A lower cavity matching the lower cavity in the rotor housing serves to form the primary oil sump 317. A rotor thrust bearing/seal 213 is fitted to contain oil in the oil gallery and to prevent lateral movement of the rotor. Locating pins 319 are incorporated to engage with corresponding locating bores in the rotor housing.

Figure 55:
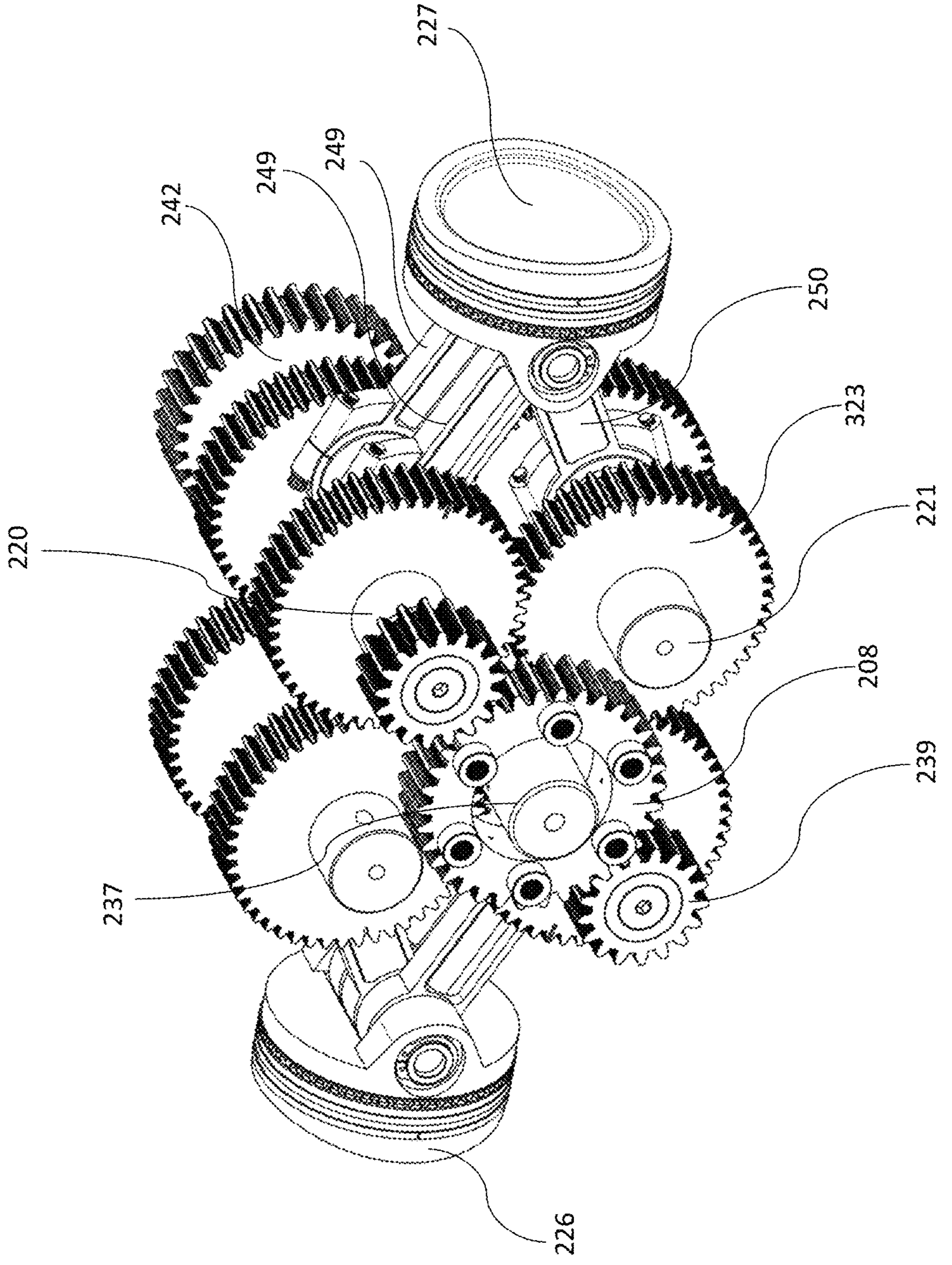
FIG. 55 is a perspective view of the geartrain, connecting rods, and pistons of the third embodiment of the present invention.

FIG. 55 is a perspective view of the geartrain, connecting rods, and pistons of the third embodiment of the present invention 111 with the fixed sun gear 208 of the front cover included for ease of comprehension. Primary crank shafts 220 and secondary crank shafts 221 are geared together in a 1:1 ratio by crank gears 323. Timing gears 239 coupled to primary crank shafts 220 mesh with the fixed sun gear 208 in a 2:1 ratio. Each piston 226, 227 translates power to its respective crank pair 220, 221 through inner and outer connecting rods 249, 250. This arrangement of one pair of outer connecting rods 249 and one inner connecting rod 250 eliminates the twisting moment about the gudgeon pin. Alternately, forked connecting rods may be employed. As the pistons are centered between each pair of cranks 220, 221, the transverse forces upon the pistons 226, 227 are cancelled and piston skirts are not required. Another notable feature of this offset dual crank per cylinder arraignment is the resulting modified stroke. In this embodiment, the power and intake strokes occur over approximately 100 degrees rotation and exhaust and compression occur over approximately 80 degrees. The extended duration of power and intake strokes may improve work extraction and promote better cylinder filling. While the attenuated duration of compression and exhaust may reduce heat rejection through the cylinder walls and improve exhaust exit velocity. Drive gears 242 couple to the anterior end of the primary crank shafts 220 drive the output shaft 237 through engagement with its gear.

Figure 56:
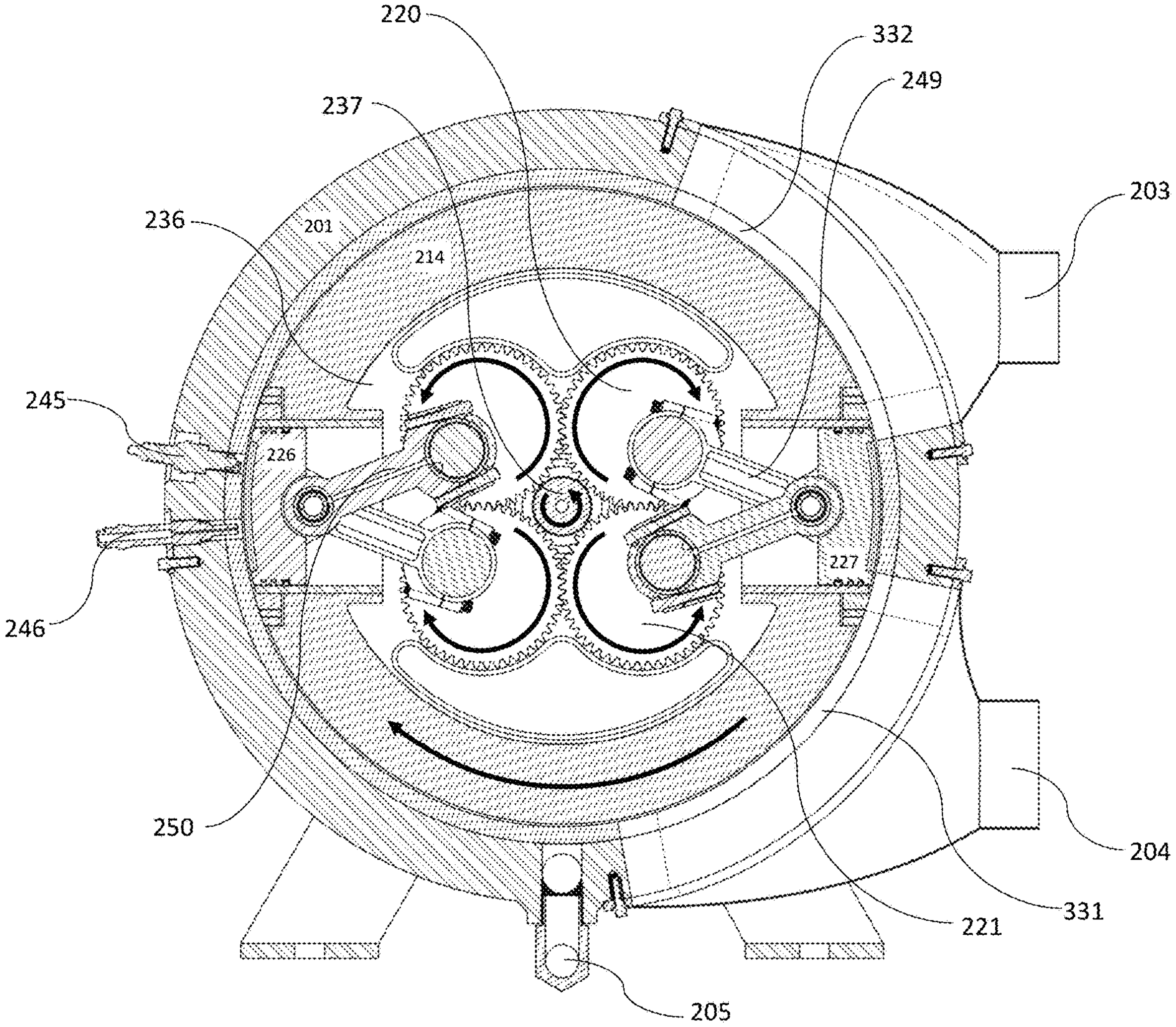
FIG. 56 is a cross sectional view of the third of the preferred embodiments with piston 1 at the beginning of the power stroke.

FIG. 56 is a cross sectional view of the third embodiment of the present invention 111 with piston 1 226 at top dead center and the beginning of the power stroke. It is observed that piston 2 227 is also at top dead center. As the rotor 214 is rotating clockwise as viewed and piston 1 226 is driven by a combustion event, piston 2 227 draws fresh air through intake manifold 204 as it begins its sweep through quadrant 4.

Figure 57:
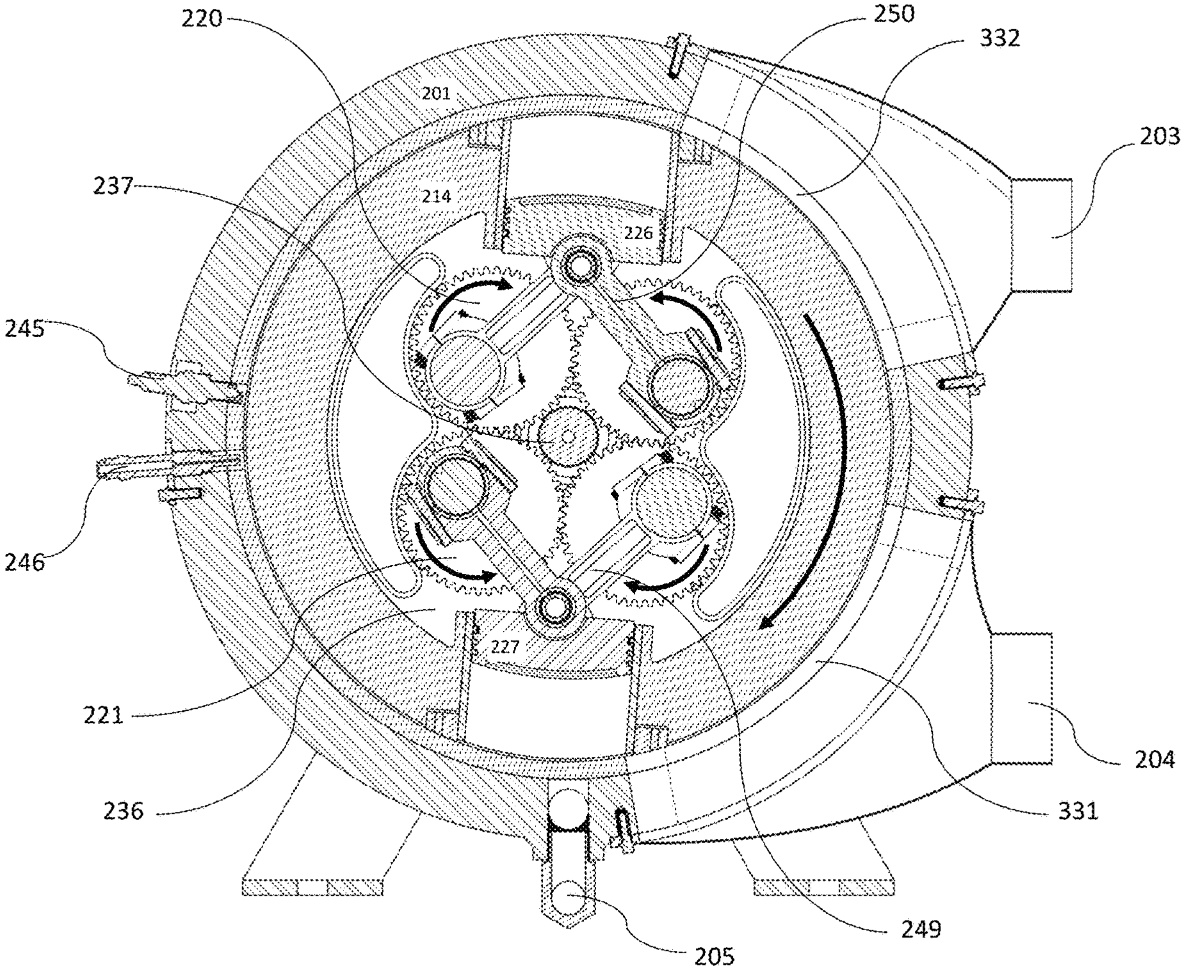
FIG. 57 is a cross sectional view of the third of the preferred embodiments with piston 1 at the end of the power stroke.

FIG. 57 is a cross sectional view of the third embodiment of the present invention with piston 1 226 at bottom dead center and the beginning of its exhaust stroke. It is clearly observed that piston 2 227 is also at bottom dead center. As the rotor 214 is rotating clockwise as viewed, piston 1 226 is entering the exhaust stroke, and piston 2 227 is entering its compression stroke. In this embodiment, the exhaust and compression strokes are solely driven by the inertia of the rotor, as there is no concurrent combustion event.

Figure 58:
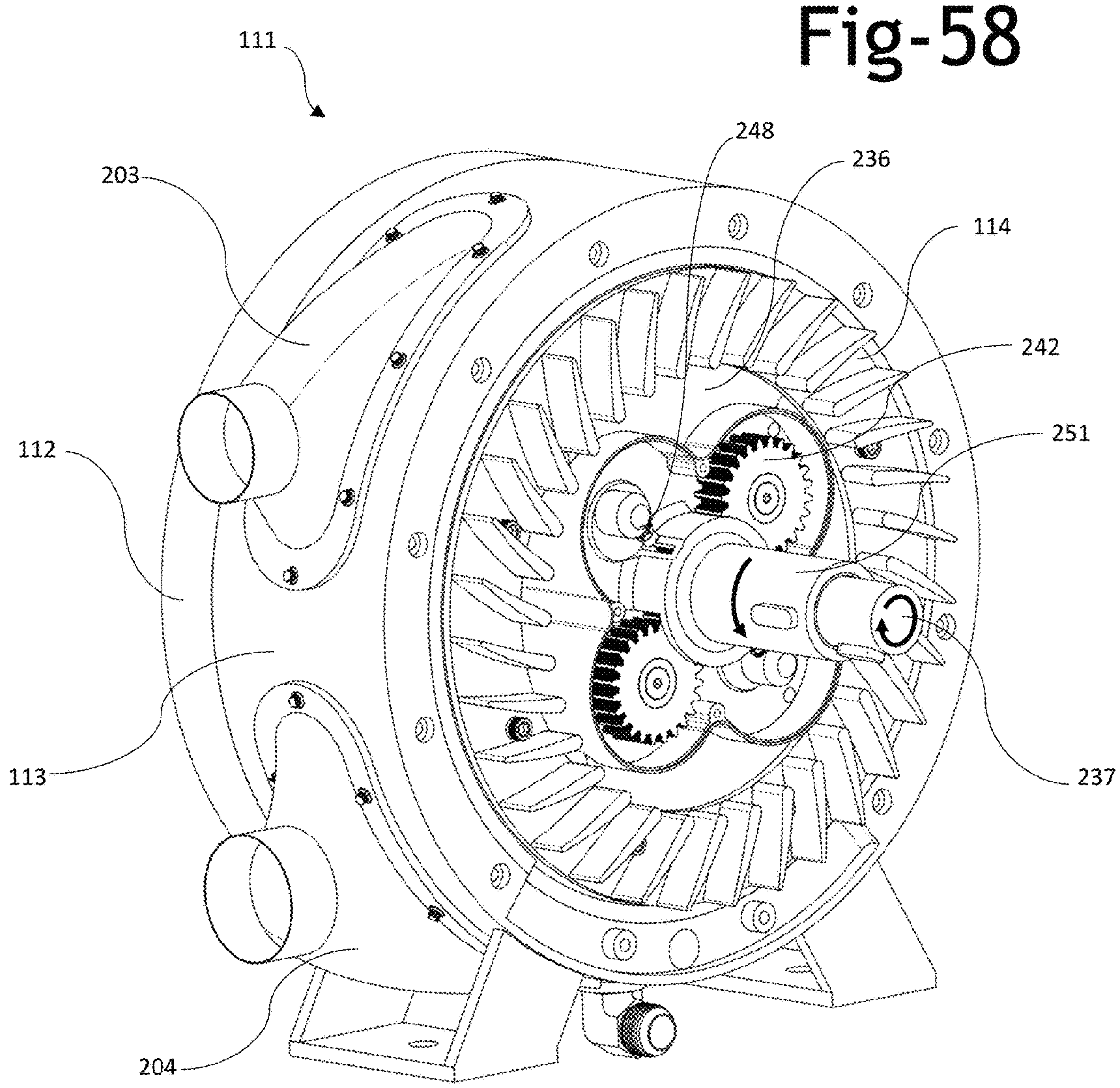
FIG. 58 is a posterior perspective view of the third of the preferred embodiments with the rear cover and the drive gear cover hidden from view.

FIG. 58 is a posterior perspective view of the third embodiment of the present invention 111 with the rear cover removed. A rotor output shaft 251 is fixed or integral to the rear carrier plate 236 of the rotor assembly 114. As the rotor assembly rotates, a pair of drive gears 242 drive the output shaft 237 through its drive gear. In the embodiment shown this is in a 1:1 ratio and counter-rotating. Oil nozzles 248 provide lubricant to the drive gear train.

Figure 59:
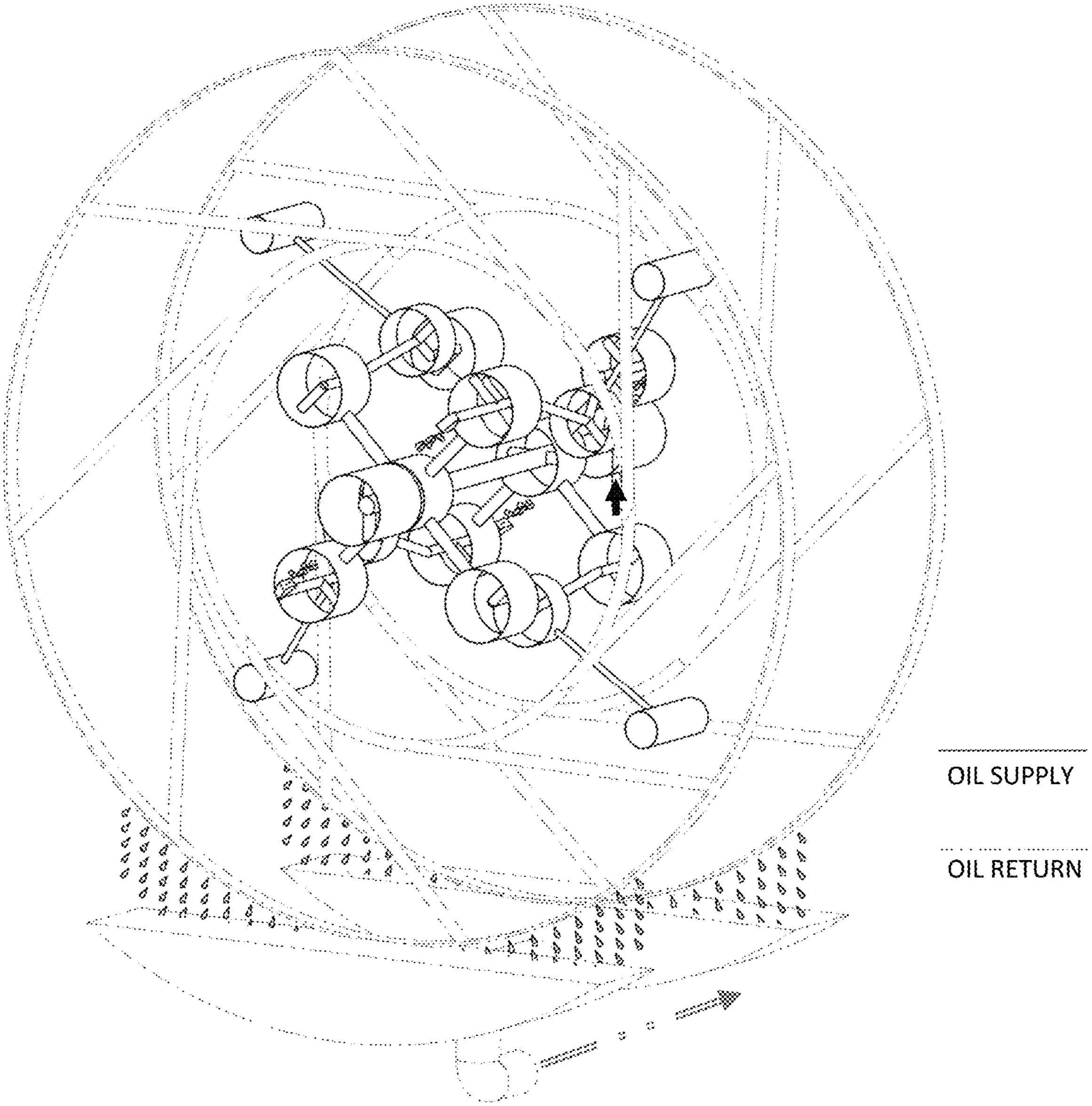
FIG. 59 is a perspective view of the supply and return oil galleries of the first of the preferred embodiments.

FIG. 59 is an illustration of the oil gallery of the first embodiment of the present invention which conceptually illustrates the oiling scheme for all variants. Oil is delivered under pressure at the rear output shaft bearing and travels through the output shaft to the other output shaft bearings, crankshaft main bearing journals, connecting rod bearing journals, and gear oil nozzles. Oil is then returned to the sump via the annular collection grooves, tangential oil passages, and the void between the rotor and its housing between the oil seals.

Figure 60:
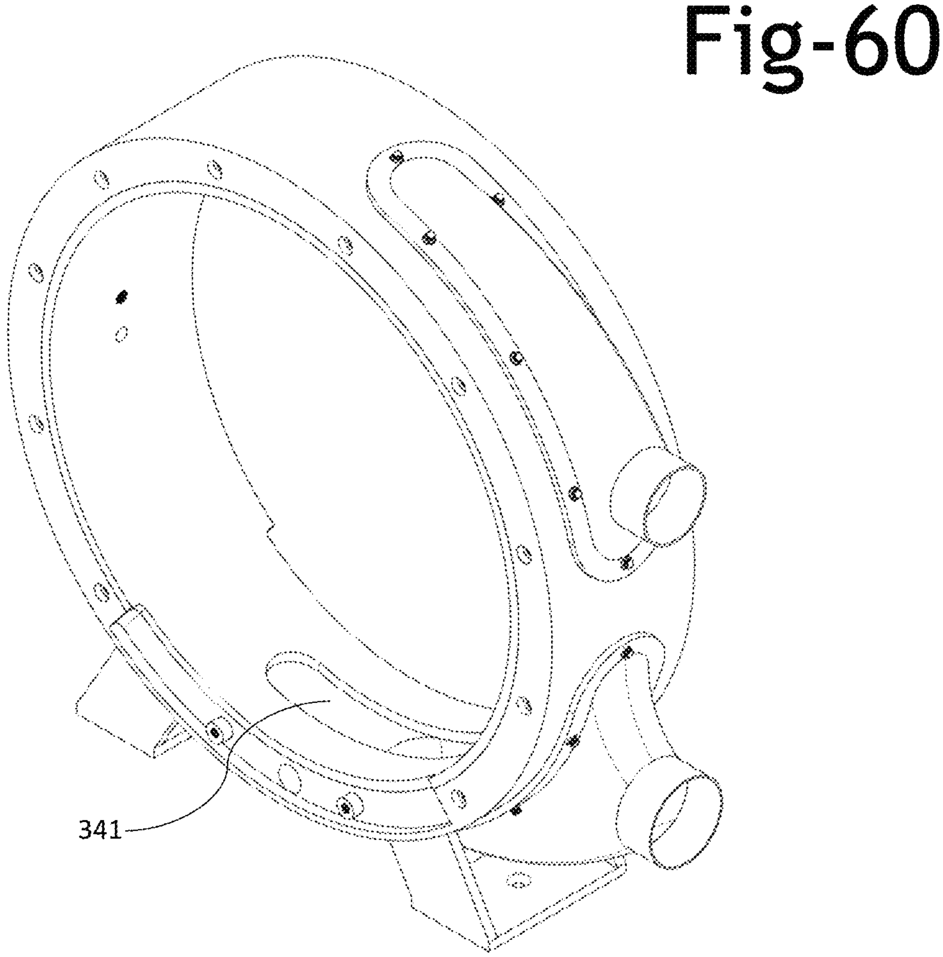
FIG. 60 is a perspective view of a rotor housing modified to utilize the Atkinson cycle.
Figure 61:
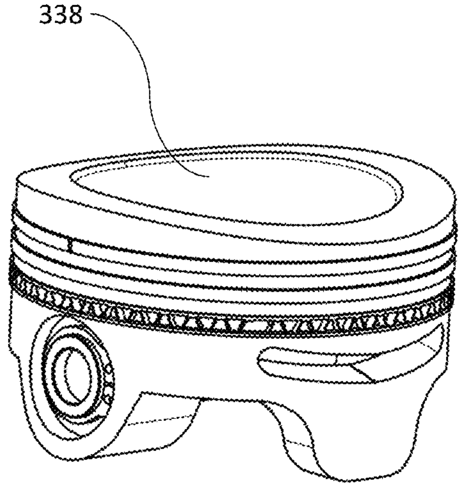
FIG. 61 is a perspective view of a piston modified to utilize the Atkinson cycle.

FIG. 60 and FIG. 61 are perspective views of a rotor housing assembly and a piston that are modified to utilize the Atkinson/Miller cycle. The extended intake port 341 effectively delays the start of the compression stroke by venting to the intake, and the piston bowl 338 is shallower providing a greater expansion ratio than the effective compression ratio. Shortening the intake port to effect early intake closing may also be employed as may valving arrangements to produce variable intake timing.

Figure 62:
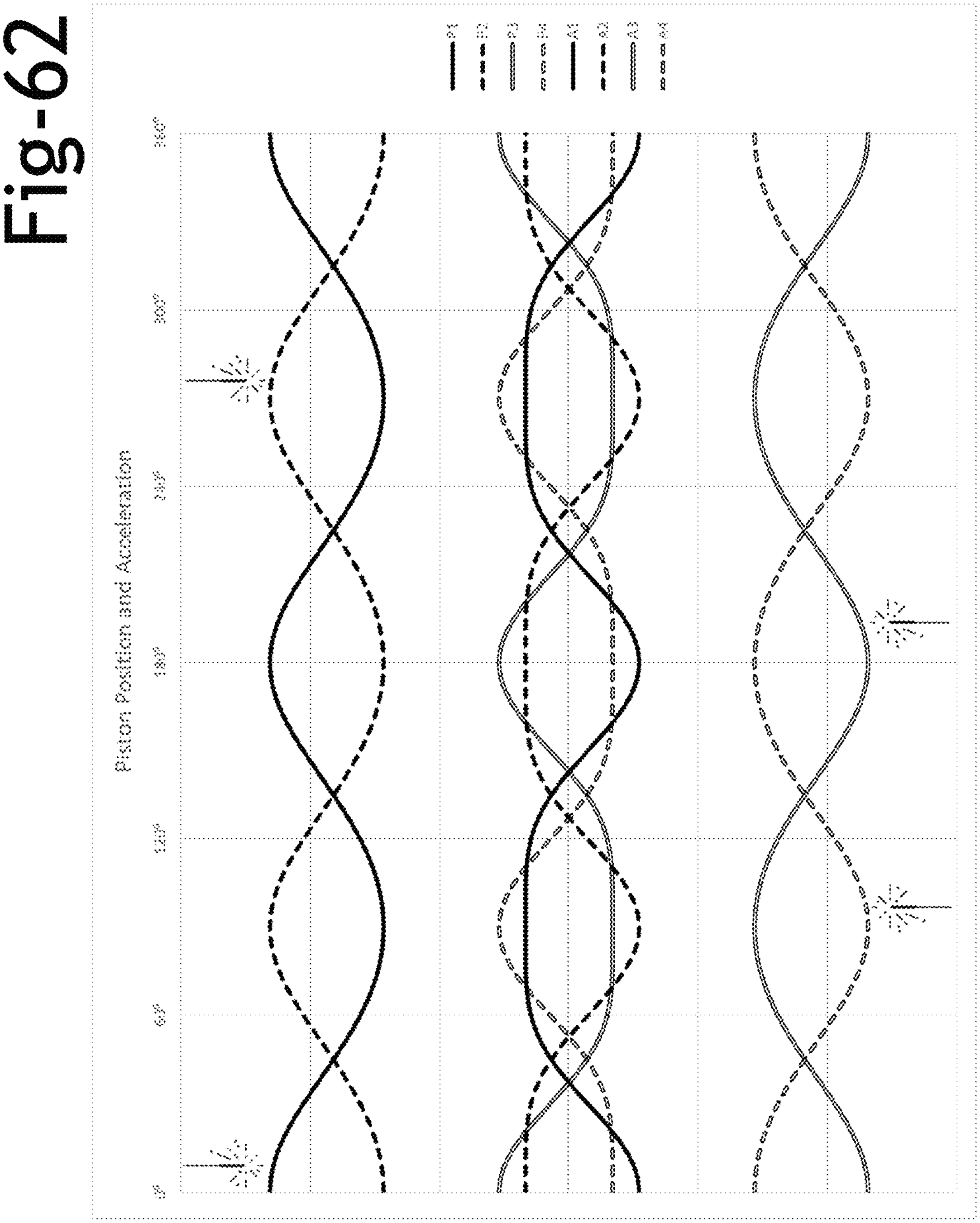
FIG. 62 is chart showing piston position and acceleration for one revolution of the rotor in the first embodiment of the present invention.

FIG. 62 is a chart illustrating piston position and acceleration for one revolution of the rotor of the first embodiment of the present invention. It can be seen that pistons 1 and 3 are in phase, as are pistons 4 and 2. However, each phase pair is functionally separated by 180 degrees. This balances the reciprocating mass with equal and opposite accelerations and produces a successive firing order. Piston 1 ($P_1$) starts from top dead center and ignition at 0° rotation of the rotor, goes through its power stroke, exhaust stroke, intake stroke, and finally its compression stroke in the 360° domain charted. Piston 3 ($P_3$), which began its intake stroke at 0° rotation of the rotor, enters its power stroke at 180°. Piston 4 ($P_4$) lags piston 1 ($P_1$) by 90° and piston 2 ($P_2$) lags by 270°.

Figure 63:
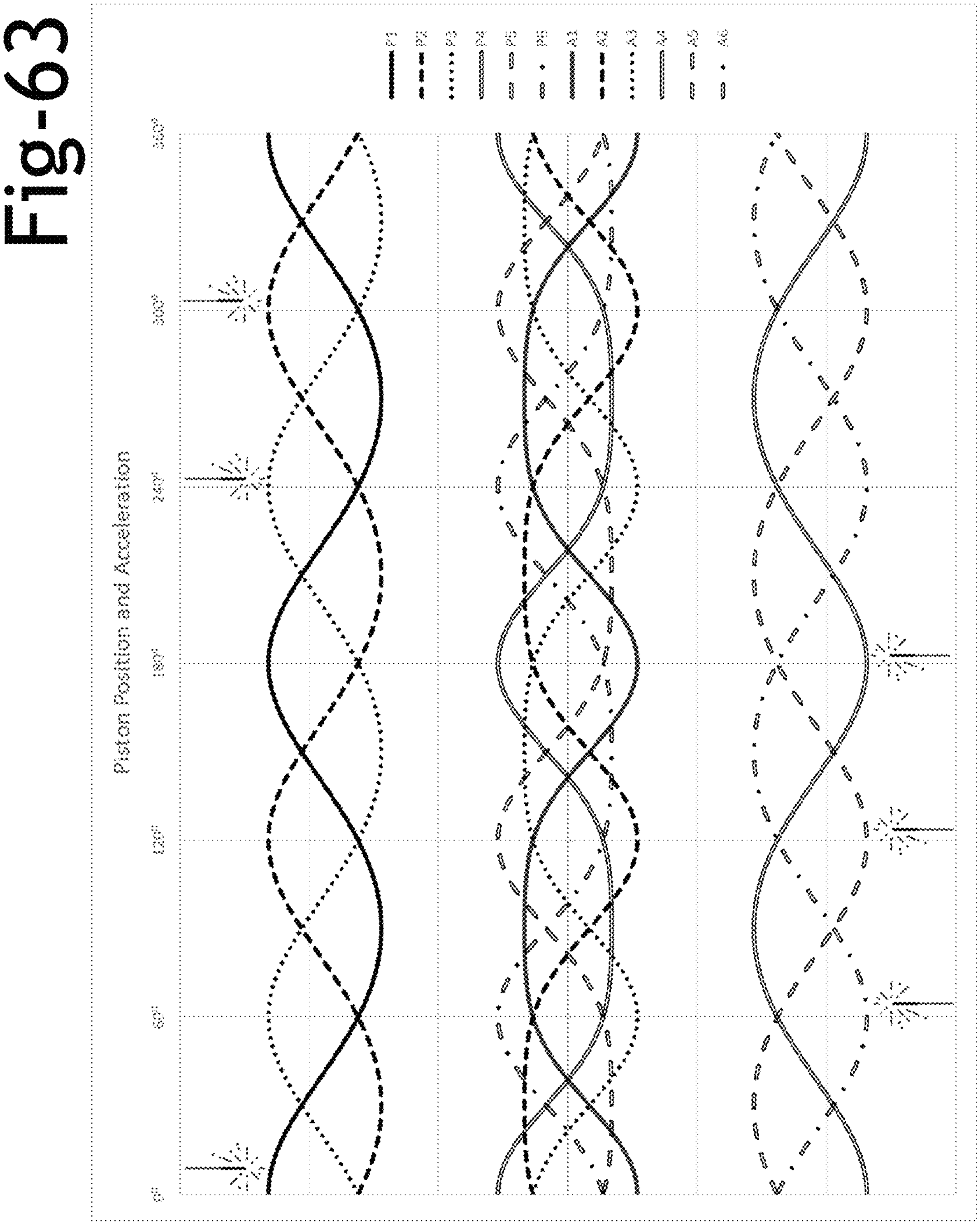
FIG. 63 is chart showing piston position and acceleration for one revolution of the rotor in the second embodiment of the present invention.

FIG. 63 is a chart illustrating piston position and acceleration for one revolution of the rotor of the second embodiment of the present invention. It can be seen that pistons 1 and 4 are in phase, as are pistons 6 and 3, and pistons 5 and 2. However, each phase pair is functionally separated by 180 degrees. This balances the reciprocating mass with equal and opposite accelerations and produces a successive firing order. Piston 1 ($P_1$) starts from top dead center and ignition at 0° rotation of the rotor, goes through its power stroke, exhaust stroke, intake stroke, and finally its compression stroke in the 360° domain charted. With six cylinders equally spaced, 3 phases are produced with six combustion events resulting from the 180 degree functional separation between strokes. The balance of acceleration between opposing pairs is evident in the acceleration plot.

Figure 64:
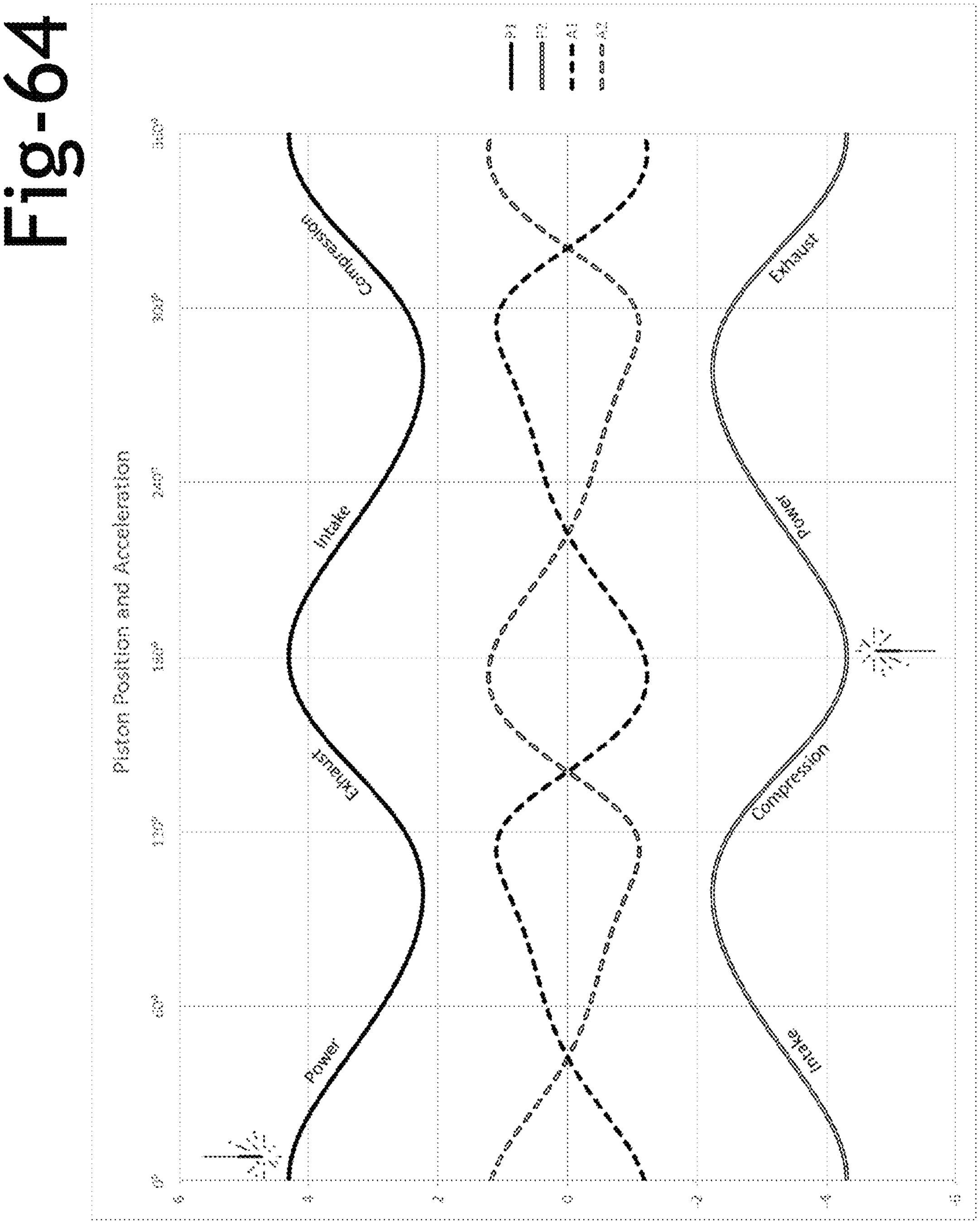
FIG. 64 is chart showing piston position and acceleration for one revolution of the rotor in the third embodiment of the present invention.

FIG. 64 is a chart illustrating piston position and acceleration for one revolution of the rotor of the third embodiment of the present invention. It can be seen that pistons 1 and 2 are in phase, however functionally separated by 180 degrees. This balances the reciprocating mass with equal and opposite accelerations. Piston 1 ($P_1$) starts from top dead center and ignition at 0° rotation of the rotor, goes through its power stroke, exhaust stroke, intake stroke, and finally its compression stroke in the 360° domain charted. Piston 2 ($P_2$) starts from top dead center at 0° rotation of the rotor, goes through its intake stroke, compression stroke, power stroke, and finally its exhaust stroke in the 360° domain charted. The balance of acceleration between opposing pairs is clearly evident in the acceleration plot. The modified stroke resulting from the offset crank arrangement is plainly seen in both position and acceleration plots.

Therefore, the foregoing is considered as illustrative of the principles of the present invention in its preferred embodiments. Further, various modifications may be made of the invention without departing from the scope thereof and it is desired, therefore, that only such limitations shall be placed thereon as are imposed by the prior art and which are set forth in the appended claims.

What is claimed is:

1. An internal combustion engine, comprising:

a housing having a central bore for a rotor and apertures for air intake, fuel delivery, and exhaust;

a front cover having a fixed sun gear, a central bearing bore, and rigidly secured to said housing;

a rear cover having a central bearing bore, and rigidly secured to said housing;

a rotor having 2 or more pair of intermeshed synchronously geared crankshafts arranged such that their proximal axes are constrained to rotate equidistant about the central axis of said rotor and such that their distal ends rotate in an epicycle;

wherein one in each pair of geared crankshafts has an extended proximal end configured to accept a timing gear, and wherein each said timing gear meshes with said fixed sun gear;

a plurality of cylinder bores in said rotor, each with a piston and connecting rod operably connected to each said crankshaft distal end;

an output shaft operably engaged with said rotor.

2. An internal combustion engine as claimed in claim 1, wherein the said timing gears contain half the number of teeth of said fixed sun gear producing two revolutions of the crankshafts per revolution of the rotor.

3. An internal combustion engine as claimed in claim 1, wherein said rotor has counterbores to accommodate spring loaded cylinder seals that conform to the inner surface of the housing.

4. An internal combustion engine as claimed in claim 1, wherein a spark plug is provisioned to ignite the air and fuel mixture.

5. An internal combustion engine as claimed in claim 1, wherein oil under pressure is delivered centrally and distributed through passages axially and radially to lubricate all bearing members and gear meshes.

6. An internal combustion engine as claimed in claim 5, wherein said rotor has interior tapered surfaces leading to annular collection grooves and passages to scavenge lubricating oil by centrifugal effect to the rotor periphery and by gravity to a sump.

7. An internal combustion engine as claimed in claim 1, wherein one in each pair of geared crankshafts has extended proximal ends configured to accept a drive gear, and wherein said drive gears mesh with a sun gear concentric and affixed to said output shaft.

8. An internal combustion engine as claimed in claim 7, wherein the rotor includes a hollow cylindrical output shaft concentric with the central output shaft providing two distinct output conditions.

9. An internal combustion engine as claimed in claim 1, wherein passages for airflow are provided between said cylinder bores of said rotor.

10. An internal combustion engine as claimed in claim 9, wherein a fan is affixed to said rotor to draw air through said passages.

11. An internal combustion engine, comprising:

a housing having a central bore for a rotor and apertures for air intake, fuel delivery, and exhaust;

a front cover having a fixed sun gear, a central bearing bore, and rigidly secured to said housing;

a rear cover having a central bearing bore, and rigidly secured to said housing;

a rotor having 2 or more pair of intermeshed synchronously geared crankshafts arranged such that their proximal axes are constrained to rotate equidistant about the central axis of said rotor and such that their distal ends rotate in an epicycle;

wherein in one in each pair of geared crankshafts has an extended proximal end configured to accept a timing gear, and wherein each said timing gear meshes with said fixed sun gear;

a cylinder bore for each pair of crank shafts in said rotor, each with a piston and at least two connecting rods, each said connecting rod operably connected between said piston and each other said crankshaft distal end;

an output shaft operably engaged with said rotor.

12. An internal combustion engine as claimed in claim 11, wherein the said timing gears contain half the number of teeth of said fixed sun gear producing two revolutions of the crankshafts per revolution of the rotor.

13. An internal combustion engine as claimed in claim 11, wherein said rotor has counterbores to accommodate spring loaded cylinder seals that conform to the inner surface of the housing.

14. An internal combustion engine as claimed in claim 11, wherein a spark plug is provisioned to ignite the air and fuel mixture.

15. An internal combustion engine as claimed in claim 11, wherein oil under pressure is delivered centrally and distributed through passages axially and radially to lubricate all bearing members and gear meshes.

16. An internal combustion engine as claimed in claim 15, wherein said rotor has interior tapered surfaces leading to annular collection grooves and passages to scavenge lubricating oil by centrifugal effect to the rotor periphery and by gravity to a sump.

17. An internal combustion engine as claimed in claim 11, wherein one in each pair of geared crankshafts has extended proximal ends configured to accept a drive gear, and wherein each said drive gear meshes with a sun gear concentric and affixed to said output shaft.

18. An internal combustion engine as claimed in claim 17, wherein the rotor includes a hollow cylindrical output shaft concentric with the central output shaft providing two distinct output conditions.

19. An internal combustion engine as claimed in claim 11, wherein passages for airflow are provided between said cylinder bores of said rotor.

20. An internal combustion engine as claimed in claim 19, wherein a fan is affixed to said rotor to draw air through said passages.

* * * * *